(12) United States Patent
Raghothaman et al.

(10) Patent No.: US 9,357,459 B2
(45) Date of Patent: May 31, 2016

(54) METHOD AND APPARATUS FOR CROSS LINK ESTABLISHMENT

(71) Applicant: INTERDIGITAL PATENT HOLDINGS, INC., Wilmington, DE (US)

(72) Inventors: Balaji Raghothaman, Chester Springs, PA (US); Ravikumar V. Pragada, Collegeville, PA (US); Zhuorong Deng, Brooklyn, NY (US); Tao Deng, Roslyn, NY (US); Gregory S. Sternberg, Mt. Laurel, NJ (US); Kiran K. Vanganuru, San Diego, CA (US); Hongsan Sheng, San Diego, CA (US); Steven Ferrante, Doylestown, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/363,457

(22) PCT Filed: Dec. 7, 2012

(86) PCT No.: PCT/US2012/068440
§ 371 (c)(1),
(2) Date: Jun. 6, 2014

(87) PCT Pub. No.: WO2013/086316
PCT Pub. Date: Jun. 13, 2013

(65) Prior Publication Data
US 2014/0349694 A1    Nov. 27, 2014

Related U.S. Application Data

(60) Provisional application No. 61/568,533, filed on Dec. 8, 2011, provisional application No. 61/676,599, filed on Jul. 27, 2012.

(51) Int. Cl.
*H04W 36/08* (2009.01)
*H04W 76/02* (2009.01)
(Continued)

(52) U.S. Cl.
CPC .............. *H04W 36/08* (2013.01); *H04W 36/00* (2013.01); *H04W 72/0406* (2013.01);
(Continued)

(58) Field of Classification Search
CPC ........................ H04M 15/8038; H04W 76/026
See application file for complete search history.

(56) References Cited

U.S. PATENT DOCUMENTS

| | | | | |
|---|---|---|---|---|
| 8,879,507 | B2 * | 11/2014 | Surface ............. | H04W 36/0083 370/331 |
| 2012/0314600 | A1 * | 12/2012 | Zeira ................... | H04W 52/383 370/252 |

(Continued)

FOREIGN PATENT DOCUMENTS

| | | |
|---|---|---|
| EP | 2 369 892 | 9/2011 |
| WO | 2011/146653 | 11/2011 |

(Continued)

OTHER PUBLICATIONS

3GPP™ Work Item Description, "Study on Proximity-based Services," TSG-SA1 #55, S1-112411, Dublin, Ireland (Aug. 2011).

(Continued)

*Primary Examiner* — Bobbak Safaipour
(74) *Attorney, Agent, or Firm* — Volpe and Koenig, P.C.

(57) ABSTRACT

A method and apparatus for cross link (XL) establishment are disclosed. In the method and apparatus, a XL between a terminal wireless transmit/receive unit (T-WTRU) and a helper WTRU (H-WTRU) is established. The T-WTRU and the H-WTRU may be configured to operate in a plurality of RRC states and a plurality of RRC substates. To establish the XL, neighbor discovery, association information exchange, and a H-WTRU selection may be performed. Radio resource control (RRC) configuration of the T-WTRU and the H-WTRU may also be performed. In the method and apparatus, coverage for a T-WTRU may be handed over between a network and a H-WTRU or between two H-WTRUs.

24 Claims, 42 Drawing Sheets

(51) Int. Cl.
*H04W 72/04* (2009.01)
*H04W 36/00* (2009.01)
H04W 88/04 (2009.01)
H04W 76/04 (2009.01)

(52) U.S. Cl.
CPC ........... *H04W 76/02* (2013.01); *H04W 76/022* (2013.01); *H04W 76/023* (2013.01); *H04W 76/046* (2013.01); *H04W 88/04* (2013.01)

(56) References Cited

U.S. PATENT DOCUMENTS

| | | | | |
|---|---|---|---|---|
| 2014/0241254 A1* | 8/2014 | Kaur | ................... | H04L 1/1812 370/329 |
| 2014/0321416 A1* | 10/2014 | Pragada | ............... | H04W 88/04 370/329 |
| 2014/0364079 A1* | 12/2014 | DiFazio | ............... | H04W 88/04 455/404.1 |
| 2014/0369340 A1* | 12/2014 | Horvat | .............. | H04W 56/0005 370/350 |
| 2015/0063095 A1* | 3/2015 | Deng | ................... | H04W 8/005 370/221 |
| 2015/0245256 A1* | 8/2015 | Kiss | ..................... | H04W 12/06 455/436 |
| 2015/0382241 A1* | 12/2015 | Ophir | ................. | H04W 28/065 370/328 |

FOREIGN PATENT DOCUMENTS

| | | |
|---|---|---|
| WO | 2012/125499 | 9/2012 |
| WO | 2012/170794 | 12/2012 |
| WO | 2013/086324 | 6/2013 |
| WO | 2013/086362 | 6/2013 |
| WO | 2013/086366 | 6/2013 |

OTHER PUBLICATIONS

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.14.0 (Jun. 2011).

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.16.0 (Mar. 2012).

Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.10.0 (Sep. 2011).

Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.13.0 (Jun. 2012).

Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.5.0 (Sep. 2011).

Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.8.0 (Jun. 2012).

Third Generation Partnership Project, "Technical Specification Group Services and System and Aspects; General Packet Radio Service (GPRS) enhancements for Evolved Universal Terrestrial Radio Access Network (E-UTRAN) access (Release 11)," 3GPP TS 23.401 V11.3.0 (Sep. 2012).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.15.0 (Sep. 2011).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.17.0 (Jun. 2012).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.8.0 (Sep. 2011).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.12.0 (Sep. 2012).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.3.0 (Sep. 2011).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.7.0 (Sep. 2012).

Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.1.0 (Sep. 2012).

Third Generation Partnership Project, "Technical Specification Group Radio Access Network; Evolved Universal Terrestrial Radio Access (E-UTRA); Requirements for support of radio resource management (Release 8)," 3GPP TS 36.133 V8.15.0 (Sep. 2011).

Third Generation Partnership Project, "Technical Specification Group Radio Access Network; Evolved Universal Terrestrial Radio Access (E-UTRA); Requirements for support of radio resource management (Release 8)," 3GPP TS 36.133 V8.19.0 (Sep. 2012).

Third Generation Partnership Project, "Technical Specification Group Radio Access Network; Evolved Universal Terrestrial Radio Access (E-UTRA); Requirements for support of radio resource management (Release 9)," 3GPP TS 36.133 V9.9.0 (Sep. 2011).

Third Generation Partnership Project, "Technical Specification Group Radio Access Network; Evolved Universal Terrestrial Radio Access (E-UTRA); Requirements for support of radio resource management (Release 9)," 3GPP TS 36.133 V9.13.0 (Sep. 2012).

Third Generation Partnership Project, "Technical Specification Group Radio Access Network; Evolved Universal Terrestrial Radio Access (E-UTRA); Requirements for support of radio resource management (Release 10)," 3GPP TS 36.133 V10.4.0 (Sep. 2011).

Third Generation Partnership Project, "Technical Specification Group Radio Access Network; Evolved Universal Terrestrial Radio Access (E-UTRA); Requirements for support of radio resource management (Release 10)," 3GPP TS 36.133 V10.8.1 (Sep. 2012).

Third Generation Partnership Project, "Technical Specification Group Radio Access Network; Evolved Universal Terrestrial Radio Access (E-UTRA); Requirements for support of radio resource management (Release 11)," 3GPP TS 36.133 V11.2.0 (Sep. 2012).

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.10.0 (Sep. 2011).

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).

Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.4.0 (Sep. 2011).

Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.6.0 (Mar. 2012).

(56) References Cited

OTHER PUBLICATIONS

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.3.0 (Sep. 2011).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.6.0 (Sep. 2012).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.0.0 (Sep. 2012).
Third Generation Partnership Project, "Technical Specification Group Radio Access Network; Evolved Universal Terrestrial Radio Access (E-UTRA); Relay architectures for E-UTRA (LTE-Advanced) (Release 9)," 3GPP TR 36.806 V9.0.0 (Mar. 2010).
Third Generation Partnership Project, "Technical Specification Group Radio Access Network; Radio Resource Control (RRC); Protocol Specification (Release 4)," 3GPP TS 25.331 V4.20.0, (Dec. 2008).
Third Generation Partnership Project, "Technical Specification Group Radio Access Network; Radio Resource Control (RRC); Protocol Specification (Release 4)," 3GPP TS 25.331 v4.21.0, Jan. 2012.
Third Generation Partnership Project, "Technical Specification Group Radio Access Network; Radio Resource Control (RRC); Protocol Specification (Release 5)," 3GPP TS 25.331 V5.24.0, (Jun. 2009).
Third Generation Partnership Project, "Technical Specification Group Radio Access Network; Radio Resource Control (RRC); Protocol Specification (Release 5)," 3GPP TS 25.331 v5.25.0, Jan. 2012.
Third Generation Partnership Project, "Technical Specification Group Radio Access Network; Radio Resource Control (RRC); Protocol Specification (Release 6)," 3GPP TS 25.331 V6.25.0 (Mar. 2010).
Third Generation Partnership Project, "Technical Specification Group Radio Access Network; Radio Resource Control (RRC); Protocol Specification (Release 6)," 3GPP TS 25.331 v6.26.0, Jan. 2012.
Third Generation Partnership Project, "Technical Specification Group Radio Access Network; Radio Resource Control (RRC); Protocol Specification (Release 7)," 3GPP TS 25.331 v7.20.0, Jun. 2011.
Third Generation Partnership Project, "Technical Specification Group Radio Access Network; Radio Resource Control (RRC); Protocol Specification (Release 7)," 3GPP TS 25.331 v7.22.0, Mar. 2012.
Third Generation Partnership Project, "Technical Specification Group Radio Access Network; Radio Resource Control (RRC); Protocol specification (Release 8)," 3GPP TS 25.331 V8.16.0 (Sep. 2011).
Third Generation Partnership Project, "Technical Specification Group Radio Access Network; Radio Resource Control (RRC); Protocol specification (Release 8)," 3GPP TS 25.331 V8.20.0 (Sep. 2012).
Third Generation Partnership Project, "Technical Specification Group Radio Access Network; Radio Resource Control (RRC); Protocol specification (Release 9)," 3GPP TS 25.331 V9.8.0 (Sep. 2011).
Third Generation Partnership Project, "Technical Specification Group Radio Access Network; Radio Resource Control (RRC); Protocol specification (Release 9)," 3GPP TS 25.331 V9.12.0 (Sep. 2012).
Third Generation Partnershp Project, "Technical Specification Group Radio Access Network; Radio Resource Control (RRC); Protocol specification (Release 10)," 3GPP TS 25.331 V10.5.0 (Sep. 2011).
Third Generation Partnershp Project, "Technical Specification Group Radio Access Network; Radio Resource Control (RRC); Protocol specification (Release 10)," 3GPP TS 25.331 V10.9.0 (Sep. 2012).
Third Generation Partnershp Project, "Technical Specification Group Radio Access Network; Radio Resource Control (RRC); Protocol specification (Release 11)," 3GPP TS 25.331 V11.3.0 (Sep. 2012).

* cited by examiner

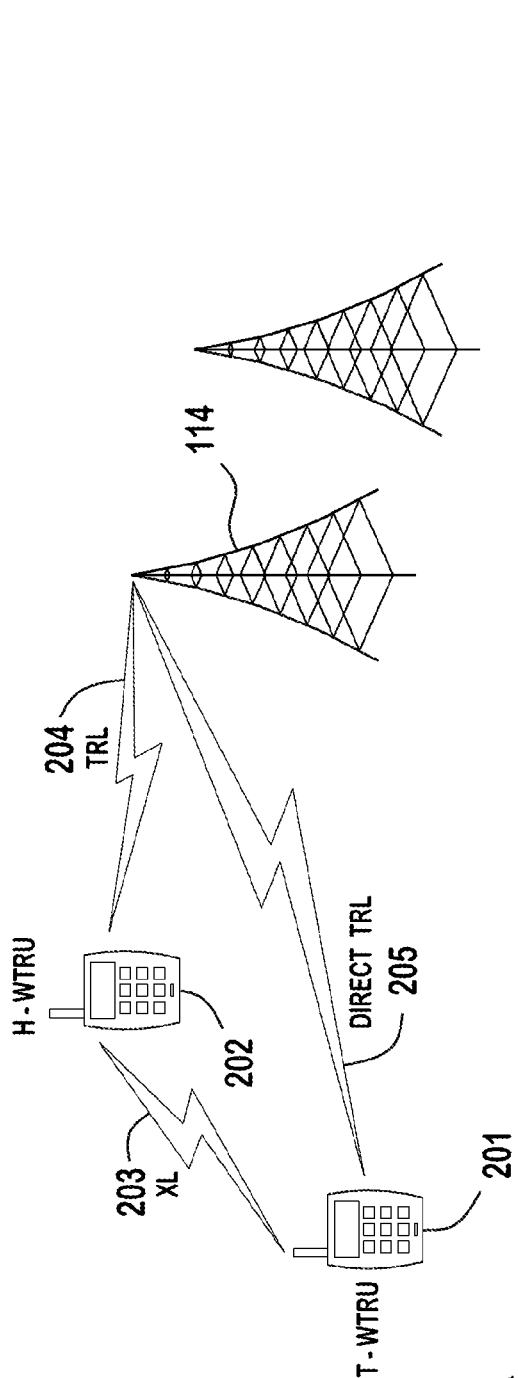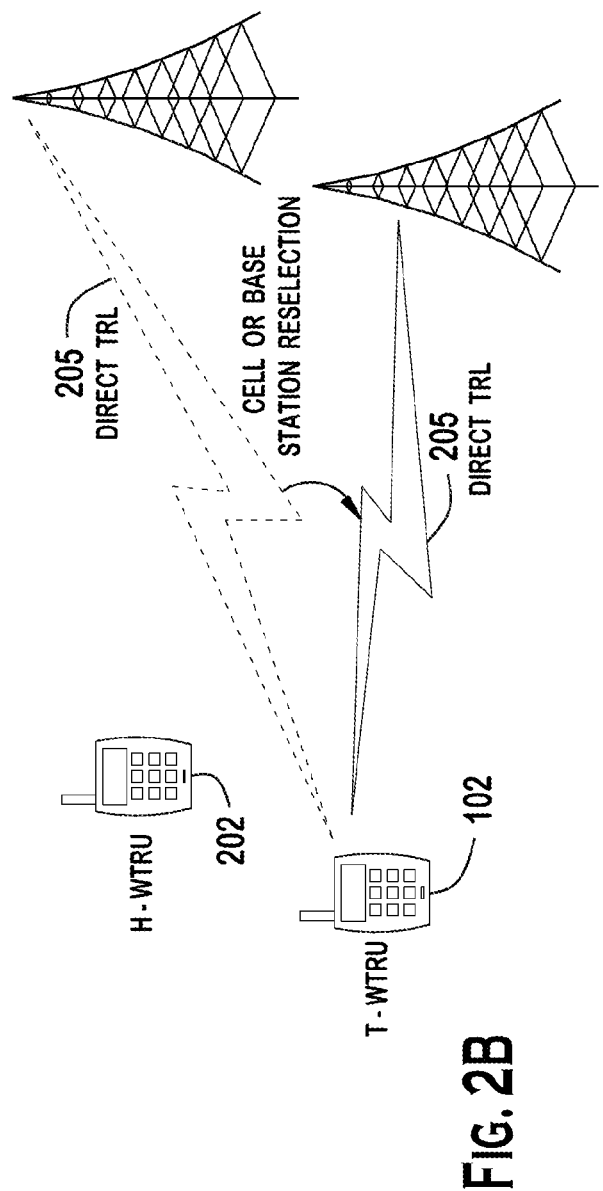
FIG. 2A
FIG. 2B

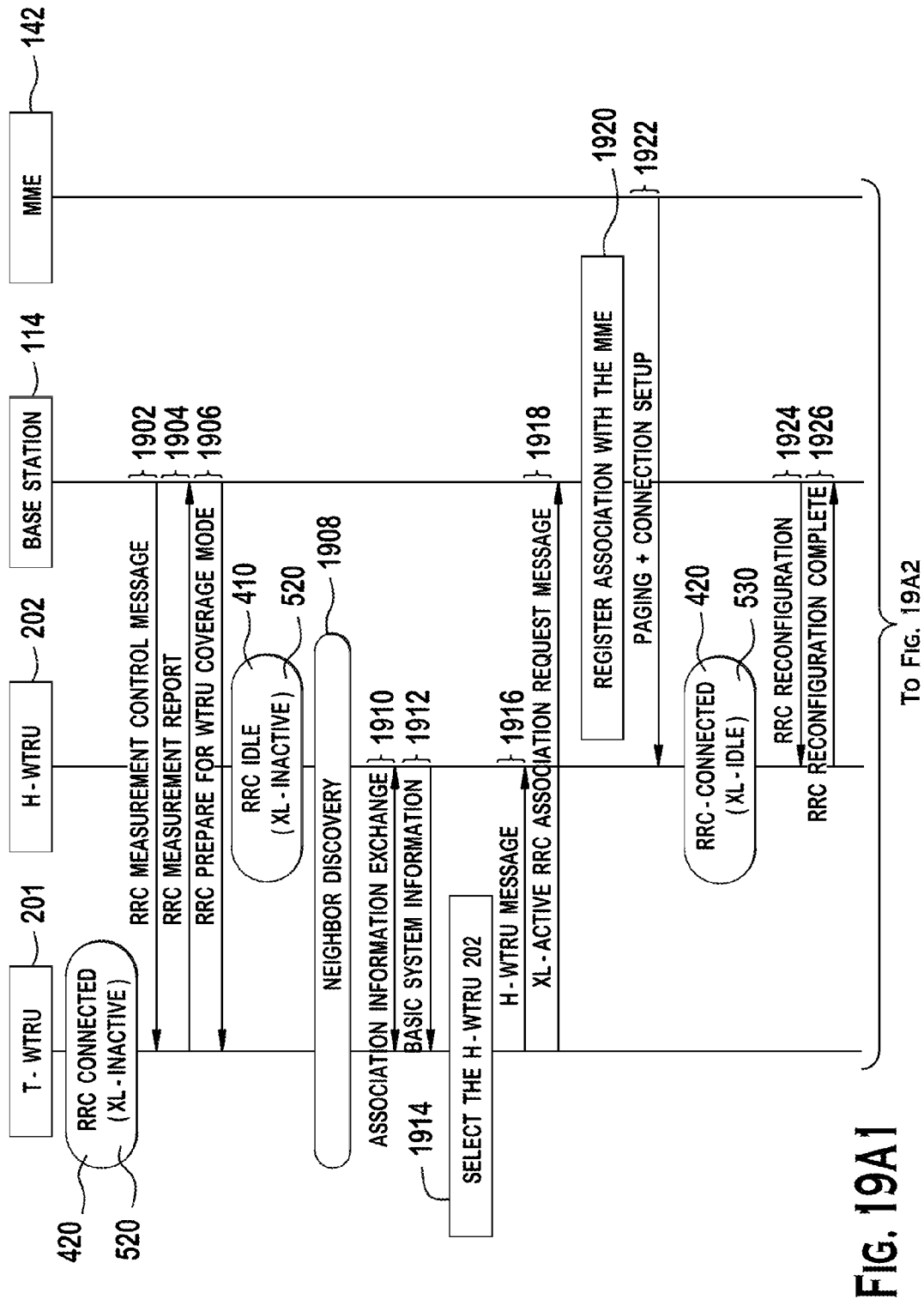
FIG. 19A1

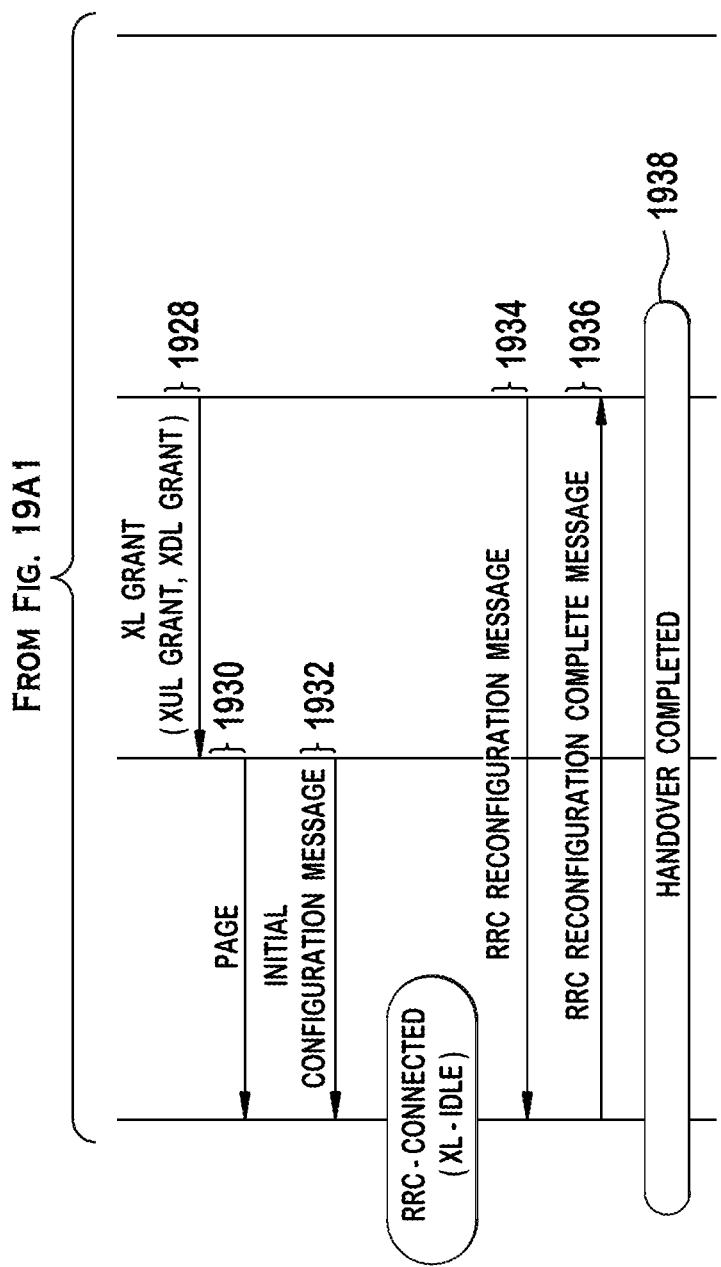
FIG. 19A2

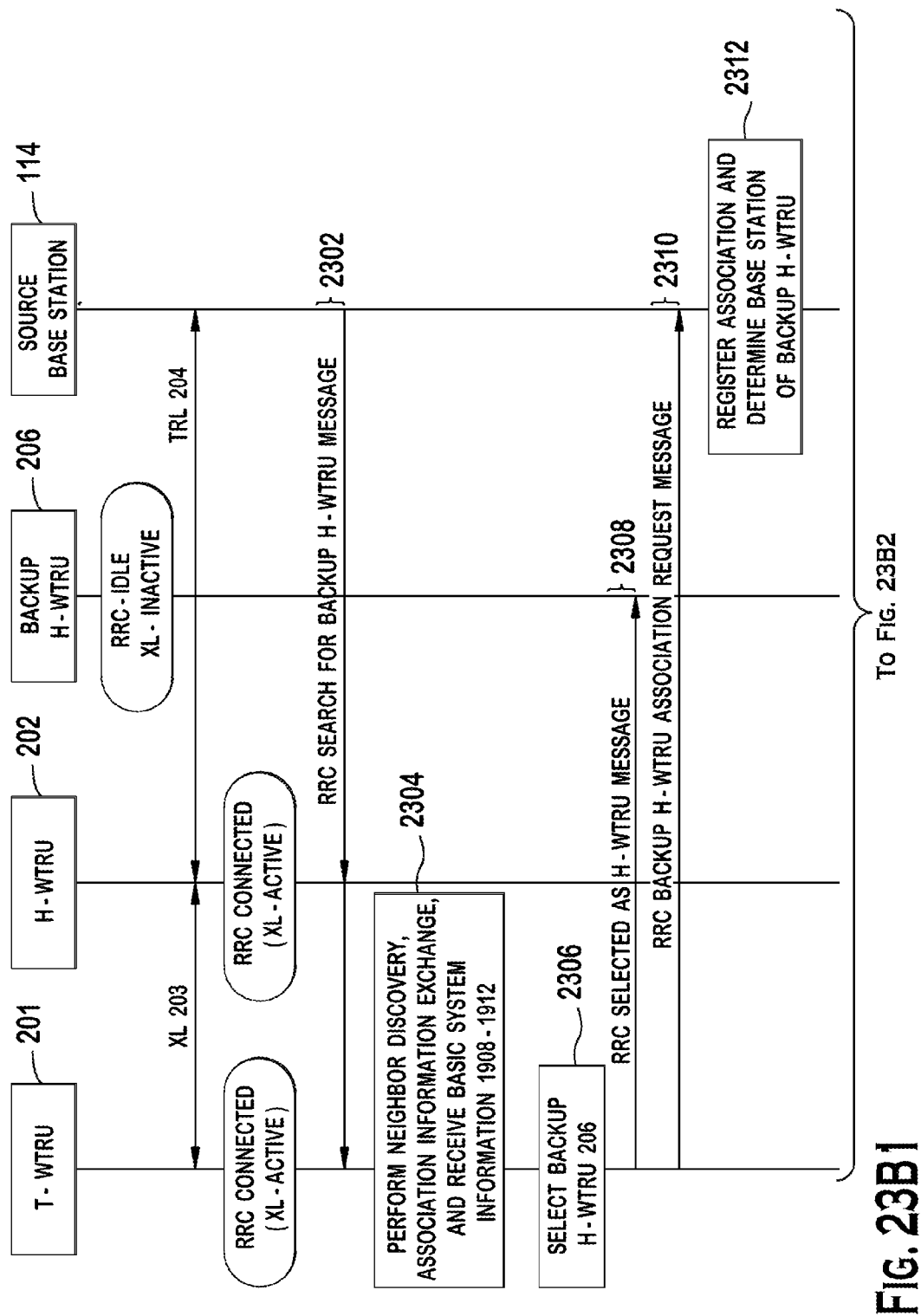
FIG. 23B1

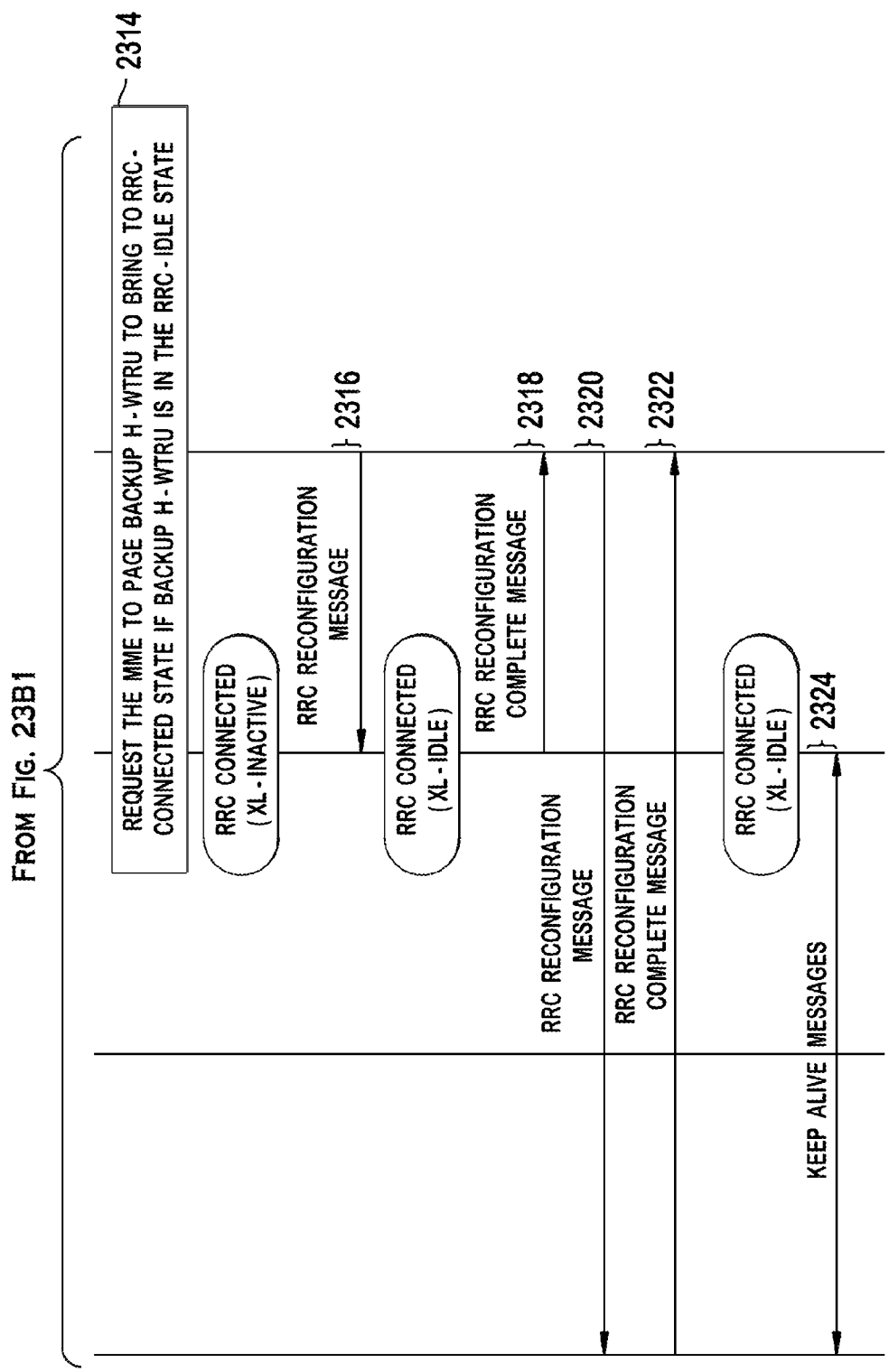
FIG. 23B2

METHOD AND APPARATUS FOR CROSS LINK ESTABLISHMENT

CROSS REFERENCE TO RELATED APPLICATIONS

This application claims the benefit of U.S. provisional application No. 61/568,533 filed on Dec. 8, 2011, U.S. provisional application No. 61/676,599 filed on Jul. 27, 2012, and PCT application No. PCT/US2012/068440, filed Dec. 7, 2012, the contents of which are hereby incorporated by reference herein as if fully set forth.

BACKGROUND

As user demand for wireless data services continues to grow, the deployment of network infrastructure to support the user demand has proliferated. The increase in network infrastructure has been aimed at shrinking the size of wireless communication cells in order to increase network coverage and capacity for supporting both a growing number of users and increased data usage by the users. One drawback of the increasing network size is the increased overhead due to the large amount of resulting mobility events.

To provide network coverage for an out-of-coverage device, wireless devices which are within network coverage may be used to relay data from the out-of-coverage wireless devices to the network. A cross link (XL) is established between the out-of-coverage device and the device having network coverage. The XL facilitates data traffic with the network. Further, when both devices are within network coverage, the XL may be used to provide increased capacity to either device.

It is desirable to have a method and apparatus for controlling XL establishment between wireless devices, whereby the wireless devices may be in any one of a plurality of radio resource control (RRC) substates. It is also desirable for the method and apparatus to enable triggering and performing a handover between infrastructure coverage and wireless device coverage.

SUMMARY

A method and apparatus for cross link (XL) establishment are provided. In the method and apparatus, a helper wireless transmit/receive unit (H-WTRU) may establish a cross link (XL) with a terminal WTRU (T-WTRU). The H-WTRU may receive a scheduling request from the T-WTRU and transmit a radio resource control (RRC) connection request to a base station in response to receiving the scheduling request. Further, the H-WTRU may receive an RRC connection setup message from the base station and transmit an initial configuration message to the T-WTRU. The initial configuration message including a XL radio network temporary identifier (XL-RNTI) for use on the XL.

In one embodiment, the RRC connection request may include a cause code indicating that the T-WTRU seeks to establish the XL. In another embodiment, the RRC connection setup message may include configuration information for a first signaling radio bearer (SRB1) of the T-WTRU. The SRB1 may be mapped to a data radio bearer (DRB) of the H-WTRU. Further, on a condition that the H-WTRU is in an RRC-IDLE state, the may H-WTRU transition to an RRC-CONNECTED state upon receiving the scheduling request.

In yet another embodiment, the H-WTRU receives an uplink grant from the base station, where the uplink grant indicates XL resources for use by the T-WTRU in uplink transmission. In another embodiment, the H-WTRU may transmit the uplink grant to the T-WTRU.

BRIEF DESCRIPTION OF THE DRAWINGS

A more detailed understanding may be had from the following description, given by way of example in conjunction with the accompanying drawings wherein:

FIG. 2A shows a terminal-wireless transmit/receive unit (T-WTRU) having a cross link (XL) with a helper-WTRU (H-WTRU);

FIG. 2B shows cell or base station reselection for direct traditional link (TRL) establishment;

FIGS. 19A1 and 19A2 show a message flow diagram of infrastructure coverage mode to WTRU-to-WTRU (W2W) coverage mode handover;

FIGS. 23B1 and 23B2 show a message flow diagram for backup H-WTRU selection and association;

DETAILED DESCRIPTION

Figure 1A:
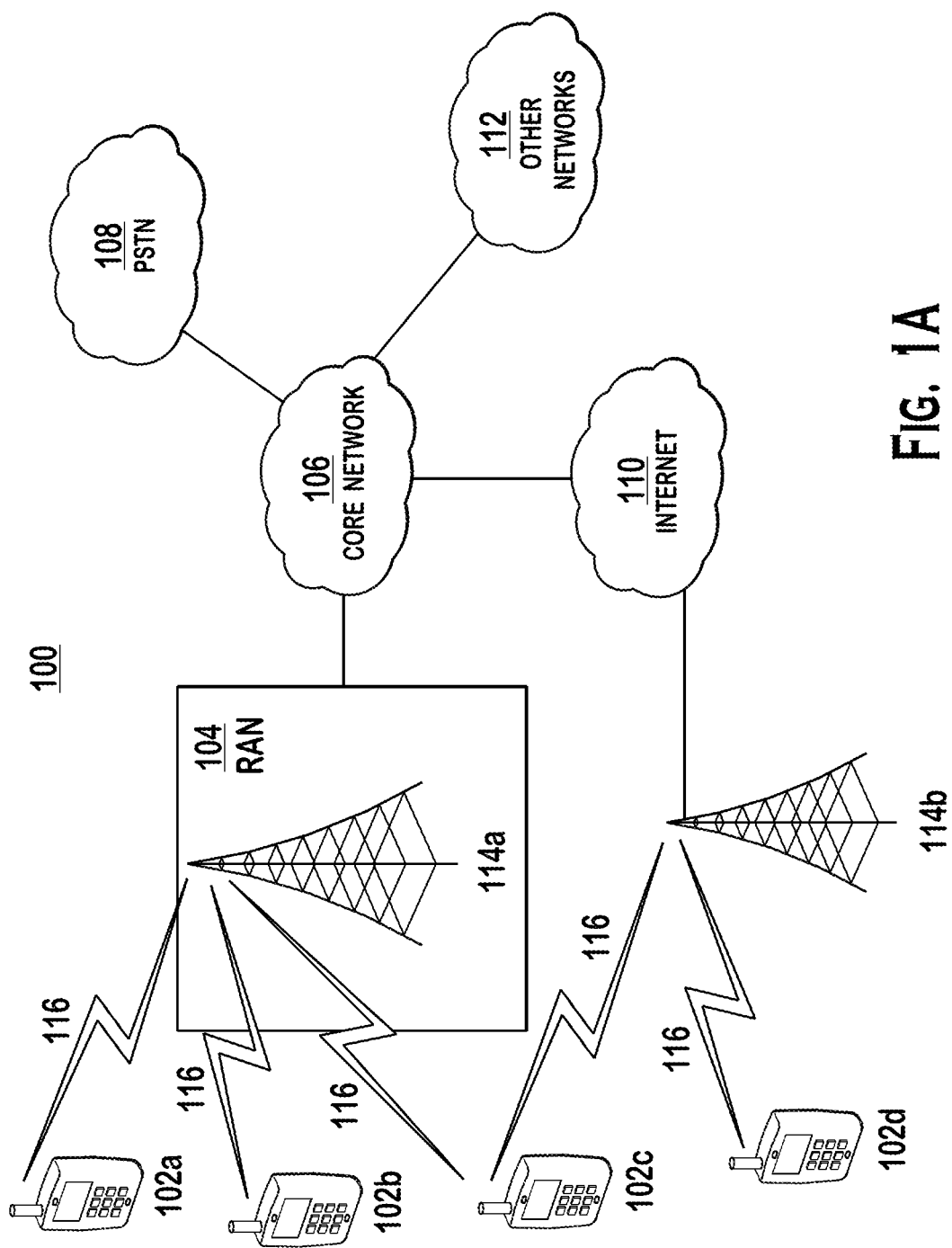
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102*a*, 102*b*, 102*c*, 102*d*. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
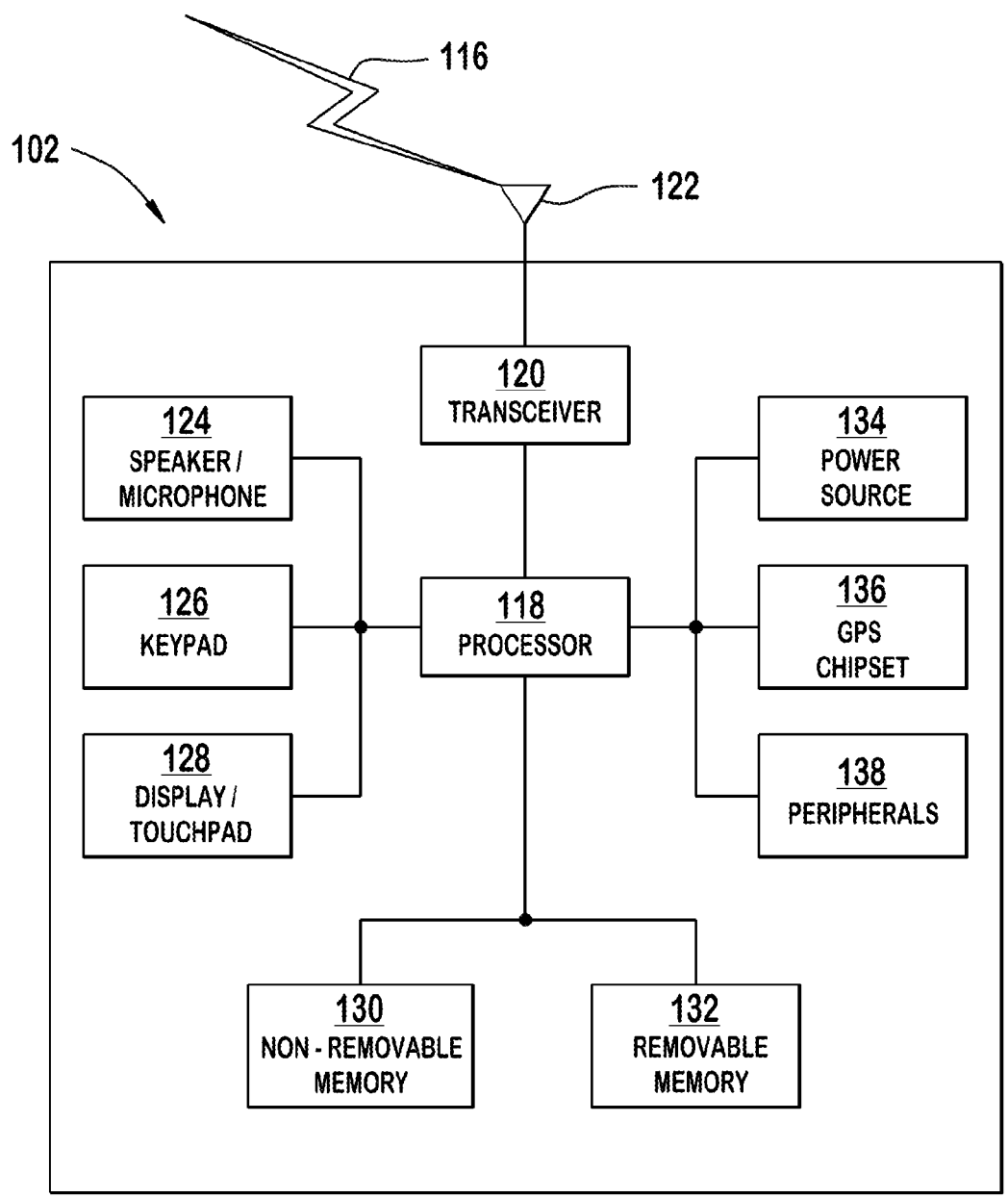
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

When referred to hereinafter, the term traditional radio link (TRL) refers to the air interface 116 between a WTRU 102 and the RAN 104, whereby the air interface 116 is not aided by another WTRU acting as relay between the WTRU 102 and the RAN 104. The TRL may be in accordance with any radio technology such as, E-UTRA, UTRA, any one of the IEEE 802 protocols, CDMA 2000, GSM, and the like. For example, the TRL may be an LTE, LTE-A, or WCDMA air interface.

A WTRU 102 may lack network coverage and may not have an established TRL with the RAN 104. The WTRU 102 may establish a radio link with another WTRU, for example, the other WTRU may be in the WTRU's 102 vicinity. The WTRU may receive access to the RAN 104 via the other WTRU's established TRL with the RAN 104. Further, the WTRU 102 may have a TRL established with the RAN 104 but may require additional communication capacity and may establish a radio link with the other WTRU in order to receive additional access to the RAN 104 via the other WTRU's established TRL. Furthermore, the WTRU 102 may establish a radio link with the other WTRU to communicate directly with the other WTRU without utilizing the TRL resources of either WTRU.

The radio link between the WTRU 102 and the other WTRU is referred to herein as a cross link (XL). Further, when the WTRU 102 has an established XL with the other WTRU, the WTRU 102 is referred to herein as a terminal-WTRU (T-WTRU) and the other WTRU is referred to herein as a helper WTRU (H-WTRU) as described with reference to FIG. 2.

FIG. 2A shows a T-WTRU having a XL with a H-WTRU. The T-WTRU 201 has a XL 203 with the H-WTRU 202. The H-WTRU 202 has a TRL 204 with a base station 114, which may be any one of base stations 114a, 114b. The XL 203 may facilitate access to the TRL 204 for the T-WTRU 201 or may facilitate direct communication between the T-WTRU 201 and the H-WTRU 202. Further, the T-WTRU 201 may have a direct TRL 205 with the base station 114 as shown in FIG. 2. When the T-WTRU has both the XL 203 and the direct TRL 205, increased throughput and capacity are achieved for the T-WTRU 201 through the utilization of both links.

The XL 203 may also be used in a wireless network to provide coverage for an out-of-coverage T-WTRU 201, i.e., a T-WTRU 201 without a direct TRL 205 to the base station 114, by utilizing the TRL 204 of a network-covered H-WTRU 202 to relay the H-WTRU 202 traffic to the base station 114 and the RAN 104.

For example, in LTE systems, a T-WTRU 201 has coverage if the T-WTRU 201 is registered with a network, (i.e., in an evolved packet system (EPS) mobility management (EMM) REGISTERED state), is able to decode a broadcast channel (BCH) from a cell in the network, is able to receive primary system information, is able to decode a paging channel (PCH), is able to receive paging messages and secondary system information, is able to communicate with cell using random access in the RRC-IDLE state or using a physical uplink control channel (PUCCH) or a physical uplink shared channel (PUSCH) in the RRC-CONNECTED state, and is able to transmit a minimum data rate over the PUSCH and receive a minimum data rate over the physical downlink shared channel (PDSCH).

Before XL 203 establishment, a WTRU 102 may attempt to reselect a cell or base station for direct TRL 205 establishment. When a direct TRL 205 is established, the WTRU 102 may use the direct TRL 205 for its traffic and, thus, not burden the H-WTRU's 202 TRL 204.

FIG. 2B shows cell or base station reselection for direct TRL 205 establishment. The T-WTRU 102 is unable to establish a direct TRL 205 with the base station 114 or the direct TRL 205 with the base station 114 has failed (as depicted by the dashed line in FIG. 2B). The T-WTRU 201 then attempts cell or base station reselection and the direct TRL 205 is established with the reselected cell or base station (as depicted by the solid line). The T-WTRU 201 may not need to establish a XL 203 with the H-WTRU 202 and the WTRU 102 may not be designated as a T-WTRU 201. It is noted that a reselected cell may be associated with the base station 114 and may not necessarily be associated with the reselected base station as depicted in FIG. 2B.

Figure 2C:
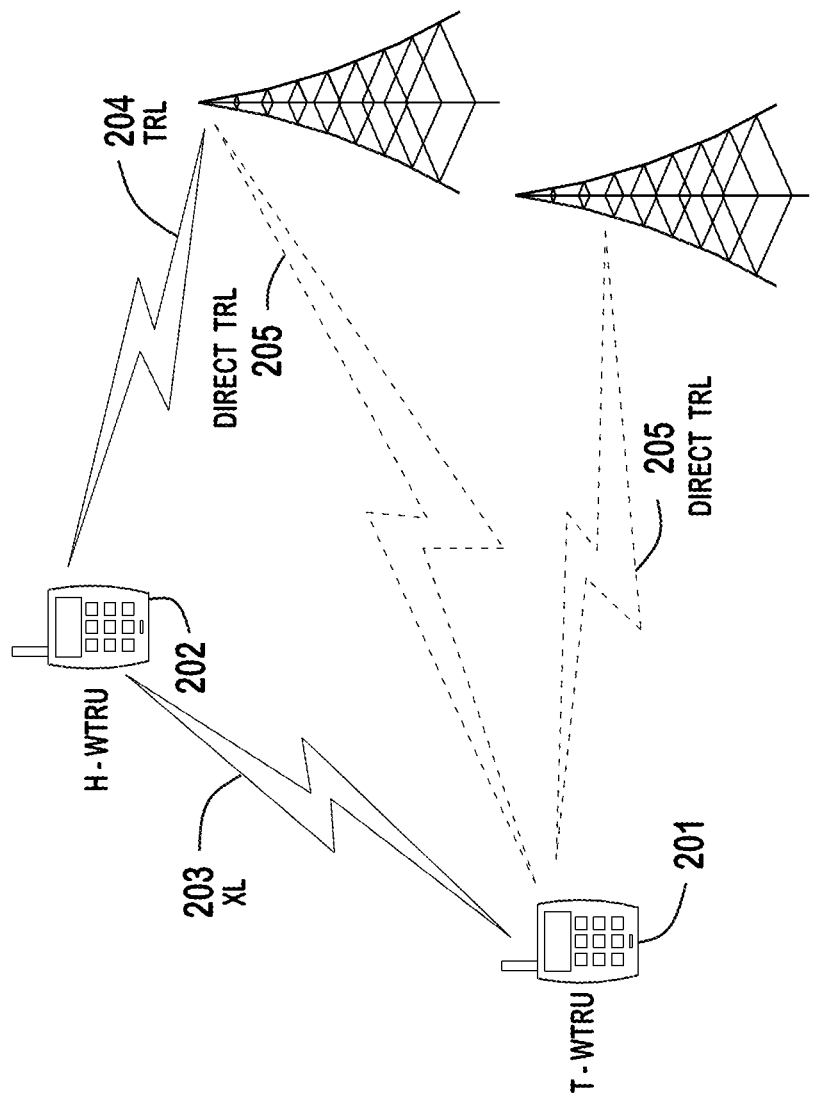
FIG. 2C shows cell or base station reselection failure for direct TRL establishment.

FIG. 2C shows cell or base station reselection failure for direct TRL 205 establishment. A direct TRL 205 is not established with either the base station or the reselected base station or the direct TRL 205 has failed (as depicted by the dashed line). In order to utilize the communication resources of the RAN 114, the T-WTRU 201 has an established XL 203 with the H-WTRU 202, which has a TRL 204 with the base station 114.

Procedures may be used for XL 203 establishment between the T-WTRU 201 and the H-WTRU 202. The procedures may include neighbor discovery and association information exchange as described with reference to FIG. 3.

Figure 3:
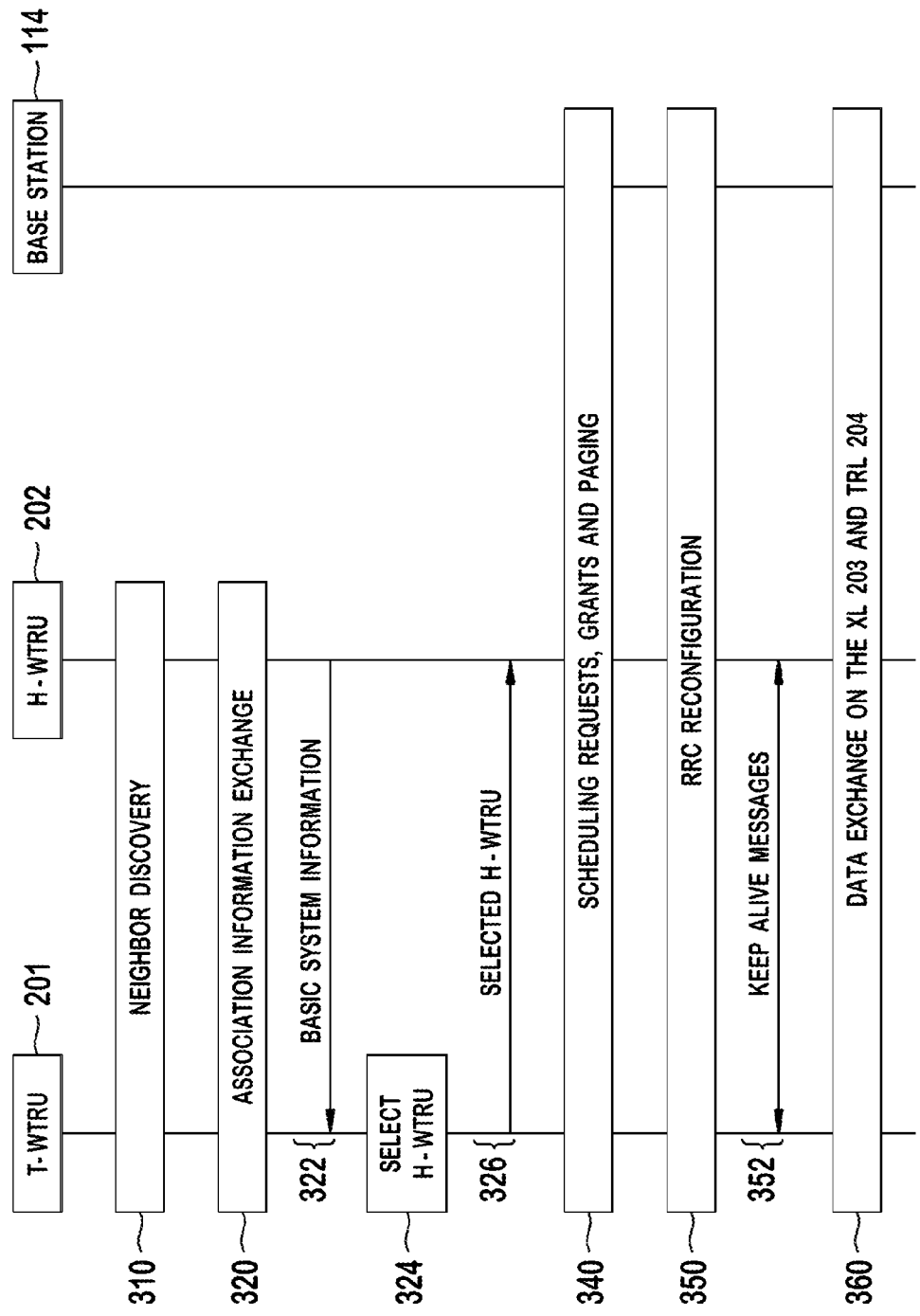
FIG. 3 shows a XL establishment procedure.

FIG. 3 shows a XL 203 establishment procedure. The T-WTRU 201 performs neighbor discovery 310 in order to locate a H-WTRU 202. In neighbor discovery, the T-WTRU 201 may transmit a neighbor discovery initiation transmission (NDIT) and await a neighbor discovery response transmission (NDRT) from the H-WTRU 202. Neighbor discovery 310 is used by the T-WTRU 201 for finding a WTRU 102 for serving as a H-WTRU 202. The NDIT may be transmitted in a common resource and as such may be received by a plurality of WTRUs 102 and the plurality of WTRUs 102 may then transmit the NDRT, which provides the T-WTRU 201 options for selecting a H-WTRU 202.

After neighbor discovery, association information is exchanged 320, whereby the T-WTRU 201 and the H-WTRU 202 may exchange association information messages. The T-WTRU 201 also receives basic system information 322 from the H-WTRU 202, which may include identities associated with the H-WTRU 202. The T-WTRU 201 then selects the H-WTRU 202, for example, from candidate WTRUs 102 with which the T-WTRU 201 exchanged association information 320 or received basic system information 322. After the H-WTRU 202 is selected, the T-WTRU 201 sends a selected as H-WTRU 202 message 326 to the H-WTRU 202 indicating the H-WTRU 202 selection for the role.

At any point during or after association information exchange 320, receipt of basic system information 322, H-WTRU 202 selection 324, or transmission or reception of the selected as H-WTRU 202 message 326, association between the T-WTRU 201 and the H-WTRU 202 may be said to be formed 330. Further, although not shown in FIG. 3, the base station 114 may be involved in procedures described with reference to numerals 310-330.

After association is formed 330, scheduling requests, grants for the XL 203, and paging messages are exchanges between the T-WTRU 201, the H-WTRU 202, and the base station 114. The scheduling requests may indicate a need for resource allocation on the XL 203 for the transmission of data. XL 203 grants may allocate resources on the XL 203 for the T-WTRU 201 or the H-WTRU 202 to use for uplink or downlink communication. Further, paging may be performed to send alerts or indicate a need for a T-WTRU 201 or H-WTRU 202 to undergo an RRC state transition as described herein.

Further, RRC reconfiguration 350 may be performed in order to setup the connectivity of T-WTRU 201 or the H-WTRU 202 on the XL 203 or the TRL 204. RRC reconfiguration 350 may also be used to indicate mapping between signaling radio bearers (SRBs) or data radio bearers (DRBs) for the TRL 204 and SRBs or DRBs for the XL 203. Keep alive messages are exchanged 352 between the T-WTRU 201 and the H-WTRU 202 in order to maintain the association between the T-WTRU 201 and the H-WTRU 202. Further, data is exchanged 360 on the XL 203 and the TRL 204 to provide service and coverage to the T-WTRU 201.

The T-WTRU 201 and the H-WTRU 202 may immediately perform data transmission 325 on the XL 203. If the T-WTRU 201 and the H-WTRU 202 do not need to perform data transmission 325, the T-WTRU 201 and the H-WTRU 202 may exchange keep alive messages 324 in order to maintain the established XL 203 and facilitate using the XL 203 for data transmission 325 at a later time.

XL 203 establishment and communication over the XL 203 may be performed in accordance with any air interface, such as an LTE or LTE-A air interface and procedures for XL 203 establishment or communication using the XL 203 may be performed in accordance with procedures for the air interface and in conjunction with the procedures described herein.

The XL 203 between the T-WTRU 201 and the H-WTRU 202 may be in accordance with an Open Systems Interconnection (OSI) protocol comprising one or more of a physical (PHY), medium access control (MAC), radio link control (RLC), packet data convergence protocol (PDCP), radio resource control (RRC), or non-access stratum (NAS) layer. The protocol layers of the XL 203 may be different than the protocol layers of the TRL 204 or the direct TRL 205, or may be the same. For example, the PHY layer of the XL 203 may be different than the PHY of the TRL 204, whereas the RRC layers of the XL 203 and TRL 204 may be similarly defined.

For the RRC layer, an RRC protocol may be used. The RRC protocol may include RRC states to which a WTRU 102, for example, the T-WTRU 201 or the H-WTRU 202, may belong. An RRC state of the WTRU 102 is dictated by WTRU's 102 connectivity or potential for connectivity and the WTRU 102 may transition between the RRC states based on the WTRU's 102 connectivity or potential for connectivity. The RRC states are associated with the WTRU's 102 connectivity on any radio link, including, the XL 203, TRL 204, or direct TRL 205 as described with reference to FIG. 4

Figure 4:
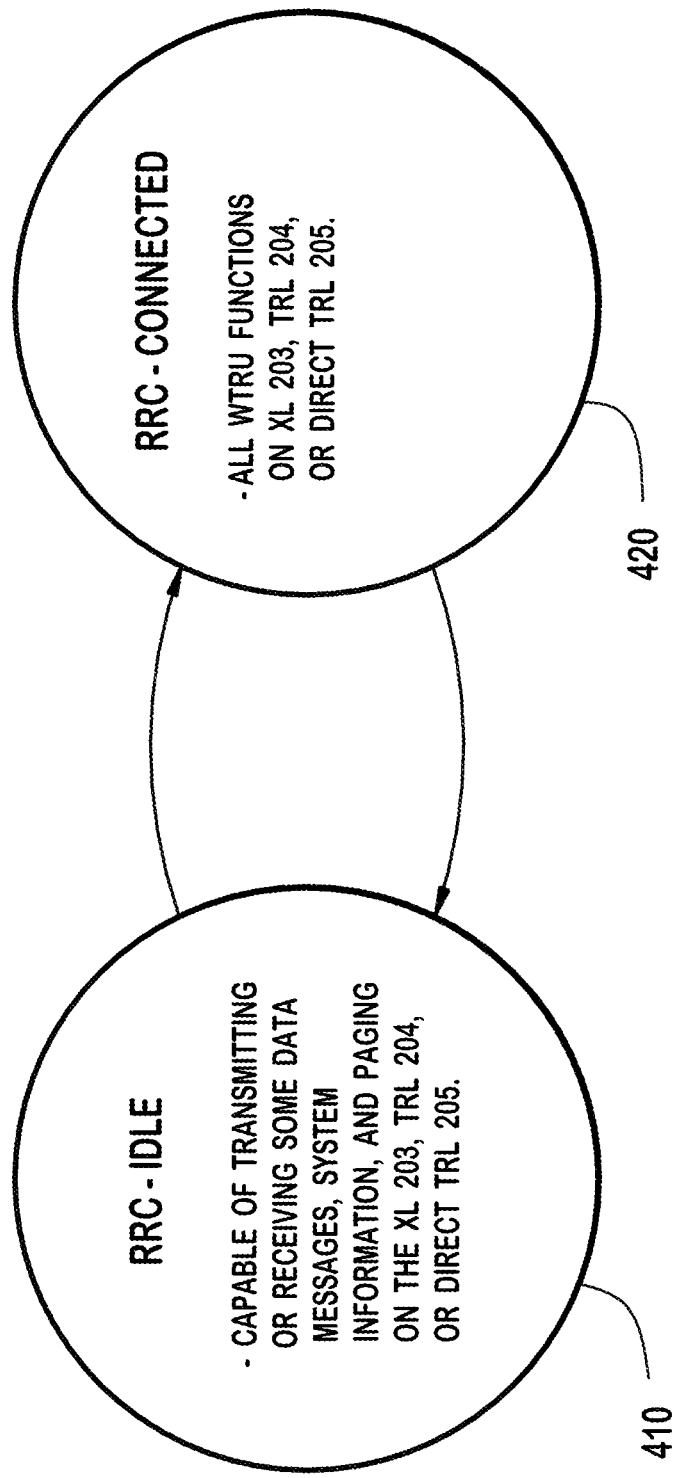
FIG. 4 shows the radio resource control (RRC) states of a WTRU.

FIG. 4 shows the RRC states of a WTRU 102. The WTRU 102 may be in an RRC-IDLE state 410 or an RRC-CONNECTED state 420. The WTRU 102 may transition between the RRC-IDLE state 410 and the RRC-CONNECTED state 420. When the WTRU 102 is in the RRC-IDLE state 410, the WTRU 102 may not have a signaling radio bearer established on the XL 203, the TRL 204 or the direct TRL 205 (i.e., the WTRU 102 may not be able to transmit or receive data on the XL 203, the TRL 204 or the direct TRL 205). However, the WTRU 102 may be able to monitor control channels on the XL 203, the TRL 204, or the direct TRL 205 or transmit or receive data on the control information when the WTRU 102 is in the RRC-IDLE state 410.

When the WTRU 102 is in the RRC-CONNECTED state 420, the WTRU 102 is able to perform the functions the WTRU 102 is capable of performing in the RRC-IDLE state 410 in addition to transmitting or receiving data on the XL 203, the TRL 204 or the direct TRL 205.

A WTRU 102 that is capable of performing functions associated with the XL 203 may further have an XL substate associated with the functions the WTRU 102 is capable of performing on the XL 203. The XL substate is independent of the functions the WTRU 102 is capable of performing on either the TRL 204, or the direct TRL 205, and is only associated with the functions the WTRU 102 is capable of performing on the XL 203. The XL substate is a substate of the RRC state (i.e., the RRC-IDLE state 410 and RRC-CONNECTED state 420). The WTRU 102 may have any one of four XL substates as described with reference to FIG. 5.

Figure 5:
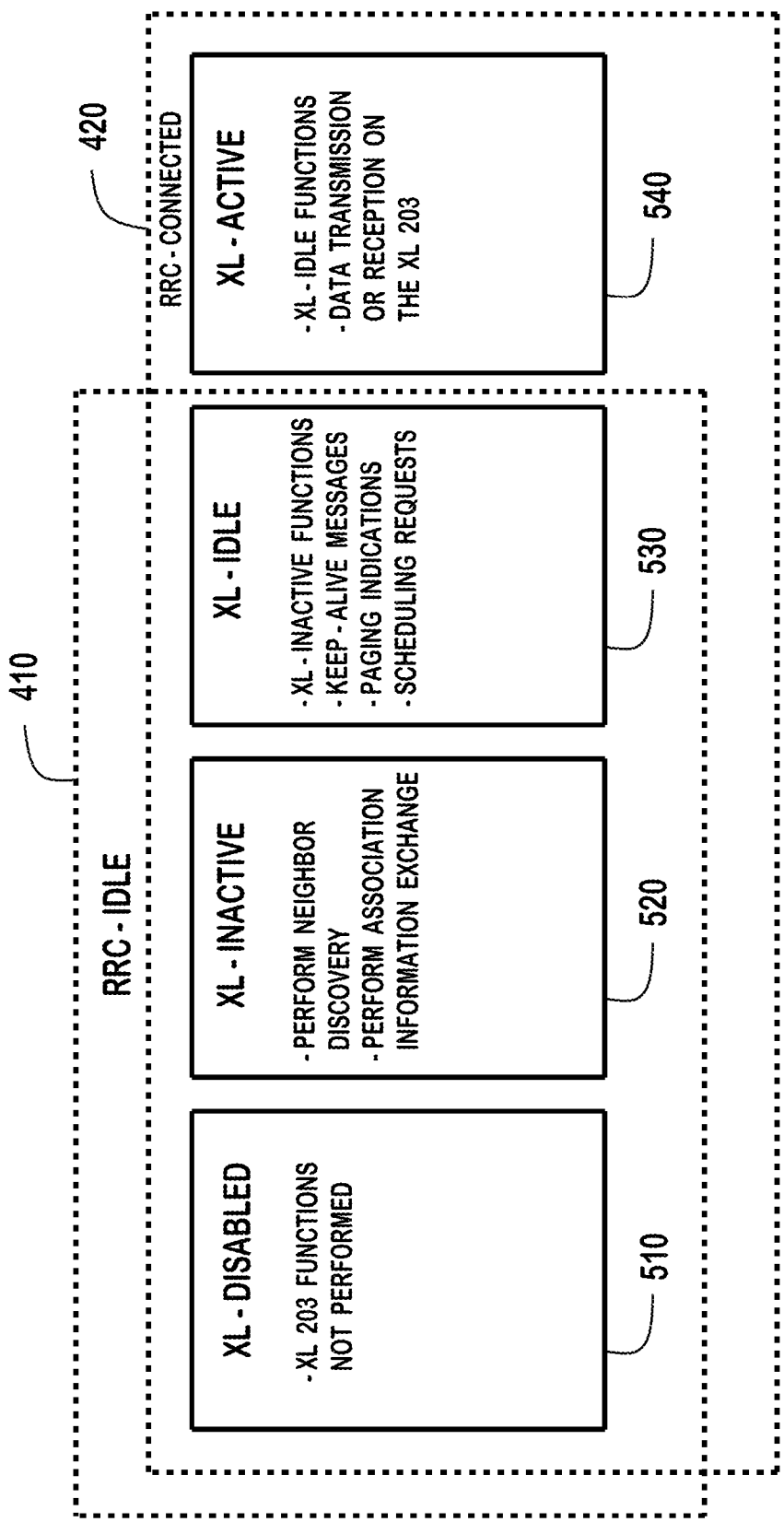
FIG. 5 shows the RRC substates of a WTRU.

FIG. 5 shows the RRC substates of a WTRU 102. The WTRU 102 may be in an XL-Disabled substate 510, XL-Inactive substate 520, XL-Idle substate 530, or XL-Active substate 540. The WTRU 102 may be in any one of the four substates 510-540 when the WTRU 102 is in the RRC-CONNECTED state 420. When the WTRU is in the RRC-IDLE state 410, on the other hand, the WTRU 102 may be in the XL-Disabled substate 510, XL-Inactive substate 520, or XL-Idle substate 530, but not in the XL-Active substate 540.

A WTRU 102 in the XL-Disabled substate 510 does not perform functions associated with the XL 203. For example, the WTRU 102 may not be capable of performing functions associated with the XL 203, or may be capable of performing the function but may be configured to have the functions disabled. Because the WTRU 102 may still be able to perform functions on the TRL 204, or the direct TRL 205, the WTRU 102 may be in an RRC-IDLE state 410 or an RRC-CONNECTED substate 420.

A WTRU 102 in the XL-Inactive substate 520 may perform neighbor discovery, association information exchange (e.g., transmitting or receiving association information messages), transmission or reception of a selected as H-WTRU 202 message, or basic system information but may not be capable of transmitting or receiving keep-alive message or transmitting or receiving data on the XL 203.

A WTRU 102 in the XL-Idle substate 530 may perform all the functions the WTRU 102 may perform in the XL-Inactive substate 520 in addition to transmitting or receiving keep-alive messages, paging indications, and scheduling requests, as will be described in further detail herein. A T-WTRU 201 in the XL-Idle substate 530 may have formed association with a H-WTRU 202 but may not be transmitting or receiving user communication data.

A WTRU 102 in the XL-Active substate 540 may perform all functions associated with the XL 203, including transmitting or receiving data on the XL 203. A WTRU 102 may transition between the RRC states 410-420 and the XL substates 510-540.

Figure 6:
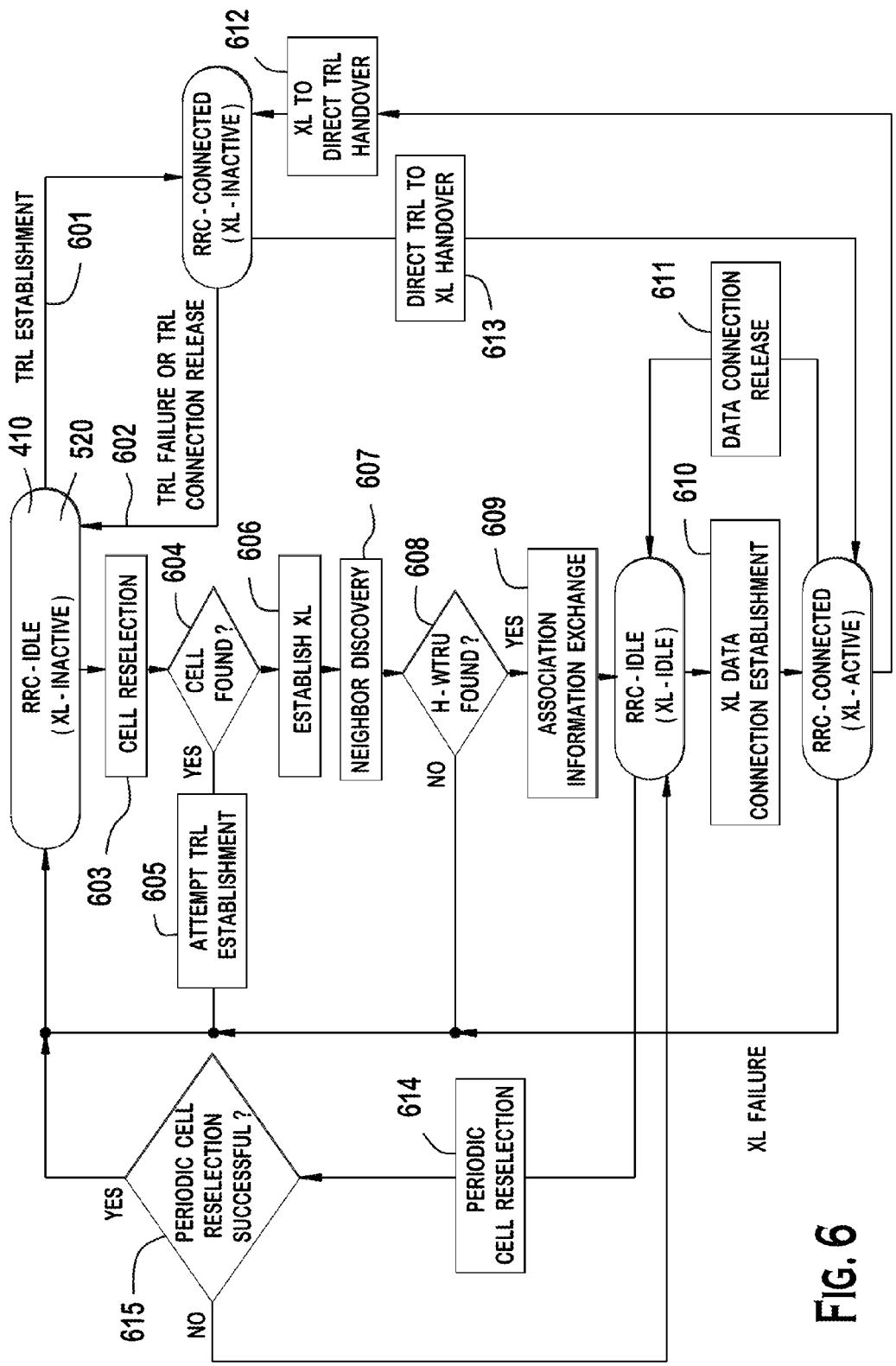
FIG. 6 shows an RRC state transition diagram for a WTRU.

FIG. 6 shows an RRC state transition diagram for a WTRU 201. A WTRU 102 may be in the XL-Inactive substate 520 in the RRC-IDLE state 410. If the WTRU 102 establishes a TRL 204 with a base station 114 601, the WTRU 102 transitions to the RRC-CONNECTED state 420 while remaining in the XL-Inactive substate 520. If the TRL 204 fails or the TRL 204 is released 602, the WTRU 102 transitions back to the RRC-IDLE state 410 and remains in the XL-Inactive substate 520.

The WTRU 102 attempts cell reselection 603 in order to establish a TRL 204 via a different or a new cell. If a new cell is found 604, the WTRU 102 may attempt to establish a TRL 204 with the new cell 605. If a new cell is not found 604, the WTRU 102 attempts to establish an XL 203 606 as a T-WTRU 201. The T-WTRU 201 performs neighbor discovery 607. To perform neighbor discovery, the T-WTRU 201 may transmit a NDIT and await a NDRT from a H-WTRU 202. If the H-WTRU 202 is not found 608, the T-WTRU 201 remains in the XL-Inactive substate 520 of the RRC-IDLE state 410.

If the H-WTRU 202 is found 608, the T-WTRU 201 and H-WTRU 202 form association 609. Following association formation 609, the T-WTRU 201 transitions to the XL-Idle substate 530.

When in the XL-Idle 530 substate, if an XL 203 data connection is used 610, the T-WTRU 201 transitions to the XL-Active substate 540 of the RRC-CONNECTED 420 state, and if the XL 203 data connection is later released 611, the T-WTRU 201 transitions back to the XL-Idle substate 430.

Further, when the T-WTRU 201 is in XL-Active substate 540 of the RRC-CONNECTED 420 state, a handover may be performed between from the XL 203 to the direct TRL 205 612 and the T-WTRU 201 uses the direct TRL 205 and transitions to the XL-Inactive 420 substate. Similarly, if a direct TRL 205 to XL 203 handover is performed 613, the WTRU 102 transitions to the XL-Active 540 substate. Furthermore, at any point in the state transition diagram, periodic cell re-selection may be performed 614, and if the periodic cell reselection is successful 615 and a direct TRL 205 is found, the WTRU 102 may transition to an XL-Inactive substate 520.

Figure 7:
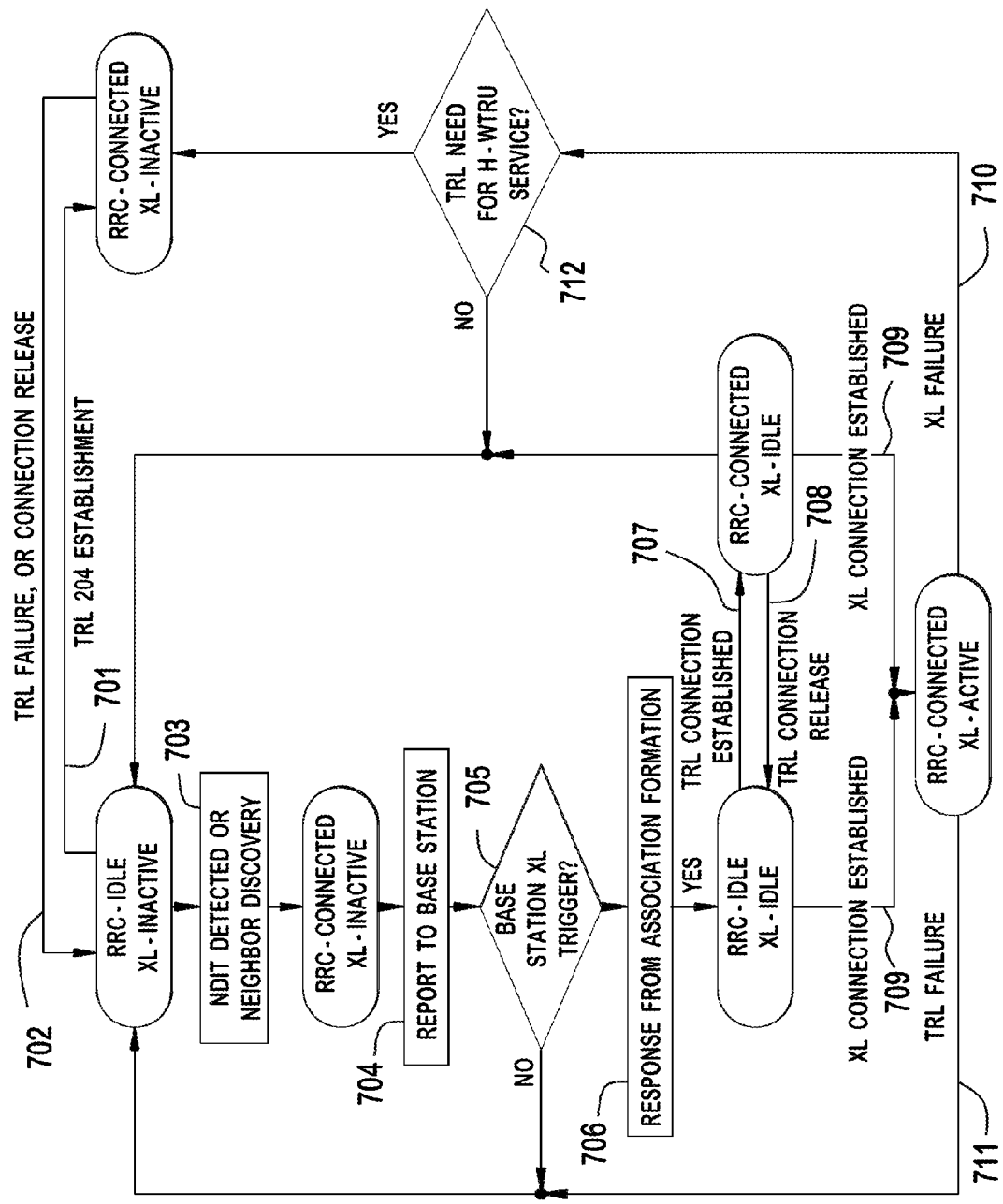
FIG. 7 shows an RRC state transition diagram for a H-WTRU.

FIG. 7 shows an RRC state transition diagram for a H-WTRU 202. A H-WTRU 202 is in the XL-Inactive substate 520 of the RRC-IDLE state 410. If the H-WTRU 202 establishes the TRL 204 701, the H-WTRU 202 transitions to the RRC-CONNECTED state 420 while remaining in the same XL substate. While in the RRC-CONNECTED state 420, the H-WTRU 202 releases the TRL 204 or an RFL is declared on the TRL 204 702 and, as such, the H-WTRU 202 transitions back to the RRC-IDLE state 410.

The H-WTRU 202 detects that a T-WTRU 201 is attempting to discover the H-WTRU 202 (or detects an NDIT from the T-WTRU 201) 703 and the H-WTRU 202 transitions to the RRC-CONNECTED state 420 in order to report neighbor discovery or NDIT detection to a base station 114 704. If the base station 114 does not trigger XL 203 establishment 705, the H-WTRU 202 transitions back to the RRC-IDLE state 410. However, if the base station 114 triggers XL 203 establishment, the H-WTRU 202 forms association 705 with the T-WTRU 201. After association is formed 705, the H-WTRU 202 transitions to the XL-Idle substate 530.

If the TRL 204 connection is established 706, the H-WTRU 202 may transition to the RRC-CONNECTED state 420 and use the TRL 204 and when the TRL 204 is released or fails, transition back to the RRC-IDLE state 410.

The H-WTRU 202 remains in the XL-Idle substate 530, as data communication is not yet performed on the XL 203.

If the XL 203 connection is established 708, the H-WTRU 202 transitions to the XL-Active substate 540 in the RRC-CONNECTED state 420 and performs functions related to data communication. If the XL 203 fails 709, the H-WTRU 202 transitions to the XL-Inactive substate 520, whereby H-WTRU 202 remains in the RRC-CONNECTED state 420 if the H-WTRU requires the TRL 204 for its service 711 or transitions to the RRC-IDLE state 410 if the H-WTRU does not require the TRL 204 for its service 711.

If the TRL 204 fails, on the other hand, the XL 203 is not serviced and the H-WTRU 202 transitions to the XL-Inactive substate 520 and the RRC-IDLE state 410.

Whereas in FIG. 7 the H-WTRU 202 awaited a base station 114 trigger before forming an association with the T-WTRU 201, the H-WTRU 202 may alternatively form the association without a need for a base station 114 trigger and instead require a base station 114 trigger for XL 203 connection establishment.

Figure 8:
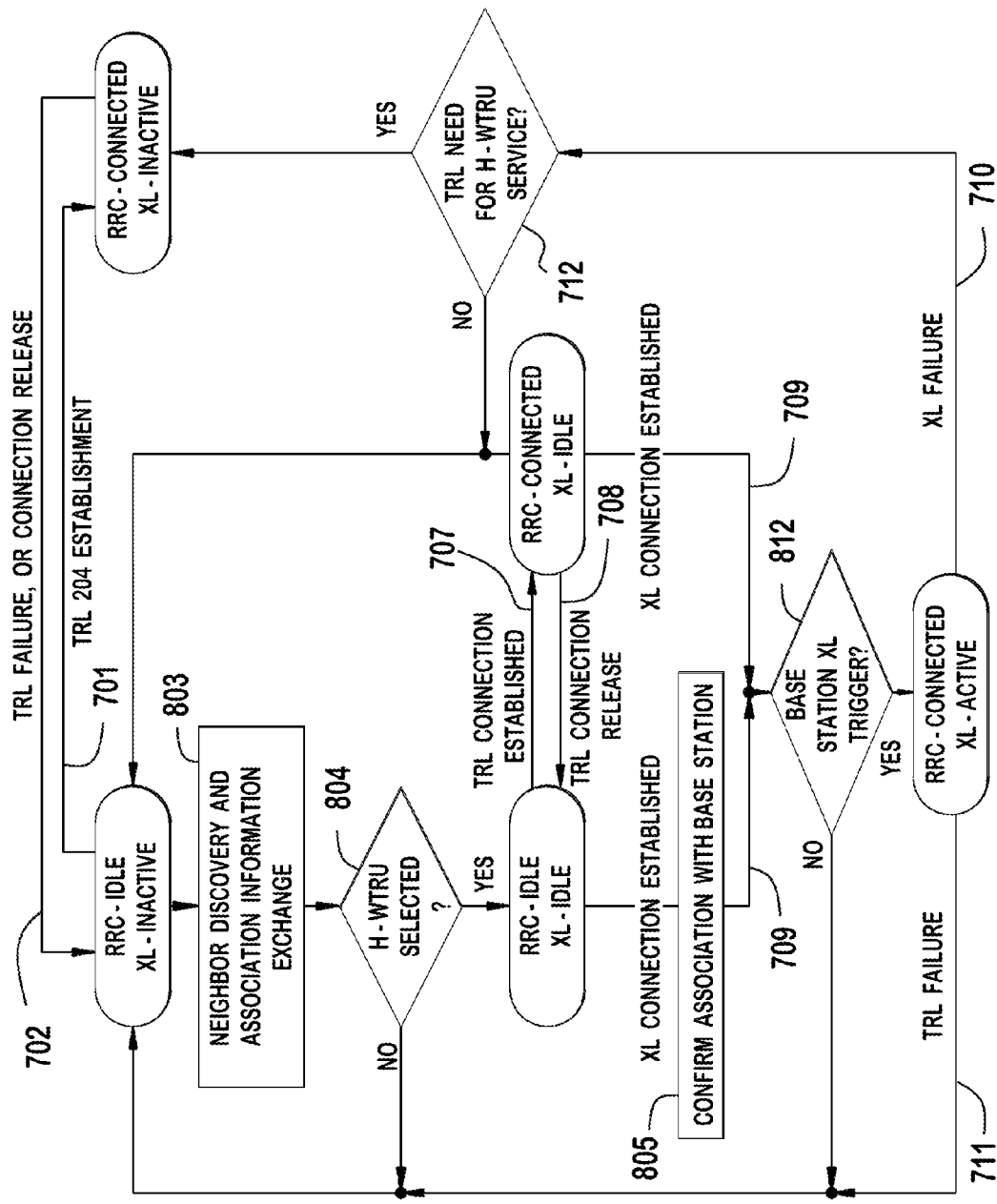
FIG. 8 shows an RRC state transition diagram for a H-WTRU.

FIG. 8 shows an RRC state transition diagram for a H-WTRU 202. A H-WTRU 202 is in the XL-Inactive substate 520 of the RRC-IDLE state 410. If the H-WTRU 202 establishes the TRL 204 701, the H-WTRU 202 transitions to the RRC-CONNECTED state 420 while remaining in the same XL substate. While in the RRC-CONNECTED state 420, the H-WTRU 202 releases the TRL 204 or an RFL is declared on the TRL 204 702 and, as such, the H-WTRU 202 transitions back to the RRC-IDLE state 410.

The H-WTRU 202 performs neighbor discovery and association information exchange with the T-WTRU 201 803. In which case, the H-WTRU 202 may receive an NDIT, respond with an NDRT, and exchange association information messages. If the H-WTRU 202 is not selected by the T-WTRU 804, the H-WTRU 202 transitions back to the RRC-IDLE state 410. However, if the H-WTRU 202 is selected by the T-WTRU 804, the H-WTRU 202 transitions to the XL-Idle substate 530.

If the TRL 204 connection is established 706, the H-WTRU 202 may transition to the RRC-CONNECTED state 420 and use the TRL 204 and when the TRL 204 is released or fails 707, transition back to the RRC-IDLE state 410.

The H-WTRU 202 confirms the association with T-WTRU 201 with the base station 114 805. If the base station triggers the XL 812, the H-WTRU 202 transitions to the XL-Active substate 540 in the RRC-CONNECTED state 420. If the base station does not trigger the XL 812, the H-WTRU 202 transitions to the XL-Inactive substate 520 in the RRC-IDLE state 410.

When in the XL-Active 540 substate and the RRC-CONNECTED 420 state, if the XL 203 fails 709, the H-WTRU 202 transitions to the XL-Inactive substate 520, whereby H-WTRU 202 remains in the RRC-CONNECTED state 420 if the H-WTRU requires the TRL 204 for its service 711 or transitions to the RRC-IDLE state 410 if the H-WTRU does not require the TRL 204 for its service 711. If the TRL 204 fails, on the other hand, the XL 203 is not serviced and the H-WTRU 202 transitions to the XL-Inactive substate 520 and the RRC-IDLE state 410.

A T-WTRU 201 in the XL-Idle substate 530 may attempt to establish a data connection over the XL 203 as described with reference to FIGS. 9A and 9B. The establishment of the data connection over the XL is referred to herein as origination and may be performed because the T-WTRU 201 seeks to transmit data to the base station 114 or in response to a page.

Figure 9A:
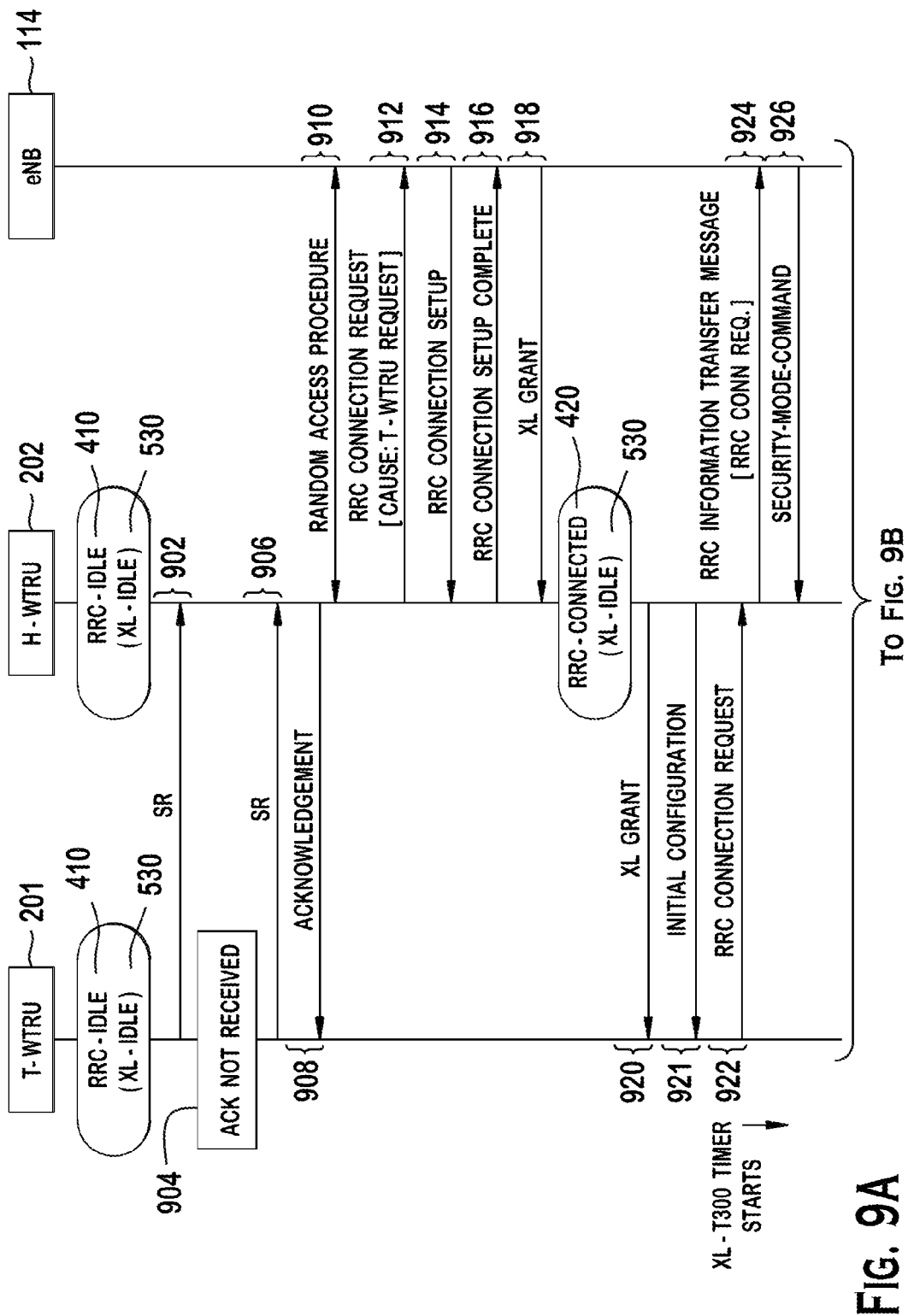
FIGS. 9A and 9B show a messaging diagram for establishing a data connection over the XL for a T-WTRU in the XL-Idle substate.
Figure 9B:
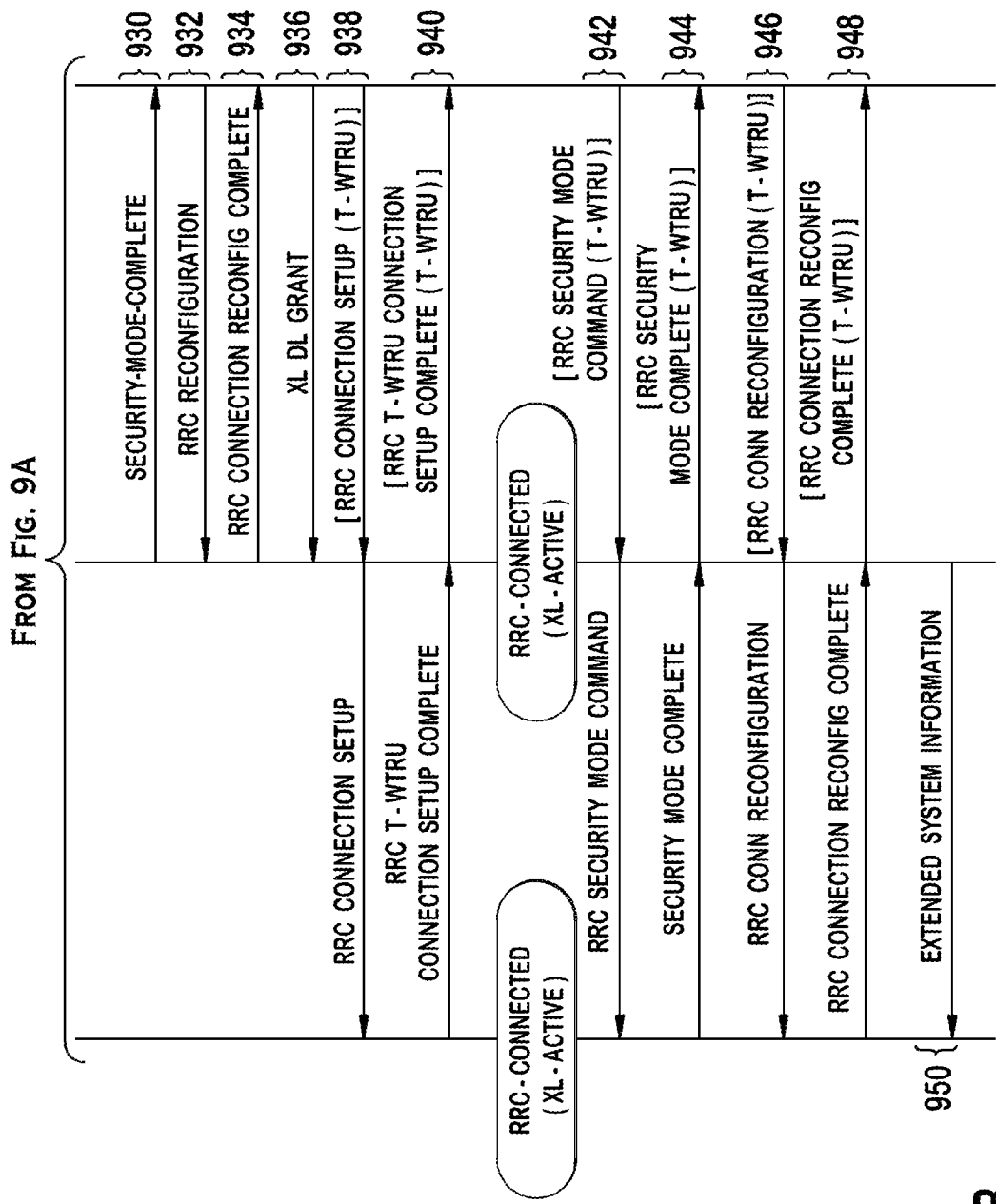

FIGS. 9A and 9B show a messaging diagram for establishing a data connection over the XL 203 for a T-WTRU 201 in the XL-Idle substate 530. Association has been formed between the T-WTRU 201 and the H-WTRU 202 and the T-WTRU 201 and the H-WTRU 202 are both in XL-Idle substate 530. Further, the T-WTRU 201 and the H-WTRU 202 may exchange keep alive messages and, thus, remain in the XL-Idle substate 530.

The T-WTRU 201 sends a scheduling request (SR) to the H-WTRU 202 902 to request resource allocation for the XL 203 and await receipt of an acknowledgement. If an acknowledgement is not received 904, the T-WTRU 201 retransmits the SR to the H-WTRU 202 906. The T-WTRU 201 may be configured to retransmit the SR a predetermined number of times until an acknowledgement is received 908.

The transmit power associated with the SR may be determined based on a received power of the keep alive messages exchanged between the T-WTRU 201 and the H-WTRU 202. Further, because the T-WTRU 201 and the H-WTRU 202 may be already time-synchronized in order to exchange keep alive messages, a random access procedure for the transmission of the SR may not be required and instead the T-WTRU 201 may transmit the SR in a time period where the H-WTRU 202 is configured to receive keep alive messages from the T-WTRU 201.

Further, the SR may be scrambled using an identity that is derived from the same root used for NDIT transmission from the T-WTRU 201 to the H-WTRU 202 when neighbor discovery is performed.

After receiving the SR from the T-WTRU 201, the H-WTRU 202 communicates with the base station 114 in order to obtain permission and configuration to act as a relay for the XL 203 between the T-WTRU 201 and the base station 114. A random access procedure may be performed between the T-WTRU 201 and the base station 114 910 if the H-WTRU 202 is in the RRC-IDLE state 410. The H-WTRU 202 sends an RRC connection request to the base station 114 912. The RRC connection request may include a cause code indicating that that the RRC connection request is sent because the T-WTRU's 201 seeks a connection on the XL 203.

Upon receiving the RRC connection request, the base station 114 establishes a signaling radio bearer (SRB), referred to herein as SRB1, for use by the T-WTRU 201. The base station sends an RRC connection setup message to the H-WTRU 202 914, which may include information associated with SRB1, or a radio network temporary identifier (RNTI) for use on the XL 203 (referred to herein as XL-RNTI). The XL-RNTI is used for communication identification and interference management as XL resources may shared (for example, with other XLs of other WTRUs).

The H-WTRU 202 sends an RRC connection setup complete message to the base station 114 916. The base station 114 sends a grant for uplink on the XL 203 to the H-WTRU 202 918. The uplink grant for the XL 203 may be used by the T-WTRU 201 to transmit an RRC connection request message. The base station 114 may also provide a downlink XL 203 grant, which may be used for downlink data transmissions between the H-WTRU 202 and the T-WTRU 201. The H-WTRU 202 transitions to the XL-Idle substate 530 and sends the uplink grant for the XL 203 to the T-WTRU 201 920. The H-WTRU 202 also sends an initial configuration message to the T-WTRU 201 921. The initial configuration message may include the XL-RNTI and configuration information for the T-WTRU 201 to send an RRC connection request message.

The T-WTRU 201 sends the RRC connection request to the H-WTRU 202 922. The RRC connection request is sent on a resource provided by the uplink grant for the XL 203. The RRC connection request uses the XL-RNTI and the configuration information provided by the H-WTRU 202. The RRC connection request may include a cause for link establishment, for example, originating data. The H-WTRU 202 relays the RRC connection request to the base station 114 through an RRC XL information transfer message 924. Further, the H-WTRU 202 and the base station 114 exchange security mode messages 926, 928.

Based on the RRC connection request, the base station 114 configures layers of the T-WTRU 201 stack. Further, the base station 114 sets up radio bearers for the XL 203 for reconfiguring the T-WTRU 201 and a mapping between the radio bearers for the XL 203 and corresponding radio bearers on TRL 204 is determined and provided to the H-WTRU 202, as described with reference to FIG. 10.

The base station sends an RRC reconfiguration message to the H-WTRU 202 930 for configuring the radio bearers between the base station 114 and the H-WTRU 202. After configuring the H-WTRU's 202 radio bearers in accordance with the RRC reconfiguration message, H-WTRU 202 transmits an RRC connection reconfiguration complete message 932 to indicate that the radio bearers have been configured. The base station 114 also sends a XL 203 downlink grant to the H-WTRU 202 934 to allocate resources for transmission on the XL 203.

The base station 114 sends an RRC connection setup message to the T-WTRU 201 936. The RRC connection setup message is relayed to the T-WTRU 201 by the H-WTRU 202 936. The RRC connection setup message may be transmitted over a DRB to the H-WTRU 202, which then relays it over SRB1 to the T-WTRU 201. The T-WTRU 201 sends an RRC connection setup complete message to the base station 114 938, which is relayed by the H-WTRU 202 938. After completion of RRC setup, the T-WTRU 201 and the H-WTRU 202 transition to the XL-Active substate 540 of the RRC-CONNECTED 420 state.

As security is also established between the T-WTRU 201 and the base station 114 using security mode command (SMC), for example, of the LTE communications protocol, and security messages may be exchanged 940, 942. Further, RRC connection reconfiguration messages may be exchanged between the base station 114 and the T-WTRU 201 944, 946. Further, in addition to basic system information that was exchanged during association formation, extended system information may also be sent to the T-WTRU 201 from the H-WTRU 202 948. The extended system information message may be an RRC message and may be unencrypted.

Figure 10:
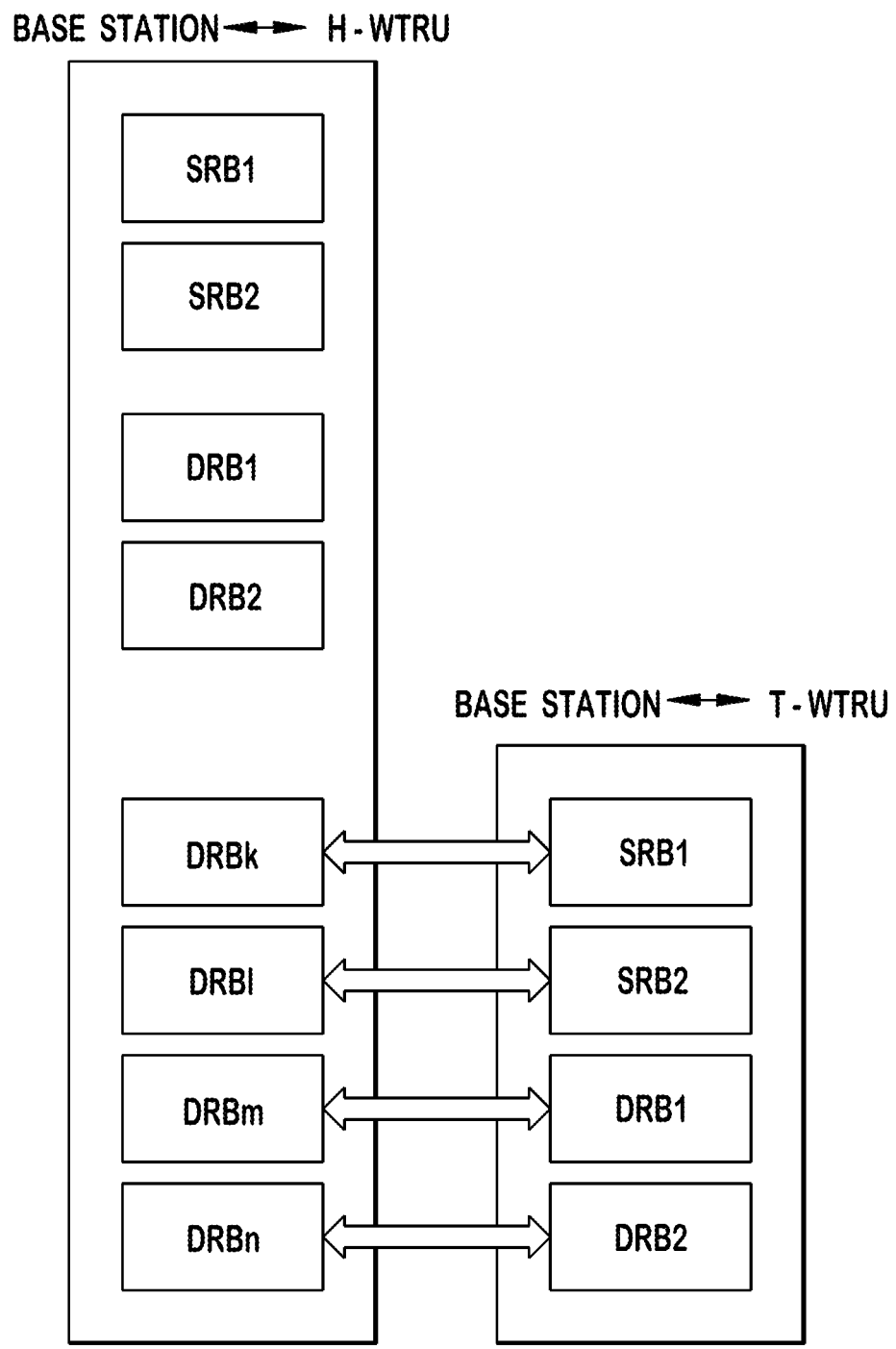
FIG. 10 shows a mapping of the radio bearers on the TRL and the XL.

FIG. 10 shows a mapping of the radio bearers on the TRL and the XL. The H-WTRU's 202 data bearers DRBk, DRBl, DRBm and the like map to the T-WTRU's 201 bearers SRB0, SRB1, DRB1, and the like, respectively, where k, l, and m may be arbitrary numbers from a set of data bearer identifiers, but non-overlapping with the data bearers for H-UE's own services.

The radio bearers (RBs) between the base station 114 and the H-WTRU 202 and the RBs between the base station 114 and the T-WTRU 201 may co-exist on the TRL 204. As such, the RBs intended for the T-WTRU 201 may be distinguishable from the RBs intended for the H-WTRU 202. In addition, the signaling bearer data intended for the T-UE may not convey a meaning to the H-WTRU 202 and may be passed on to the T-WTRU 201. The T-WTRU 201 signaling bearers may be mapped onto the data bearers of the H-WTRU 202, as shown in FIG. 10.

In LTE, radio bearer mapping may be configured using a field the RadioResourceConfigDedicated information element (IE). The field may be as follows: RadioResourceConfigDedicated:{

```
...
DRB-ToAddMod:{
...
xl-mapping: { 0, 1} % 0 = SRB, 1 = DRB
xl-mapping-id: {1,2,...} % SRB# / DRB#} ... }
```

In LTE communication systems, a DRB-Identity field is used to identify a DRB. The DRB-ToAddMod IE identifies the DRB number on the TRL 204 for the H-WTRU 202. The xl-mapping field indicates whether a DRB is mapped to an SRB or DRB on the XL 203, and the xl-mapping-id field provides the corresponding SRB number or DRB number for the XL 203.

For XL 203 radio bearers, the H-WTRU 202 may be provided with a partial RRC configuration, since only a portion of the protocol stack (for example, PHY, MAC, partial RLC) may be terminated at the H-WTRU 202. Higher layers of protocol (for example, PDCP and beyond) may be terminated at the base station 114 and T-WTRU 201. Further, XL DRBs for the H-WTRU 202 may only need to be configured with NULL encryption since underlying T-WTRU 201 bearers may carry their own encryption.

The T-WTRU 201 may maintain a timer when transmitting the RRC connection request message 924. The value of the timer may be conveyed in Basic System Information (for example, under a WTRU-TimersAndConstants IE in SIB2). Further, the T-WTRU 201 and the H-WTRU 202 may transmit a buffer status report (BSR) and receive additional grants, if desired. A BSR may include information associated with the amount of data awaiting transmission.

Origination by a T-WTRU 201 may also be performed when a H-WTRU 202 is in an RRC-CONNECTED state 420, as described with reference to FIG. 11. Origination is performed when a T-WTRU 201 seeks a data connection establishment. Because the H-WTRU 202 is already in the RRC-CONNECTED state 420, an initial data connection for the H-WTRU 202 on the TRL 204 need not be established.

Figure 11:
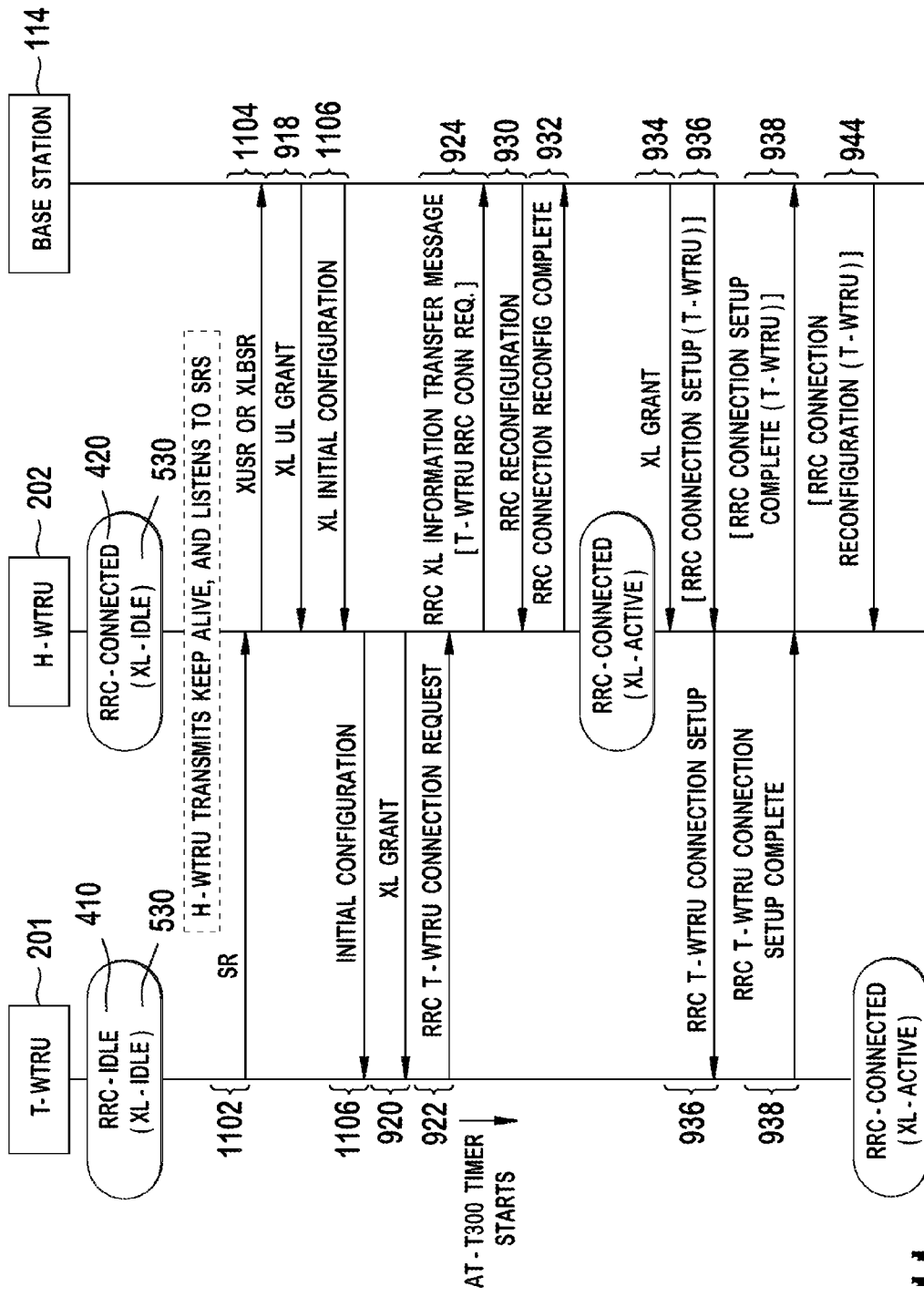
FIG. 11 shows a messaging diagram for origination by a T-WTRU in XL-Idle substate and a H-WTRU in an RRC-CONNECTED state.

FIG. 11 shows a messaging diagram for origination by a T-WTRU 201 in XL-Idle substate 530 and a H-WTRU in an RRC-CONNECTED state 420. The T-WTRU 201 and the H-WTRU 202 are both in the XL-Idle 530 substate and, as such, the H-WTRU 202 transmits keep-alive messages to the T-WTRU 201 and listens to SRs from the T-WTRU 201. Further, the H-WTRU 202 is in the RRC-CONNECTED state 420 as the H-WTRU 202 has an established data connection over the TRL 204.

The T-WTRU 201 seeks to establish a data connection over the XL 203. The T-WTRU 201 sends a SR to the H-WTRU 202 1102. The H-WTRU 202 transmits a XL 203 BSR with a configurable default buffer size or a XL 203 SR to the base station 114 1104. It is noted that because the H-WTRU 202 is in RRC-CONNECTED state 420 with a data connection on the TRL 204 established, the H-WTRU 202 may only be required to send the an SR to the base station 114 instead of an RRC connection request with a cause code as described with reference to numeral 912 in FIGS. 9A and 9B when the H-WTRU 202 is the RRC-IDLE state 410.

The base station 144 recognizes the XL BSR as an attempt to establish a XL data connection, and sends a XL 203 grant to the H-WTRU 202. The base station 114 provides an initial configuration for the XL 203 with the AT-RNTI in the RRC initial configuration message 1106. The initial configuration message is relayed to the T-WTRU 201 by the H-WTRU 202 1108. The remainder of the messaging diagram of FIG. 11 is as that described with reference to FIGS. 9A and 9B. It is noted that after RRC reconfiguration 930, 932, the H-WTRU 202 transitions to the XL-Active substate 540 and after the RRC connection setup 936, 938, the T-WTRU 201 transitions to the XL-Active substate 540 of the RRC-CONNECTED state 420.

In termination, also referred to as mobile call termination, a T-WTRU 201 is notified to establish a data connection over the XL 203 due to a need for the data connection, for example, an incoming call directed to the T-WTRU 201. The T-WTRU 201 and the H-WTRU 202 may be in the RRC-IDLE state 410 or the RRC-CONNECTED state 420 when termination occurs.

A T-WTRU 201 may be paged or sent a paging message to indicate termination. The H-WTRU 201 being in the RRC-IDLE state 410 may receive the paging message and relay the paging to the T-WTRU 201. The H-WTRU 202 may further send a paging indication to the T-WTRU 201 to indicate to the T-WTRU 201 that a paging message is sent to the T-WTRU 201. It is noted that receipt of the page by the H-WTRU 202 is facilitated by the fact that when the H-WTRU 202 is in the RRC-IDLE state 410, the H-WTRU 202 is time-synchronized with the T-WTRU 201 and has a DRX cycle that is synchronous with the DRX cycle of the T-WTRU 201. That is, the T-WTRU 201 and the H-WTRU 202 may share the same wake and sleep cycles in DRX.

Further, the page may include a System Architecture Evolution (SAE) temporary mobile subscriber identity (S-TMSI) associated with the XL 203, referred to herein as XL-S-TMSI. The H-WTRU 202 may detect the page based on the XL-S-TMSI, which may exchanged between the T-WTRU 201 and the H-WTRU 202 in association formation.

Upon receipt of the paging indication or the paging message from the H-WTRU 202, the T-WTRU 201 may perform origination as described with reference to FIGS. 9A and 9B when the H-WTRU 201 is in the RRC-IDLE state 410 or FIG. 11 when the H-WTRU 202 is in the RRC-CONNECTED state 420.

Mobile call termination is described herein for an XL 203 with a H-WTRU 202 in the RRC-CONNECTED state 420. When the H-WTRU 202 is in the RRC-CONNECTED state 420, the H-WTRU 202 may receive a page using the H-WTRU's established TRL 204. The H-WTRU 202 recognizes the page as being intended to the T-WTRU 201 based on the XL-S-TMSI associated with the page. The H-WTRU 202 conveys a paging indication to the T-WTRU 201. The T-WTRU 201 may perform call origination in accordance with the messaging diagram described with reference to FIG. 11 herein.

During lulls in data transmission or reception, a T-WTRU 201 or a H-WTRU 202 in the RRC-CONNECTED state 420 transitions into discontinuous reception (DRX) as opposed to transitioning to the RRC-IDLE state 410. DRX allows the T-WTRU 201 and the H-WTRU 202 to conserves energy without transitioning to the RRC-IDLE state 410.

DRX may comprise a short cycle and a long cycle and the T-WTRU 201 and the H-WTRU 202 may be configured, using RRC configuration, for example, with a short cycle timer associated with the short cycle and a long cycle time associated with the long cycle. Further, the T-WTRU 201 and the H-WTRU 202 may be configured with a DRX offset value that specifies the beginning of the short and long cycles as a function of a sequence frame number (SFN). The DRX offset value may be also shifted for the T-WTRU 201 to account for any decode and forward delay experienced due to the H-WTRU 202 acting as a relay. The shift in the DRX offset value may be configured as part of basic system information or RRC signaling.

As described herein radio link failure (RLF) may be declared on a radio link, such as XL 203, TRL 204, or direct TRL 205 when conditions on the radio link deteriorate or when problems are detected on the radio link. For example, a T-WTRU 201 with a direct TRL 205 may declare RLF on the direct TRL 205 upon deterioration of conditions on the direct TRL. The RLF may be declared in accordance with the procedures of the air interface of the radio link, whereby if the air interface is an LTE or LTE-A air interface, the procedures of LTE or LTE-A dictate declaring the RTF. When an RTF is declared a WTRU may attempt to establish to reestablish a connection or may attempt cell or base station reselection in order to obtain network access.

When an RLF is declared on the TRL 204, on the other hand, the XL 203 may be affected as the XL 203 depends on the TRL 204 for providing access to the T-WTRU 201. For example, RLF of the TRL 204 may cause RFL of the XL 203. A H-WTRU 202 may be configured to cease operation on the XL 203 as a result of the RLF of the TRL 204 and a T-WTRU 201 may be configured to cease operation on the XL 203 and perform cell or base station reselection in order to receive access using a direct TRL 205. Further, the T-WTRU 201 may be configured to perform neighbor discovery in order to find a backup WTRU with which the T-WTRU 201 may establish a XL 203 for receiving network access as described with reference to FIG. 12.

Figure 12:
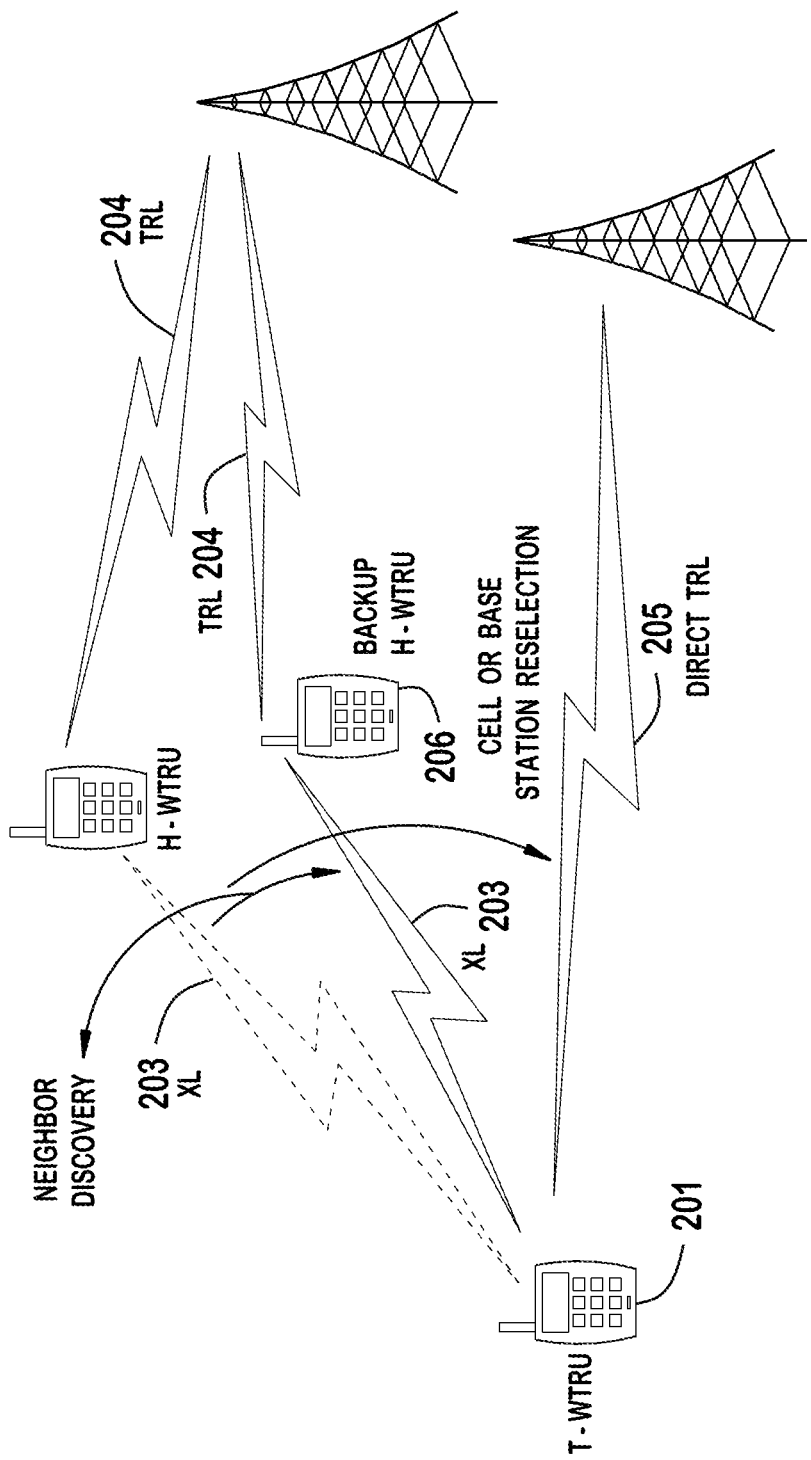
FIG. 12 shows neighbor discovery and cell or base station reselection by a T-WTRU.

FIG. 12 shows neighbor discovery and cell or base station reselection by a T-WTRU 201. The T-WTRU's 201 XL 203 with the H-WTRU 202 has failed due to RLF being declared on TRL 204 between the H-WTRU 202 and the base station 114 or due RLF being declared on the XL 203 itself (as depicted by the dashed lines in FIG. 12). The T-WTRU 201 may perform neighbor discovery in order to find a backup WTRU, referred to hereinafter as backup H-WTRU 206. A XL 203 may be established between the T-WTRU 201 and the backup H-WTRU 206, denoted by the solid lines in FIG. 12, and the T-WTRU 201 may receive access to the network using the backup H-WTRU's 206 TRL 204 with the base station 114. The T-WTRU 201 may also perform cell or base station reselection and a direct TRL 205 may be established between the T-WTRU 201 and the reselected base station 114 or the reselected cell. It is noted that the reselected cell may be associated with the base station 114 as opposed the reselected base station as depicted in FIG. 12.

Figure 13:
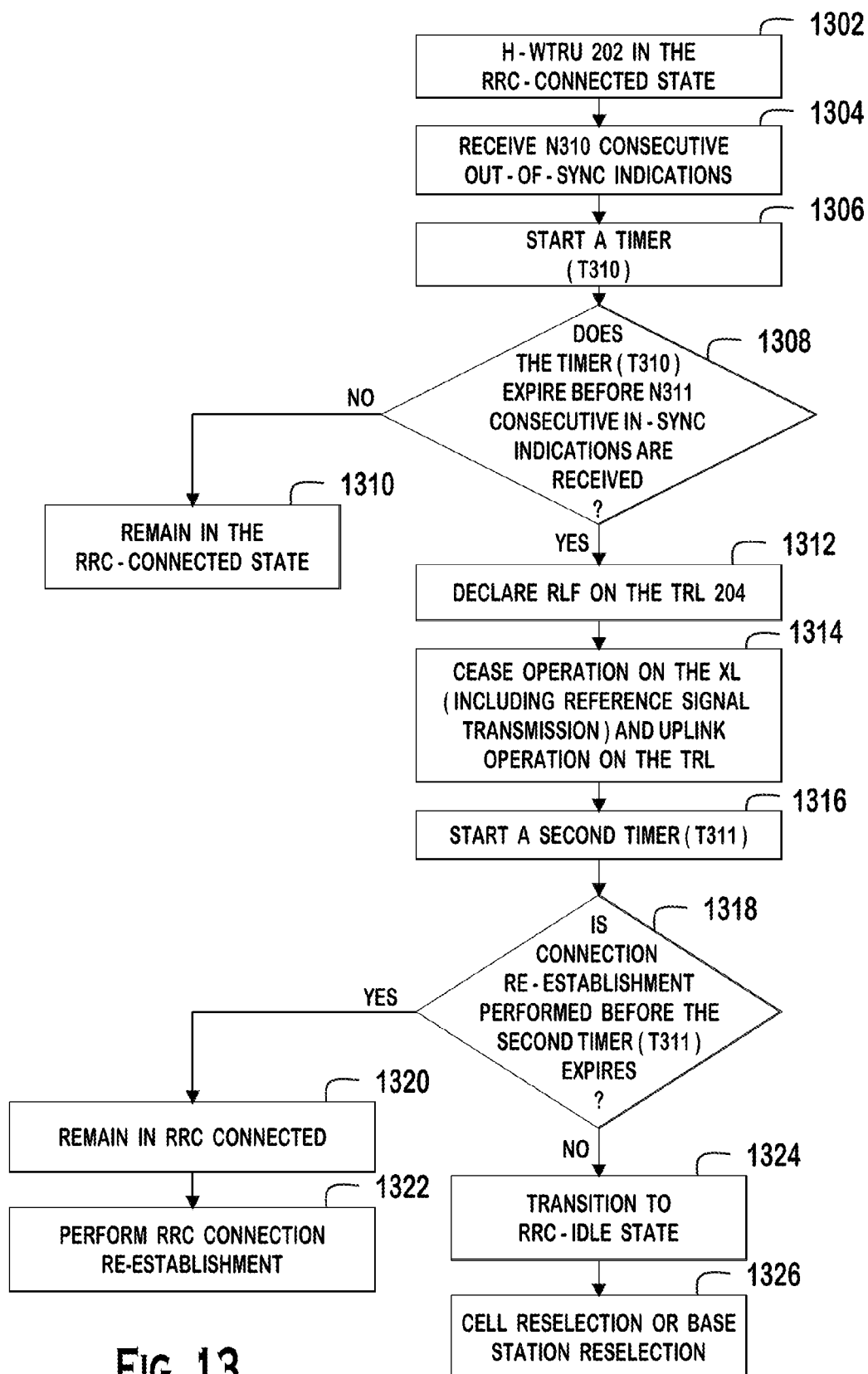
FIG. 13 shows a flow diagram for radio link failure (RLF) declaration on the TRL by a H-WTRU.

FIG. 13 shows a flow diagram for RLF declaration on the TRL 203 by a H-WTRU 202. The H-WTRU 202 is operating in the RRC-CONNECTED state 420 1302 and has a TRL 204 with the base station 114 (for example, in accordance with an LTE air interface) and a XL 203 with a T-WTRU 201. The H-WTRU 202 may receive N310 consecutive out-of-sync indications 1304, where N310 is a number. The H-WTRU 202 starts a timer 1306 (referred to as a T310 timer in LTE) and awaits receipt of N311 consecutive in-sync indications, where N311 is a number. If the timer does not expire before N311 consecutive in-sync indications are received 1308, the H-WTRU 202 remains in the RRC-CONNECTED state 420 1310 and continues operation on the XL 203 and TRL 204.

If the timer expires before N311 consecutive in-sync indications are received 1308, the H-WTRU 202 declares RLF on the TRL 204 1312. The H-WTRU 202 also ceases operation on the XL 203 including reference signal transmission and ceases uplink operation on the TRL 204 1314. The H-WTRU 202 then starts a second timer 1316, referred to as a T311 timer in LTE systems, and attempts connection reestablishment. If the connection is reestablished with the same cell as that associated with the TRL 204 or a different cell before the T311 timer expires 1318, the H-WTRU 202 remains in the RRC-CONNECTED state 420 1320 and performs RCC connection reestablishment procedures 1322. If connection is not reestablished before the T311 timer expires 1318, however, the H-WTRU 202 transitions to the RRC-IDLE state 410 1324 and performs cell or base station reselection 1326 in order to establish a TRL 204.

Alternatively, the H-WTRU 202 may continue XL 203 operations for a configurable period of time after the RFL is declared on the TRL 204. Accordingly, if connection reestablishment is for the H-WTRU 202 is successful, the association formed between the T-WTRU 201 and the H-WTRU 202 may be maintained and XL 203 operations may be continued with the T-WTRU 201 using the reestablished connection.

Figure 14:
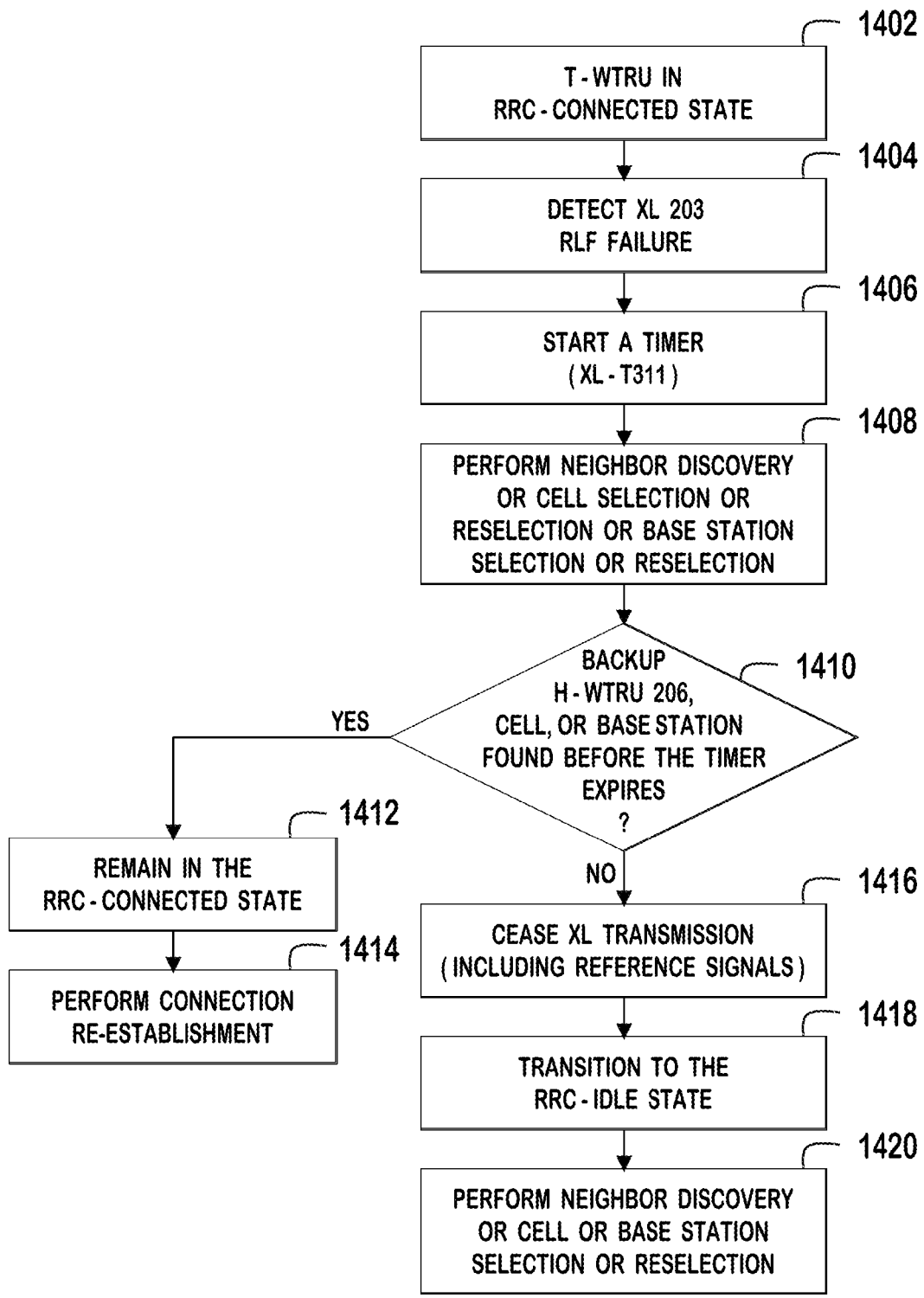
FIG. 14 shows a flow diagram for RLF detection on the XL by a T-WTRU.

FIG. 14 shows a flow diagram for RLF detection on the XL 203 by a T-WTRU 201. The T-WTRU 201 is in the RRC-CONNECTED state 420 1402 and has a XL 203 established. The T-WTRU 201 detects a RLF on the XL 203 1404. The T-WTRU 201 may detect the RLF because conditions have deteriorated on the XL 203 or because the H-WTRU 202 has ceased transmission on the XL 203 due RFL of the TRL 204.

The T-WTRU 201 starts a timer for the XL 203 1406. The timer is referred to herein as the XL-T311 timer. The T-WTRU 201 then performs neighbor discovery, or cell or base station selection or selection 1408 in order to find a backup H-WTRU 206, a cell, or a base station for radio link establishment. If the T-WTRU 202 finds a backup H-WTRU 206, a cell, or a base station before the timer expires 1410, the T-WTRU 201 remains in the RRC-CONNECTED state 420 1412 and performs connection reestablishment 1414. If the T-WTRU 202 does not find a backup H-WTRU 206, a cell, or a base station before the timer expires 1410, the T-WTRU 201 ceases transmission, including reference signal transmission, on the XL 203 1416 and transitions to the RRC-IDLE state 410. The T-WTRU 201 may then perform neighbor discovery, or cell or base station selection or selection 1420 in order to establish a new radio link for network access.

Figure 15:
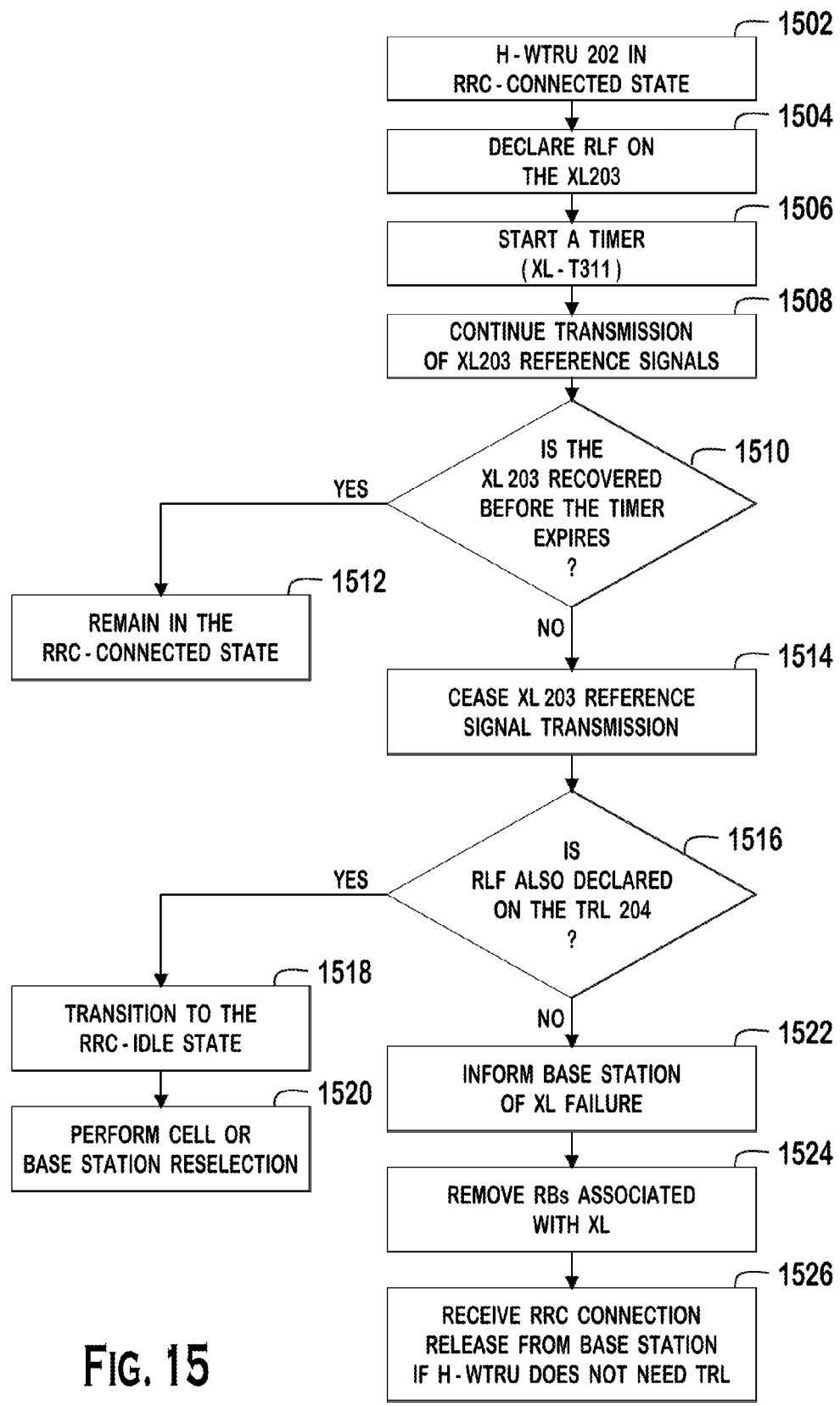
FIG. 15 shows a flow diagram for RLF declaration on the TRL by a H-WTRU.

FIG. 15 shows a flow diagram for RLF declaration on the TRL 203 by a H-WTRU 202. The H-WTRU 202 is operating in the RRC-CONNECTED state 420 1502 and has a TRL 204 with the base station 114 (for example, in accordance with an LTE air interface) and a XL 203 with a T-WTRU 201. The H-WTRU 202 declares RLF on the XL 203 1504 and starts a timer (for example, XL-T311) 1506. In the meantime, the H-WTRU 202 continues transmitting reference signals on the XL 203 1508.

If the XL 203 is recovered from RFL before the timer expires 1510, the H-WTRU 202 remains in the RRC-CONNECTED state 420. If, however, the XL 203 is not recovered before the timer expires 1510, the H-WTRU 202 ceases reference signal transmission on the XL 203 1514. If RLF is also declared on the TRL 204 1516, the H-WTRU 202 transitions to the RRC-IDLE state 410 1518 and performs cell or base station reselection 1520 in order to establish a TRL 204.

If RLF is not declared on the TRL 204 1516, the H-WTRU 202 informs the base station 114 of the XL 203 failure 1522, removes the radio bearers associated with the XL 203 1524. Further, the H-WTRU 202 receives an RRC connected release message from the base station 114 1526 (for example, in the event that the TRL 204 was only established or used to service the XL 203 and the H-WTRU 202 does not need the TRL 204).

RCC connection reestablishment may be utilized for reestablishment of a radio link within a predefined period of time from when the radio link fails (i.e., due to RLF failure being declared). Radio link reestablishment may be performed with the same party with which the radio link failed or with a different party. For example, a T-WTRU 201 that experienced RLF on XL 203 it has with the H-WTRU 202 may reestablish the XL 203 with the backup H-WTRU 206. Further, a T-WTRU 201 that experienced RLF on XL 203 it has with the H-WTRU 202 may perform connection reestablishment with the base station. The connection reestablishment may be in accordance with an LTE or LTE-A air interface, for example. The base station may determine that the T-WTRU 201 was previously accessing the network through a H-WTRU 202 and RRC connection reconfiguration may be performed in order for the T-WTRU 202 to use the direct TRL 205 with the base station instead of the XL 203.

Figure 16:
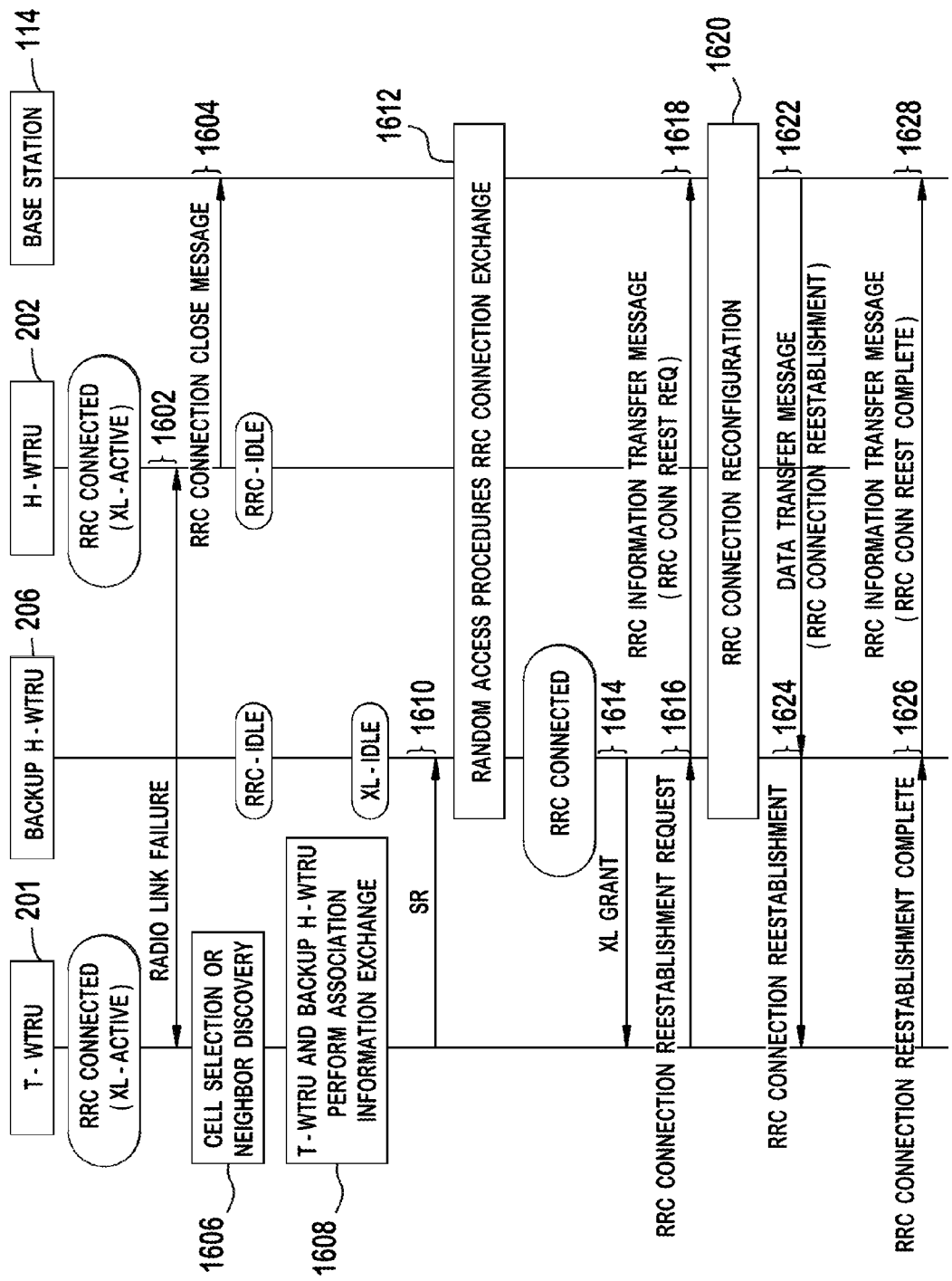
FIG. 16 shows a message flow diagram of connection reestablishment for a T-WTRU.

FIG. 16 shows a message flow diagram of connection reestablishment for a T-WTRU. The T-WTRU 201 has an XL with the H-WTRU 202. The H-WTRU 202 has a TRL 204 with the base station 114. The XL 203 fails 1602 and the T-WTRU 201 and the H-WTRU 202 may detect the failure. As a result, the H-WTRU 202 sends an RRC connection close message to the base station 1604 to terminate the TRL 204 (for example, in the event that the TRL 204 is not needed to provide connectivity for the H-WTRU's 202). As such, the H-WTRU 202 transitions to the RRC-IDLE state 410.

The T-WTRU 201 performs cell or base station selection or reselection 1606 in order to establish a direct TRL 205 with the base station 114. Further, the T-WTRU 201 also performs neighbor discovery 1606 in order to find a backup H-WTRU 206 through which the T-WTRU 201 may receive network connectivity. The cell or base station selection or reselection may be performed in parallel with neighbor discovery. Further, network or WTRU policy may dictate if or when cell or base station selection or reselection is interrupted or terminated upon successful discovery of a backup H-WTRU 206.

In FIG. 16, The T-WTRU 201 discovers the backup H-WTRU 206 and performs association information exchange with the backup H-WTRU 206 1608. The backup H-WTRU 206 transitions to the XL-Idle substate 530. The T-WTRU 201 sends an SR to the backup H-WTRU 206 1610 and receives an XL grant 1614. Further, the backup H-WTRU 206 performs a random access procedure and an RRC connection exchange with the base station 114 1612, as described with reference to numerals 910-918 in FIGS. 9A and 9B.

The T-WTRU 201 sends an RRC connection reestablishment request to the backup H-WTRU 206 1616 and the backup H-WTRU 206 relays the RRC connection reestablishment request to the base station 114 in an RRC information transfer message 1618. RRC connection reconfiguration is performed for the backup H-WTRU 206 1620, as described with reference to numerals 928-934 in FIGS. 9A and 9B. The base station 114 sends an RRC connection reestablishment message to the backup H-WTRU 206 1622, which is relayed to the T-WTRU 201 1624. Further, the T-WTRU 201 sends an RRC connection reestablishment complete message to the backup H-WTRU 206 1626, which is relayed to the base station 114 1628.

If cell or base station selection or reselection is successful, the T-WTRU 201 performs RRC connection reestablishment per the air interface, for example, LTE, of the air interface of the direct TRL 205. The base station 114 may determine or detect that the T-WTRU 201 has previously received connectivity via the XL 203 with the H-WTRU 202 and reconfigure the RRC connection to operate on the direct TRL 205.

As described with reference to FIG. 16, due to the RLF of the XL 203 with the H-WTRU 202, the T-WTRU 201 performs neighbor discovery in order to associate with the backup H-WTRU 206 prior to XL 203 establishment with the backup H-WTRU 206. Alternatively, the T-WTRU 201 may be configured to perform neighbor discovery and associate with the backup H-WTRU 206 while the XL 203 with the H-WTRU 202 is established. Having associated with the backup H-WTRU 206, the T-WTRU 201 may expediently establish the XL 203 with the backup H-WTRU 206 upon RLF of the XL 203 with the H-WTRU 202.

Figure 17:
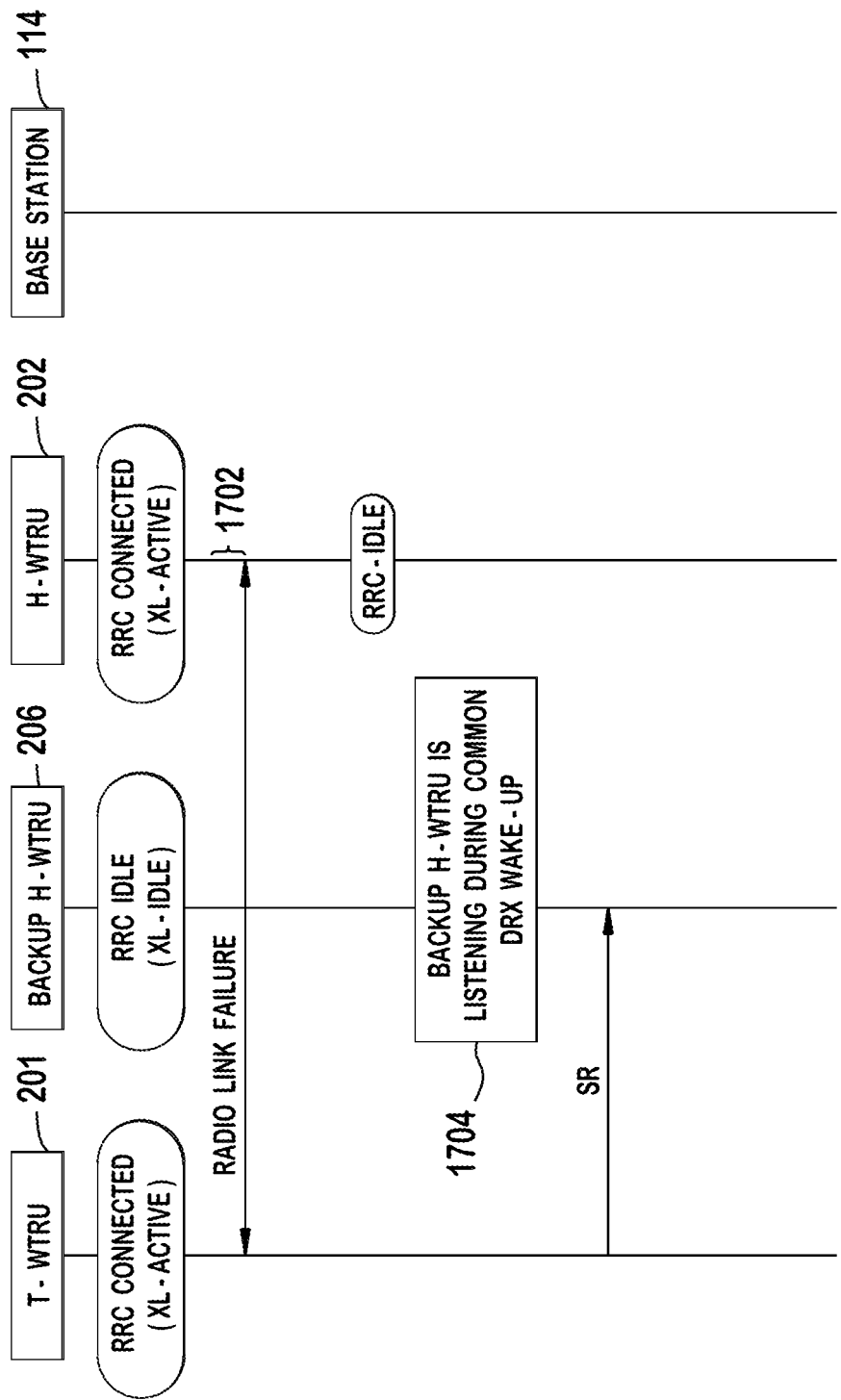
FIG. 17 shows a message flow diagram of connection reestablishment for a T-WTRU.

FIG. 17 shows a message flow diagram of connection reestablishment for a T-WTRU. The T-WTRU 201 has an XL 203 with the H-WTRU 202, which has a TRL 204 with the base station 114. The T-WTRU 201 and the H-WTRU 202 are both in the XL-Active 540 substate of the RRC-CONNECTED 420 state. Further, the T-WTRU 201 has associated with the backup H-WTRU 206 and the T-WTRU 201 and the backup H-WTRU 206 may be exchanging keep alive messages. The backup H-WTRU 206 is in the XL-Inactive substate 530.

The XL 203 of the T-WTRU 201 and the H-WTRU 202 fails 1702. Because the association has been formed between the T-WTRU 201 and the backup H-WTRU 206, the backup H-WTRU 206 listens to transmissions from the T-WTRU 201 during DRX wake up 1704. The backup H-WTRU 206 may be in the RRC-IDLE 410 or RRC-CONNECTED 420 state. The T-WTRU 201 sends an SR during a DRX wake up cycle to the backup H-WTRU 206 to establish an XL 203 with the backup H-WTRU 206 1706 and the connection procedure may continue as described in FIG. 16.

When the H-WTRU 202 detects or declares RLF on the TRL 204, the H-WTRU 202 may cease transmissions on the XL 203 as the XL 203 may be considered to be out-of-sync. Accordingly, the T-WTRU 201 may declare RLF on the XL 203. Further, H-WTRU 202 may perform connection reestablishment using procedures of the air interface of the TRL 204 in order to continue its own services or indicate failure of the XL 203 to the base station 114. In addition to connection reestablishment by the H-WTRU 202, the T-WTRU 201 may perform connection reestablishment on the XL 203.

System information updates may be provided to the T-WTRU 201 during association formation for determining whether camping on the cell on which the H-WTRU 202 is camped on or to which the H-WTRU 202 is connected is suitable or not. Further, system information may be utilized by the T-WTRU 201 for XL 203 operations. During association formation and when the T-WTRU 201 is in the RRC-IDLE state 410, basic system information may be transmitted in an unscheduled manner. Further, additional extended system information may be provided during connection establishment as described herein. Further, whenever there are changes in system information in the RRC-CONNECTED state 420, changes are relayed to the T-WTRU 201. The H-WTRU 202 may include system information as part of its data buffer and request XL 203 resources from the base station as desired. Changes or updates to system information may be required to be transmitted to the T-WTRU 201 by the H-WTRU 202 as compared with the last transmitted update or an initial extended system information.

As described herein, a T-WTRU 201 having only an established XL 203 with a H-WTRU 202 may be said to be in WTRU-to-WTRU (W2W) coverage mode. Further, a T-WTRU 201 having a direct TRL 205 with the base station 114 may be said to be in network coverage mode or infrastructure coverage mode. A T-WTRU 201 may transition between the W2W coverage mode and the infrastructure coverage mode through handover between the two modes as described with reference to FIG. 18.

Figure 18:
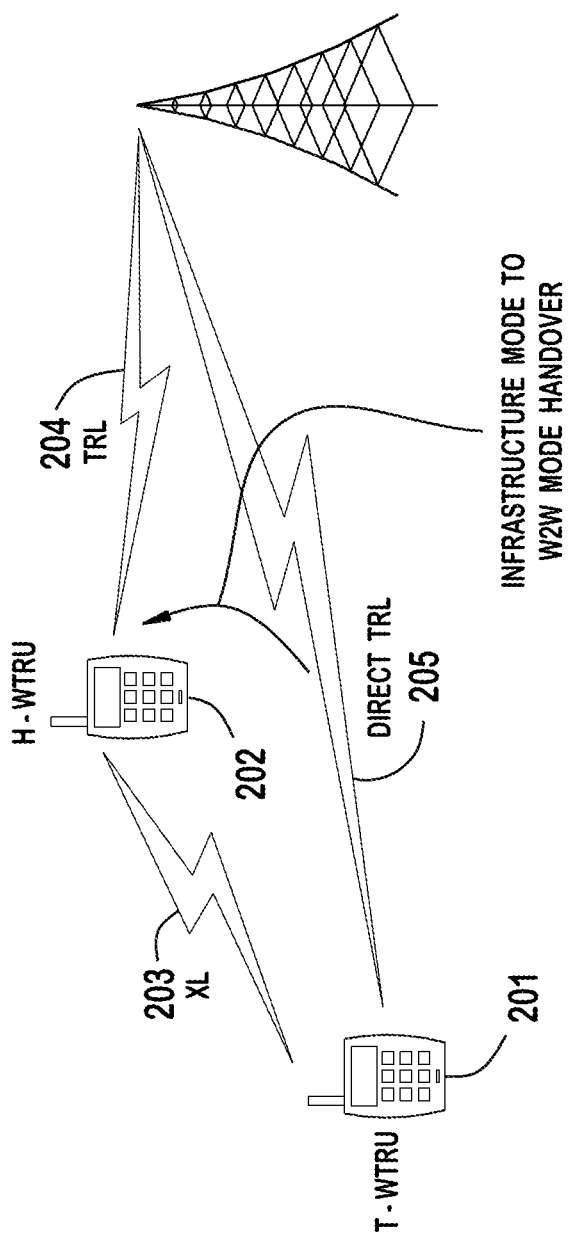
FIG. 18 shows handover from infrastructure coverage mode to W2W coverage mode.

FIG. 18 shows handover from infrastructure coverage mode to W2W coverage mode. The T-WTRU 201 has a direct TRL 205 with the base station 114 and is, thus, in infrastructure coverage mode. A handover may occur from the infrastructure coverage mode to W2W coverage mode. After the handover is performed, the T-WTRU 201 has a XL 203 with the H-WTRU 202 and the H-WTRU 202 has a TRL with the base station through which coverage is provided to the T-WTRU 201 in W2W coverage mode. It is noted that FIG. 18 depicts the TRL 204 being associated with the same base station 114 as the direct TRL 205 in what is described herein as intra-base station infrastructure coverage mode to W2W coverage mode handover. Inter-base station infrastructure coverage mode to W2W coverage mode handover will also be described shortly herein The handover may occur because the T-WTRU 201 is leaving the coverage area of the base station 114. Further, the handover may be triggered by the base station 114 or the T-WTRU 201 based on a measurement of a link quality or a signal strength associated with the direct TRL 205. For example, if the base station 114 determines that direct TRL 205 is at risk of loss or disconnection, the base station 114 may trigger the handover to W2W coverage mode.

Figure 1C:
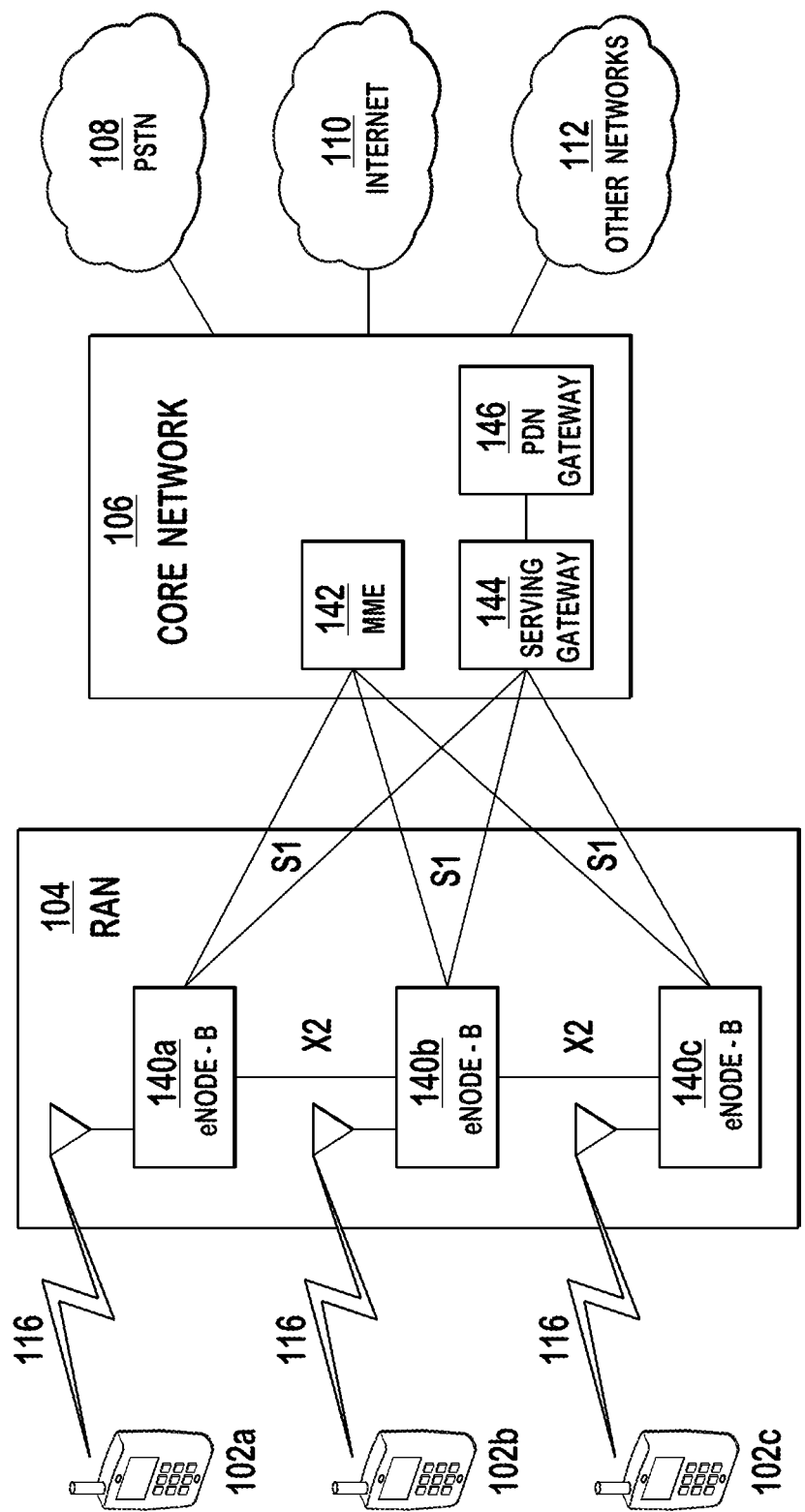
FIG. 1C is a system diagram of an example radio access network and an example core network that may be used within the communications system illustrated in FIG. 1A.

FIGS. 19A1 and 19A2 show a message flow diagram of infrastructure coverage mode to W2W coverage mode handover. The T-WTRU 201 is in infrastructure coverage mode having a direct TRL 205 with the base station 114. Accordingly, the T-WTRU 201 is in the RCC-CONNECTED state 420. Further, the T-WTRU 201 is in the XL-Inactive substate 520 as the T-WTRU 201 has not formed association with the H-WTRU 201.

The base station 114 sends an RRC measurement control message to the T-WTRU 201 1902. The RRC measurement control message may configure or request the T-WTRU 201 to perform measurements on the serving cell of the T-WTRU 201 or other cells, such as neighbor cells. The T-WTRU 201 may perform measurements (for example, a signal strength of the direct TRL or the serving cell, or other cells). Further, the T-WTRU 201 may determine that the signal strength for the serving cell or other cells is below a threshold or that other cells are not detected.

The T-WTRU 201 may generate a measurement report based on the measurements and may send the measure report to the base station 114 1904. The measurement report may include an event code indicating that handover to W2W coverage mode is to occur or indicating that the T-WTRU 201 is ready for the handover. Based on the measurement report, the base station 114 may determine whether handover should be triggered.

If the base station 114 determines to trigger handover, the base station 114 sends a message (RRC prepare for W2W coverage mode) informing the T-WTRU 201 1906. When the T-WTRU 201 is informed that handover is triggered, the T-WTRU 201 may perform neighbor discovery in order to find a H-WTRU 202 1908. Alternatively, the T-WTRU 201 may perform neighbor discovery before receipt of the message from the base station 114 and based on determining that the signal strength of the serving cell is below the threshold. Furthermore, a T-WTRU 201 may be configured to always perform neighbor discovery, for example, at all time or independent or regardless of signal strength of its serving cell, in order to find a H-WTRU 202 to which the T-WTRU 201 may associate.

After neighbor discovery is performed 1908, the T-WTRU 201 and the H-WTRU 202 may exchange association information 1910. In the association information exchange, the T-WTRU 201 and the H-WTRU 202 may exchange association information messages. Then, the H-WTRU 202 sends basic system information to the T-WTRU 201 1912. The basic system information may be associated with the H-WTRU 202 and include a public land mobile network (PLMN) ID, cell ID, RRC state, tracking area indicators (TAI) list, S-TMSI (if the H-WTRU 202 is in the RRC-IDLE state 410), or cell-RNTI (C-RNTI) (if the H-WTRU 202 is in the RRC-CONNECTED state 420) of the H-WTRU 202.

As described herein, the T-WTRU 201 may perform association information exchange with a plurality of potential H-WTRU 202 and may receive basic system information from the plurality of the potential H-WTRU 202. The T-WTRU 201 may select a H-WTRU 202 1914 from the plurality of potential H-WTRU 202 and may send the H-WTRU 202 a message indicating that the H-WTRU 202 was selected to perform its role on the XL 203 1916. After the H-WTRU 202 is selected, the H-WTRU transitions to the XL-Idle substate 530 but may remain in the RRC-IDLE state 410.

The T-WTRU 201 then sends an RRC association request message to the base station 114 1918 indicating that the H-WTRU 202 is selected. The RRC association request message may include an identity associated with the H-WTRU 202 (for example, cell ID, S-TMSI, or C-RNTI). The base station 114 registers the association between the T-WTRU 201 and the H-WTRU 202 with the MME 142 1920. Further, the base station 114 may determine the base station 114 with which the H-WTRU 202 has a TRL 204. In this instance, the TRL 204 is established with the base station 114.

If the H-WTRU 202 is not in the RRC-CONNECTED state 420, the base station may send a TAI list and S-TMSI to the MME 142 for the MME 142 to page the H-WTRU 202 in order for the H-WTRU 202 to transition to the RRC-CONNECTED state 420 1922. Alternatively, the MME 142 may page the H-WTRU 202 via the base station 114.

To configure the H-WTRU 202, the base station 114 sends an RRC reconfiguration message to the H-WTRU 202 1924. The RRC reconfiguration message, also described with reference to numeral 930 in FIGS. 9A and 9B, includes a mapping between the SRBs and DRBs for the H-WTRU 202 and the T-WTRU 201 and may also include DRX configuration. The H-WTRU 202 then responds with an RRC reconfiguration complete message to the base station 114 1926. The base station 114 then allocate an XL grant and sends the XL grant to the H-WTRU 202 1928. The XL grant may include a grant for uplink transmission on the XL 203 and a grant for downlink transmission on the XL 203.

The H-WTRU 202 pages the T-WTRU 201 1930 and sends an initial configuration message to the T-WTRU 201 1932. The initial configuration message may include the grants for uplink and downlink transmission on the XL 203. Upon receiving the page, the T-WTRU 201 transitions to the XL-Idle substate 530 and hands over its SRBs and DRBs from the direct TRL 205 to the XL 203.

After transitioning into the XL-Idle substate 530, the T-WTRU 201 may receive an RRC reconfiguration message from the base station 1934. The RRC reconfiguration message may be received on SRB1, which is tunneled through a DRB of the H-WTRU 202. The RRC reconfiguration message may include an XL-RNTI for use by the T-WTRU 201 or the T-WTRU 201 may use the T-WTRU's existing C-RNTI. The T-WTRU 201 may confirm reception of the RRC reconfiguration message by sending a RRC reconfiguration complete message to the base station 114 also on SRB1, which is tunneled through a DRB of the H-WTRU 202. Alternatively, the RRC reconfiguration message and the RRC reconfiguration complete message may be exchanged over the direct TRL 205 if it remains established. After the exchange of the RRC reconfiguration and the RRC reconfiguration complete messages, handover is completed 1938.

It is noted that the T-WTRU 201 and the H-WTRU 202 may use an association timer to guard against the association consuming more than an allotted time to complete. For example, the T-WTRU 201 may start an association timer when the T-WTRU 201 sends the association request message to the base station 1918. If the association timer expires before the T-WTRU 201 receives the RRC reconfiguration message from the base station 1934, the T-WTRU 201 may restart association information exchange 1910 and H-WTRU 202 selection 1914, 1916.

Similarly, the H-WTRU 202 may start an association timer when it receives the selected as H-WTRU 202 message from the T-WTRU 201 1916. If the association timer expires before receipt of the RRC reconfiguration message from the base station 1934, the H-WTRU 202 may cease XL 203 operation and transition back to the XL-Inactive substate 420.

The T-WTRU 201 may utilize a keep alive timer when in the XL-Idle substate 530. The keep alive timer may be used to ensure that the T-WTRU receives keep alive messages from the H-WTRU 202. Furthermore, the base station 114 may utilize a handover timer to ensure that RRC reconfiguration is received by the T-WTRU 201, as described with reference to FIG. 19B.

Figure 19B:
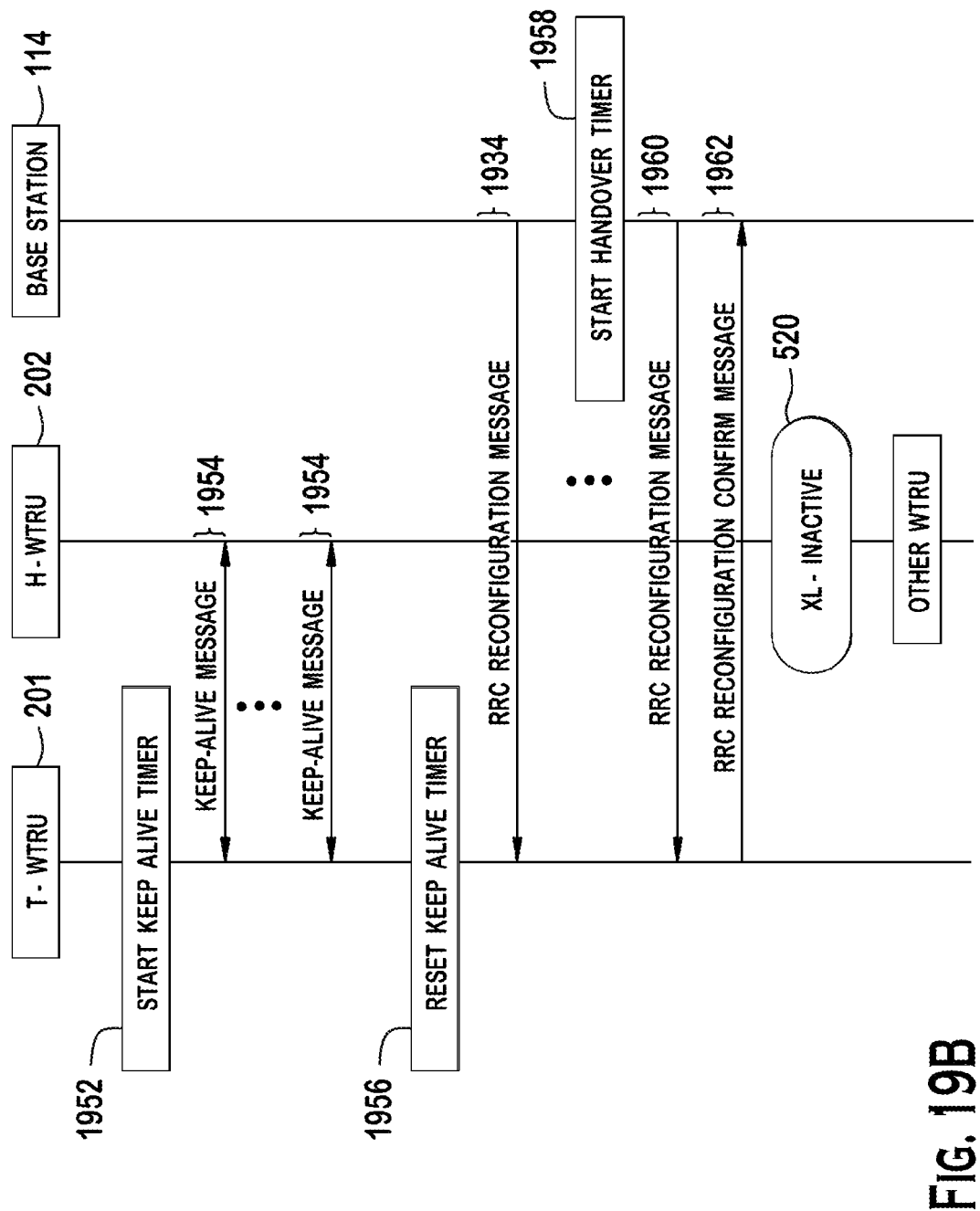
FIG. 19B shows a message flow diagram for the keep alive timer and the handover timer.

FIG. 19B shows a message flow diagram for the keep alive timer and the handover timer. The T-WTRU 201 starts the keep alive timer 1952 and awaits receipt of a keep alive message from the H-WTRU 202 1954. Upon receipt of the keep alive message, the T-WTRU 202 resets the keep alive timer 1956. If the keep alive timer expires before receipt of the keep alive message 1954, the T-WTRU 201 may assume that XL 203 has failed and may perform neighbor discovery, exchange association information, or select a different WTRU to become a H-WTRU 202.

The base station 114 may start a handover timer 1958 when the base station sends the RRC reconfiguration message to the T-WTRU 201 1934. If the RRC reconfiguration complete message from the T-WTRU 201 1936 is not received before the handover timer expires, for example, due to XL 203 failure, the base station 114 may determine that the handover or XL 203 connection establishment has failed. The base station 114 may send an RRC reconfiguration message to the H-WTRU 202 1960 to indicate to the H-WTRU 202 to terminate its role as the H-WTRU 202. The H-WTRU 202 may then send an RRC reconfiguration confirm message to the base station 114 1962 indicating receipt of the RRC reconfiguration message 1964 or termination of the H-WTRU's 202 role in the XL 203.

In an embodiment, the base station 114 may reject the association request sent from the T-WTRU 201 by the RRC association request message 1918, as described with reference to FIG. 20.

Figure 20:
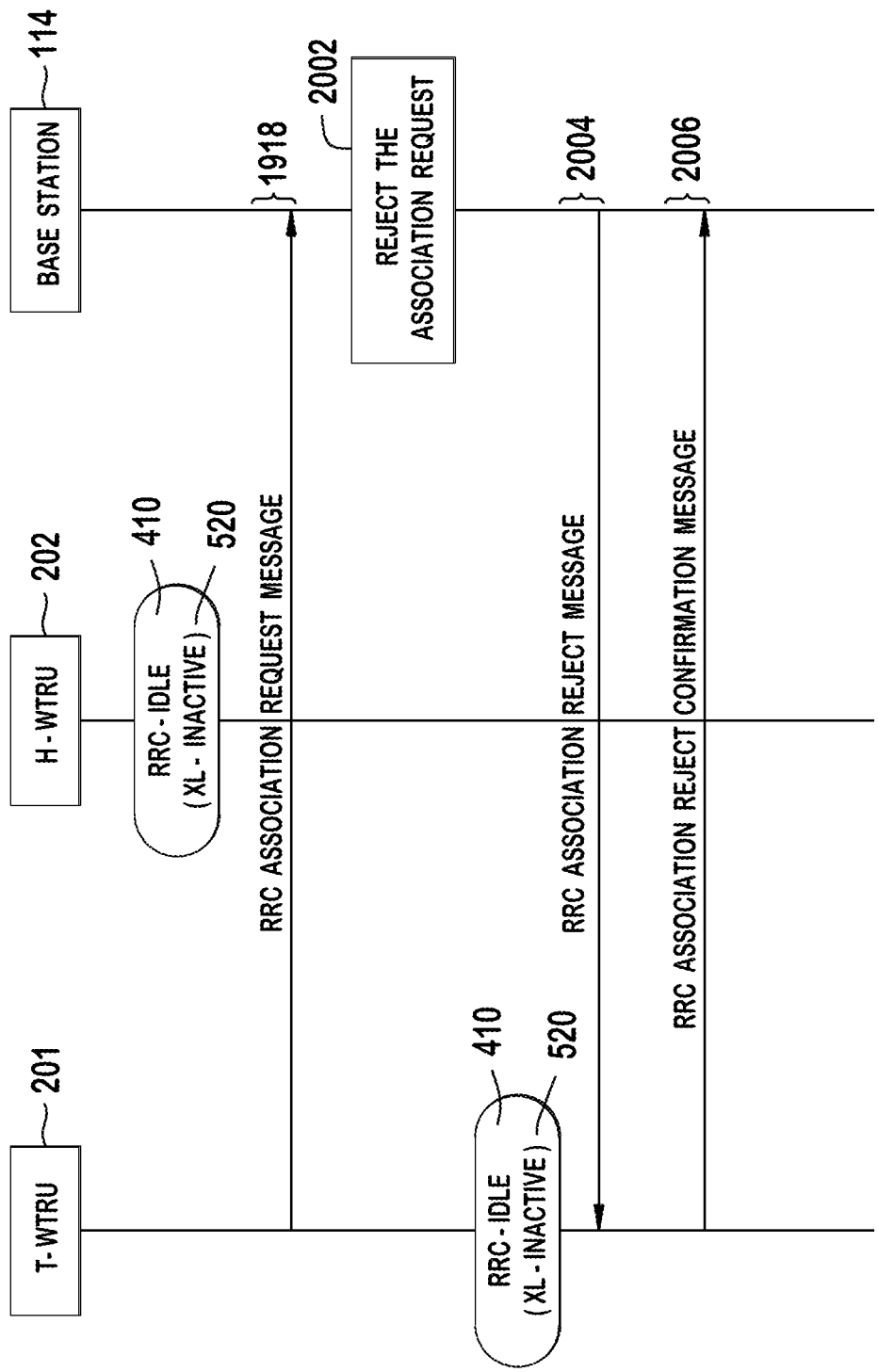
FIG. 20 shows a flow diagram for base station rejection of the RRC association request.

FIG. 20 shows a flow diagram for base station 114 rejection of the RRC association request. The T-WTRU 201 sends an association request message to the base station 114 1918 and the base station 114 rejects the association request 2002. The base station 114 sends an RRC association reject message to the T-WTRU 201 2004. The T-WTRU 201 confirms receipt of the RRC association reject message by sending an RRC association reject confirmation message to the base station 114 2006.

As described herein, handover from direct TRL coverage mode to W2W coverage mode for a T-WTRU 201 utilizes the direct TRL 205 of the T-WTRU 201 for the exchange of RRC messages. If the direct TRL 205 of the T-WTRU 201 fails prior to association formation, the T-WTRU 201 may follow procedures of the air interface of the direct TRL 205 for connection reestablishment. Further, if the base station 114 has already sent the RRC reconfiguration message to the H-WTRU 202 1924, the base station may send another RRC reconfiguration message to the H-WTRU 202 to terminate the H-WTRU's 202 role in the W2W coverage mode for the T-WTRU 201.

If the XL 203 between the T-WTRU 201 and the H-WTRU 202 fails after association between the T-WTRU 201 and the H-WTRU 202 is formed, i.e., after the exchange of association information 1910 and receipt of basic system information by the T-WTRU 201 1912, keep alive messages may not be exchanged between the T-WTRU 201 and the H-WTRU 202. As such, both the T-WTRU 201 and the H-WTRU 202 are able to detect the failure and the T-WTRU 201 and association H-WTRU 202 selection may restart.

Handover between infrastructure coverage mode and W2W coverage mode may also be performed inter-base station, i.e., the XL 203 and the direct TRL 205 are associated with cells belonging to different base stations. Upon receiving the RRC association request message from the T-WTRU 201 1918, the base station 114 may send the TAI list and S-TMSI associated with the H-WTRU 202 to the MME 142 and may request the MME 142 to page the H-WTRU 202. The base station may also follow handover procedures of the air interface, for example, LTE handover procedures, and may send a handover request to the base station associated with the H-WTRU 202 including T-WTRU 201 and H-WTRU 202 configuration.

Upon receiving the handover request, the target base station may configure the H-WTRU 202 for its role using the procedure described with reference to numerals 1922-1926 of FIGS. 19A1 and 19A2. After receiving the RRC reconfiguration complete message from the H-WTRU 202, the target base station may send a handover request acknowledgement back to the base station 114 though the X2-C interface. Upon receiving the handover request acknowledgement from the target base station, the base station may configure the T-WTRU 201 for its role. The base station 114 may then send the RRC reconfiguration message 1934 to the T-WTRU 201. After receiving the handover request acknowledgement from the target base station, the source base station 114 may also forward any PDCP status and unacknowledged data to the target base station. Further, the source base station 114 may receive an XL-RNTI and security parameters from the target base station in the handover request acknowledgement, which the source base station sends to the T-WTRU 201 in the RRC reconfiguration message 1934.

Whereas FIGS. 19A1 and 19A2 show association between the T-WTRU 201 and the H-WTRU 202 being performed over the direct TRL 205 of the T-WTRU, association may be formed over TRL 204 of the H-WTRU 202, as described with reference to FIGS. 21A and 21B.

Figure 21A:
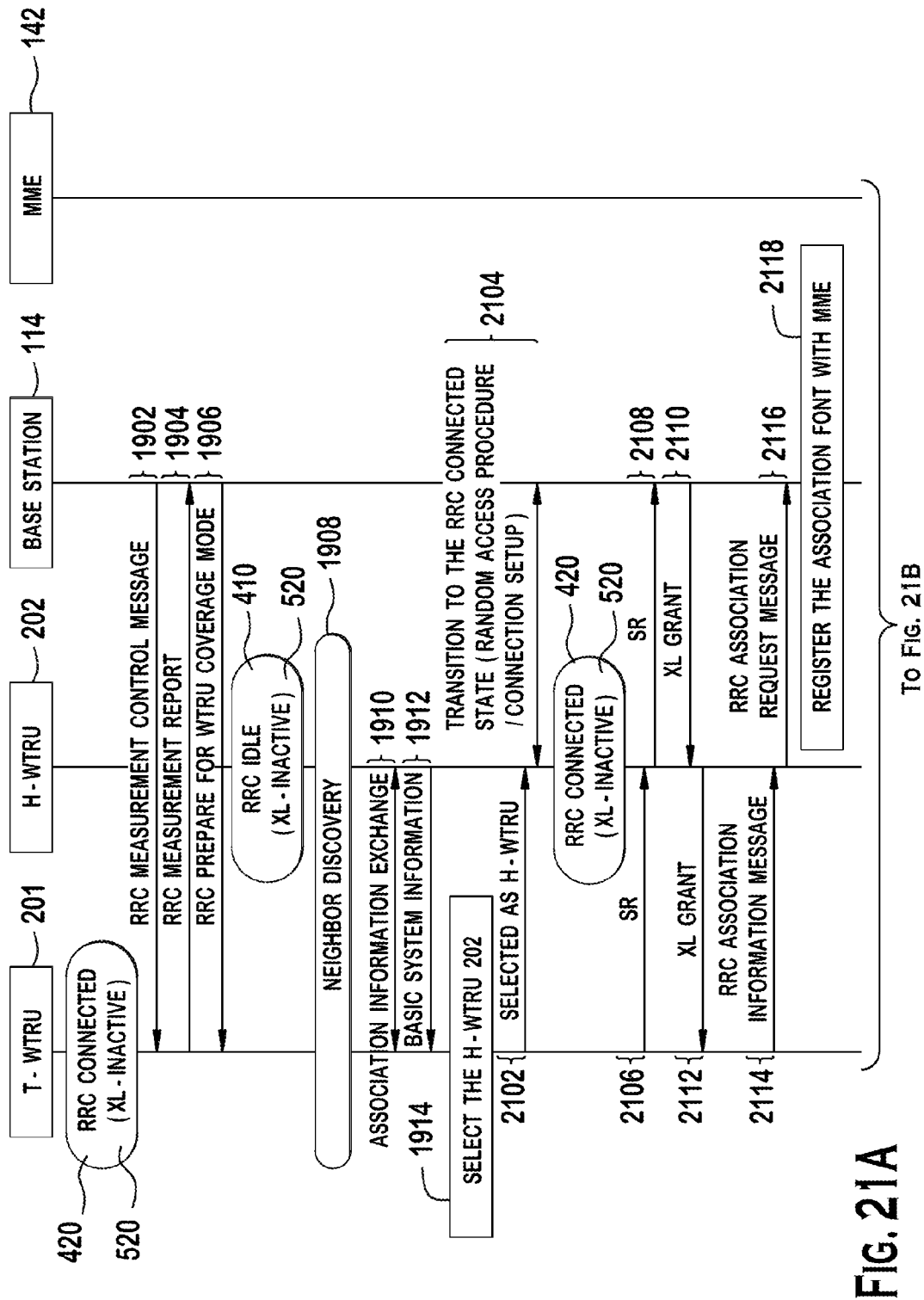
FIGS. 21A and 21B show a message flow diagram of infrastructure coverage mode to W2W coverage mode handover with association formation performed over the TRL.
Figure 21B:
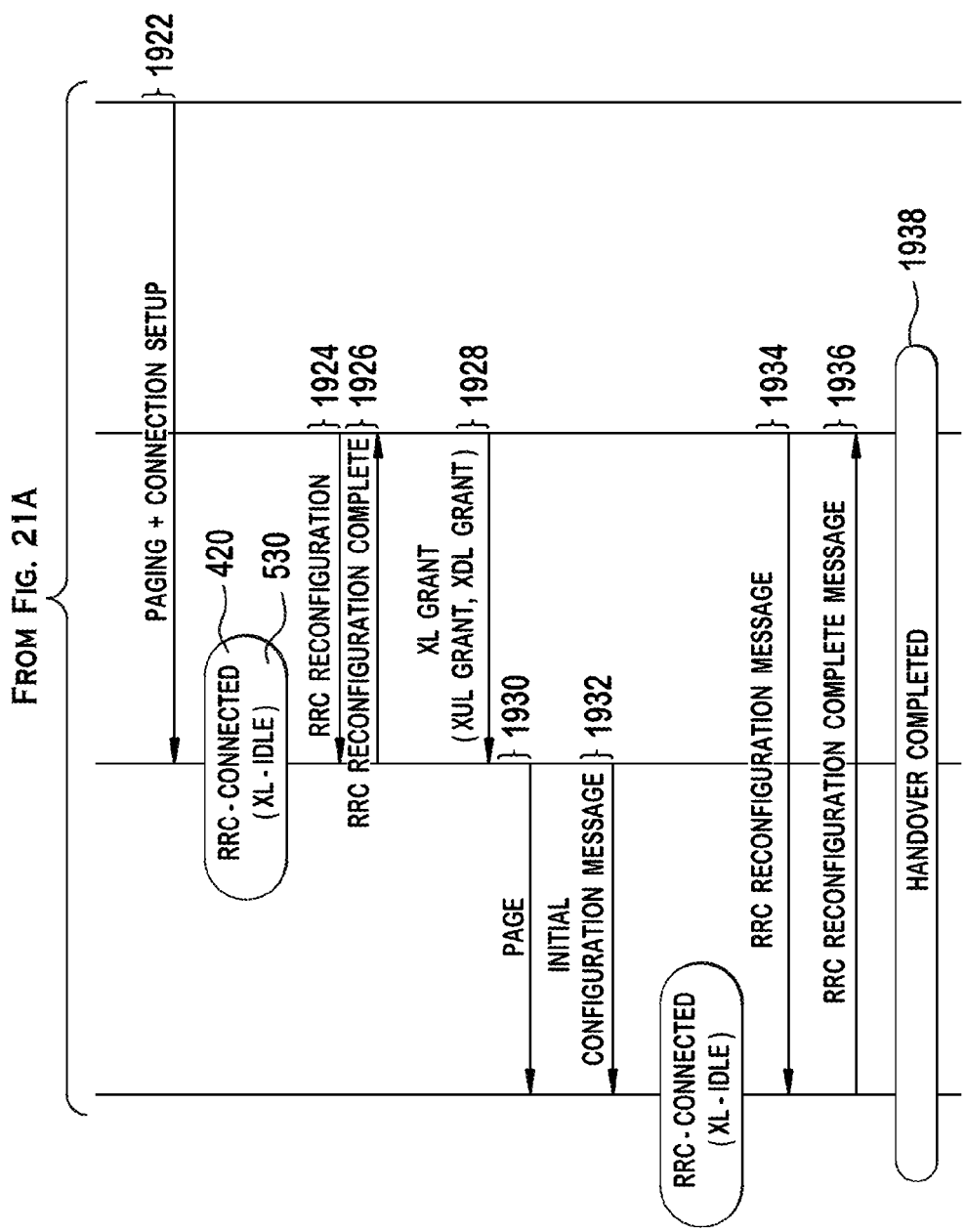

FIGS. 21A and 21B show a message flow diagram of infrastructure coverage mode to W2W coverage mode handover with association formation performed over the TRL 204. In FIGS. 21A and 21B, radio link measurement, neighbor discovery, and association information exchange have been performed as described with reference to FIGS. 19A1 and 19A2. In addition, basic system information was received by the T-WTRU 201. The T-WTRU 201 sends a selected as H-WTRU message to the H-WTRU 202 indicating selection for the role 2102. The selected as H-WTRU message may be used to initiate association over the TRL 204. The H-WTRU 202 transitions to the RRC-CONNECTED state 2104 by performing a random access procedure or connection setup 2104.

The T-WTRU 201 sends a SR to the H-WTRU 202 2106 to request an XL grant for sending messages over the XL 203. The H-WTRU 202 relays the SR to the base station 114 2108. The base station 114 assigns a XL grant to the T-WTRU 201, which may include an uplink grant and a downlink grant, and sends the XL grant to the H-WTRU 202 2110. The H-WTRU 202 forwards the XL grant to the T-WTRU 201 2112.

Having the XL grant, the T-WTRU 201 sends an RRC association information message to the H-WTRU 202 2114. The RRC association information message may include identifiers associated with the T-WTRU 201, such as a C-RNTI or cell ID. The H-WTRU 202 then sends an RRC association request message to the base station 114 2116. The RRC association request message may include the identifiers associated with the T-WTRU 201 and the base station registers the association between the T-WTRU 201 and the H-WTRU 202 with the base station 114. The remainder of the handover procedure is the same as the handover procedure described with reference to numerals 1924-1938 in FIGS. 19A1 and 19A2.

Alternatively, the T-WTRU 201 may send its identifiers in the selected as H-WTRU message to the H-WTRU 202 2102 instead of the RRC association information message 2114 and the T-WTRU 201 may not be required to send the RRC association information message 2114. Further, an inter-base station procedure may be used as described herein.

As previously described, a handover from W2W coverage mode to infrastructure coverage mode may be performed. The handover may be triggered based on a radio link measurement of the XL 203 or the TRL 204. For example, if the XL 203 link quality deteriorates, handover may be performed to the infrastructure coverage mode and communication may be continued on the direct TRL 205. Further, a T-WTRU 201 may perform neighbor cell search, for example, on a periodic basis, and measurements of the link quality of a neighbor cell may be taken while the T-WTRU 201 is in the W2W coverage mode. The measurements may also be reported back to the base station 114 or the network. If the measurements indicate that an appropriate cell is available to provide service to the T-WTRU on the direct TRL 205, handover to the W2W coverage mode may be triggered.

The handover from W2W coverage mode to infrastructure coverage mode may be an intra-base station handover, whereby the base station associated with the TRL 204 of the W2W coverage mode is the same as the base station associated with the direct TRL 205 of the infrastructure coverage mode. The handover may also be an inter-base station handover, whereby the base station associated with the TRL 204 of the W2W coverage mode is different than the base station associated with the direct TRL 205 of the infrastructure coverage mode.

Figure 22:
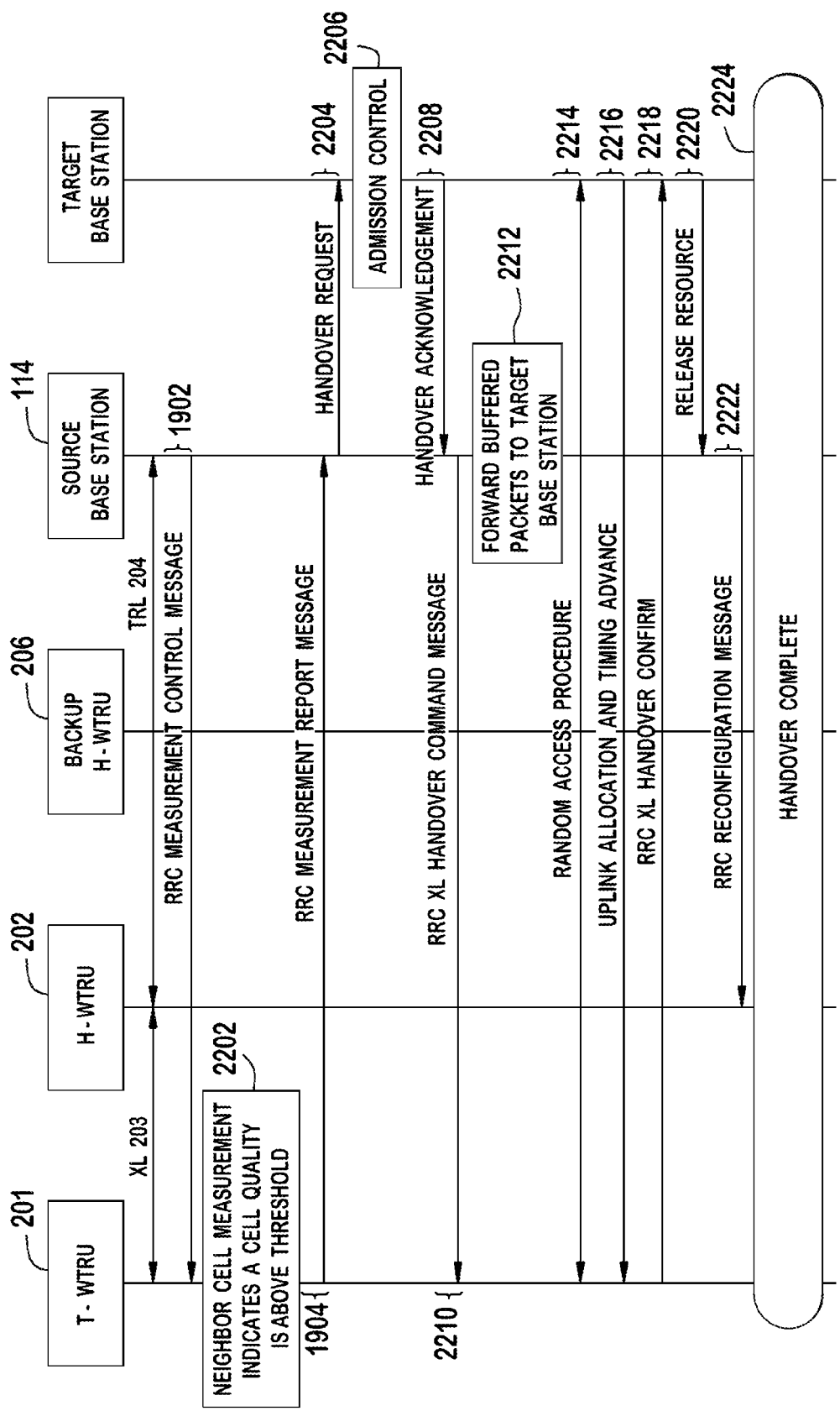
FIG. 22 shows a message flow diagram for inter-base station handover from the W2W coverage mode to infrastructure coverage mode.

FIG. 22 shows a message flow diagram for inter-base station handover from the W2W coverage mode to infrastructure coverage mode. The T-WTRU 201 has a XL 203 with the H-WTRU 202 and the H-WTRU 202 has a TRL 204 with the source base station 114. As such, the T-WTRU 201 is in W2W coverage mode using the source base station. A handover is to be performed from the W2W coverage mode to infrastructure mode, whereby after the handover the T-WTRU 201 has a direct TRL 205 with the target base station. A backup H-WTRU 206 is shown in FIG. 22.

The RRC measurement control message and the RRC measurement report message 1902, 1904 are exchanged with the source base station 114. The T-WTRU 201 determines that neighbor cell measurement indicates a cell's quality being above a threshold 2202 and a handover to infrastructure coverage mode the target base station is decided upon. The source base station 114 sends the handover request to the target base station 2204, for example, over a X2-C link. The target base station performs admission control 2206 and sends a handover request acknowledgement to the source base station 114 2208. Upon receiving the handover request acknowledgement 2208, for example, on the X2-C link, the source base station 114 forwards a PDCP status and any unacknowledged PDCP PDUs to the target base station 2212. The source base station 114 also sends an RRC XL handover command message to the T-WTRU 201 2210. The RRC XL handover command message may include a handover type indicating a W2W coverage mode to infrastructure coverage mode handover and instructing the T-WTRU to perform the handover. The RRC XL handover command message may include configuration parameters related to the T-WTRU 201. The configuration parameters may be sent to the source base station by the target base station in the handover request acknowledgement 2208. The configuration parameters may include a new C-RNTI, security parameters, or random access procedure parameters.

Upon receiving the RRC XL handover command message 2210, the T-WTRU 201 may detach from the XL 203, transition to the XL-Inactive substate 520, and begin synchronization to the target base station. A random access procedure is performed between the T-WTRU 201 and the target base station 114 2214 to gain access over the direct TRL 205 to the target base station.

After the random access procedure is performed 2214, the target base station sends uplink allocation and timing advance information in an RRC message to the T-WTRU 201 2216. The T-WTRU 201 responds with an RRC XL handover confirmation message 2218. The target base station then sends a release resource message to the source base station 114 2220 and the source base station 114 sends an RRC reconfiguration message to the H-WTRU 202 2222 to instruct the H-WTRU 202 to cease its role. Accordingly, the H-WTRU 202 may transition to the XL-Inactive substate 520 and handover for the T-WTRU 201 is complete 2224. The source base station 114 may also send the RRC reconfiguration message to any backup H-WTRUs 206.

In intra-base station handover, only the source base station is concerned with the handover and messaging and information need not be exchanged between the source base station 114 and the target base station. That is, the source base station 114 receives an RRC reconfiguration complete message from the T-WTRU 201 and sends an RRC reconfiguration message to the H-WTRU 202 or any backup H-WTRUs 206 to instruct the H-WTRU 202 and the backup H-WTRUs 206 to cease their roles on the XL 203, or potential XL, respectively.

In addition to handover between the W2W coverage mode and the infrastructure coverage mode described herein, handover may be performed between H-WTRUs in the W2W coverage mode as described with reference to FIG. 23A.

Figure 23A:
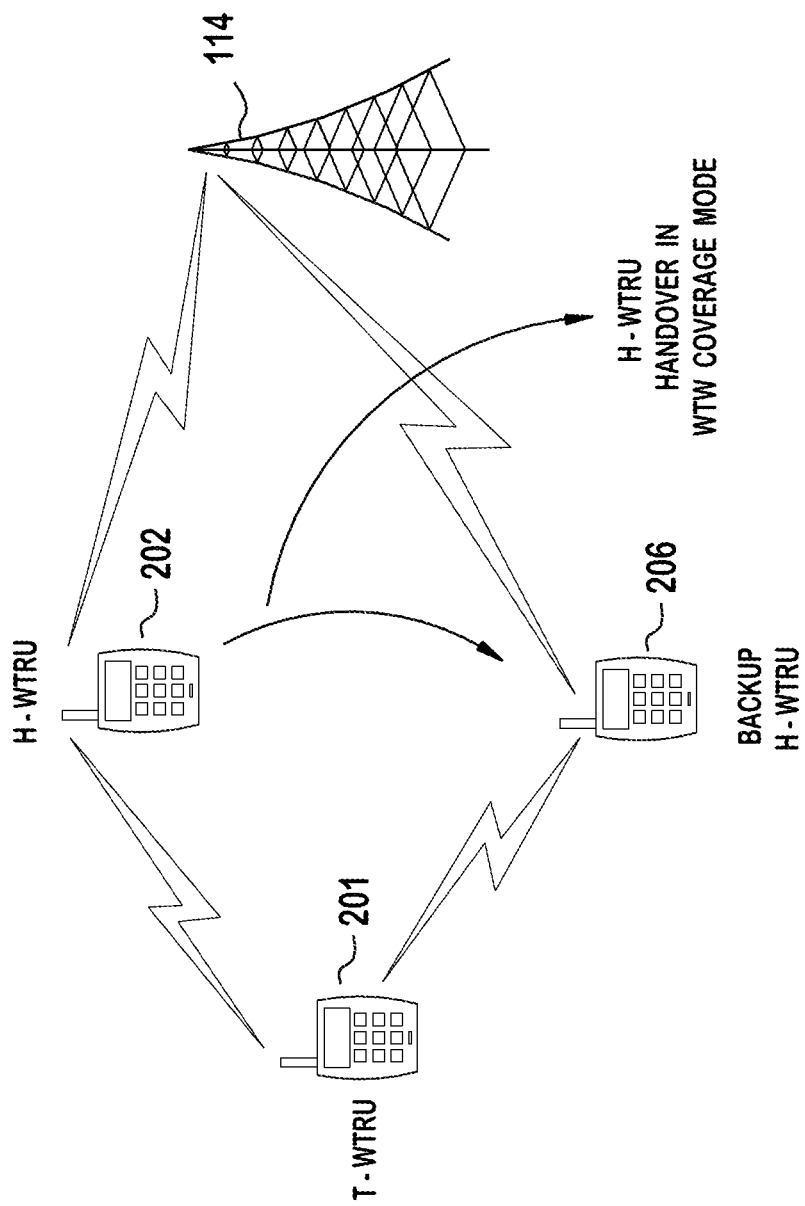
FIG. 23A shows handover between H-WTRUs in the W2W coverage mode.

FIG. 23A shows handover between H-WTRUs in the W2W coverage mode. A T-WTRU 201 has a XL 203 with a H-WTRU 202 and the H-WTRU 202 has a TRL 204 with the base station. The T-WTRU 201 is in W2W coverage mode and receives network services through the XL 203 and the TRL 204. A H-WTRU 202 handover may be performed whereby the T-WTRU 201 has an XL 203 with a backup H-WTRU 206 and receives network services and coverage through the XL 203 and the backup H-WTRU's 206 TRL 204 with the base station.

The H-WTRU 202 and the backup H-WTRU 206 may have a TRL 203 with the same base station, whereby an intra-base station handover is said to be performed, or may have a TRL 203 with different base stations, whereby an inter-base station handover is said to be performed.

H-WTRU handover may be triggered because the H-WTRU 202 seeks to terminate its role on the XL 203, the XL 203 with the H-WTRU 202 has failed, due to a measurement report, or due to handover of the TRL 204 of the H-WTRU 202 to another cell or base station.

For the XL 203 to be established with the backup H-WTRU 206, the T-WTRU 201 may perform backup H-WTRU 206 selection and association information may be exchanged between the T-WTRU 201 and the backup H-WTRU 206. The T-WTRU 201 may be in the RRC-CONNECTED state 420 and the XL-Active 540 substate using the established XL 203 when performing backup H-WTRU 206 selection and exchanging association information.

Backup H-WTRU 206 selection and association may be performed prior to handover being triggered or after the handover is triggered. The network may request the T-WTRU 201 to search for a backup H-WTRU 206 or perform backup H-WTRU 206 selection using an RRC message of search for backup H-WTRU, or a trigger event, such as entering the RRC-CONNECTED state 420 or the XL-Active 540 substate, may be configured. It is recognized that having a selected backup H-WTRU 206 prior to performing H-WTRU 202 handover reduces handover time. Conversely, maintaining the backup H-WTRU 206 in the RRC-CONNECTED state 420, especially after association has been formed, adversely impacts the backup H-WTRU's 206 battery power.

Alternatively, backup H-WTRU 206 selection and association may begin prior to performing handover, either as controlled by the T-WTRU's 201 associated base station 114 or as determined by the T-WTRU 201 according to XL 203 quality based on a measurement and any hysteresis. As such, backup H-WTRU 206 selection and association is followed by the handover procedure and power savings are achieved. However, a longer handover time may be experienced.

When performing H-WTRU 202 handover, neighboring base stations or cells may be synchronized for inter-base station mobility. Further, different operators may use the same XL resources for neighbor discovery and association or other purposes. Additionally, the H-WTRU 202 and the backup H-WTRU 206 may be associated with the same MME 142. Further, as described herein data or control information may not be required to be exchanged between the H-WTRU 202 and backup H-WTRU 206

To perform H-WTRU 202 handover, neighbor discovery is performed to find a backup H-WTRU 206 and the backup H-WTRU 206 is selected and association is formed between the T-WTRU 201 and the backup H-WTRU 206. Further, association messages are also exchanged between the T-WTRU 201 and the network. The exchange of association messages with the network may be performed using the H-WTRU's 202 TRL 204 or the backup H-WTRU 206 TRL 204.

FIGS. 23B1 and 23B2 show a message flow diagram for backup H-WTRU 206 selection and association. The T-WTRU 201 has an XL 203 with the H-WTRU 202 and the H-WTRU 202 has a TRL 204 with the base station 114. Further, the T-WTRU 201 and the H-WTRU 202 are both in the XL-Active substate 540 of the RRC-CONNECTED state 420.

The base station sends the RRC search for backup H-WTRU message to the T-WTRU 201 2302 to request a search for a backup H-WTRU 206. Alternatively, the search for backup may be triggered by the network or the T-WTRU 201 based on other conditions as described herein. The T-WTRU 201 performs neighbor discovery and exchanges association messages with the backup H-WTRU 206 and receives basic system information from the backup H-WTRU 206 2304, as described with respect to the H-WTRU 202 with reference to numerals 1908-1912 in FIG. 19A.

The T-WTRU 201 selects the backup H-WTRU 206 2306 and sends the RRC selected as H-WTRU 202 message to the backup H-WTRU 206 2308 to indicate its selection as the backup H-WTRU 206. The T-WTRU 201 then sends an RRC backup H-WTRU association request message to the base station 114 2310. The RRC backup H-WTRU association request message is similar to the RRC association request message described with reference to numeral 1918 and may include an identity of the backup H-WTRU 206. If the T-WTRU 201 is aware that the backup H-WTRU 206 is connected to or camped on the same cell as the T-WTRU 201, (for example, by comparing the backup H-WTRU's 206 cell ID with its own cell ID), the T-WTRU 201 may only send the C-RNTI or S-TMSI of the backup H-WTRU 206.

The base station registers the association and determines the base station associated with the backup H-WTRU 206. The base station 114 may identify that the backup H-WTRU 206 is connected to or camped on the base station 114 itself by checking the backup H-WTRU's 206 cell ID. If the backup H-WTRU 206 is not yet in the RRC-CONNECTED state 420, the base station 114 requests the MME 142 to page the backup H-WTRU 206 using the backup H-WTRU's 206 TAI list or S-TMSI in order to transition the backup H-WTRU 206 to the RRC-CONNECTED state 420 2314.

The base station 114 sends an RRC reconfiguration message to the backup H-WTRU 206 2316 to configure the backup H-WTRU 206 for its role as a H-WTRU for the T-WTRU 201. The RRC reconfiguration message may include a backup XL-RNTI of the T-WTRU 201, configuration of the T-WTRU's 201 tunneled DRBs or SRBs on the backup H-WTRU 206, and DRX information. The backup XL-RNTI may be used to identify the XL between the T-WTRU and the backup H-WTRU, whereas the XL-RNTI may be used to identify the XL between the T-WTRU and the current H-WTRU.

Upon receiving the RRC reconfiguration message, the backup H-WTRU 206 transitions to the XL-Idle substate 530 and assumes the role of a backup H-WTRU for the T-WTRU 201. The backup H-WTRU 206 also sends an RRC reconfiguration complete message to the base station 114 2318 to confirm its role and assignment on the XL 203. The base station 114 sends an RRC reconfiguration message to the T-WTRU through the tunneled SRB1 of H-WTRU 202 2320. Upon receiving the RRC reconfiguration message, the T-WTRU 201 responds with a RRC reconfiguration complete message 2322 through the tunneled SRB1 of the H-WTRU 202 to confirm the backup H-WTRU 206 assignment. The T-WTRU and the backup H-WTRU 206 exchange keep alive messages to maintain their association.

The network or base station 114 may reject the RRC backup H-WTRU association request of the T-WTRU 201 2310, as described with reference to FIG. 23C.

Figure 23C:
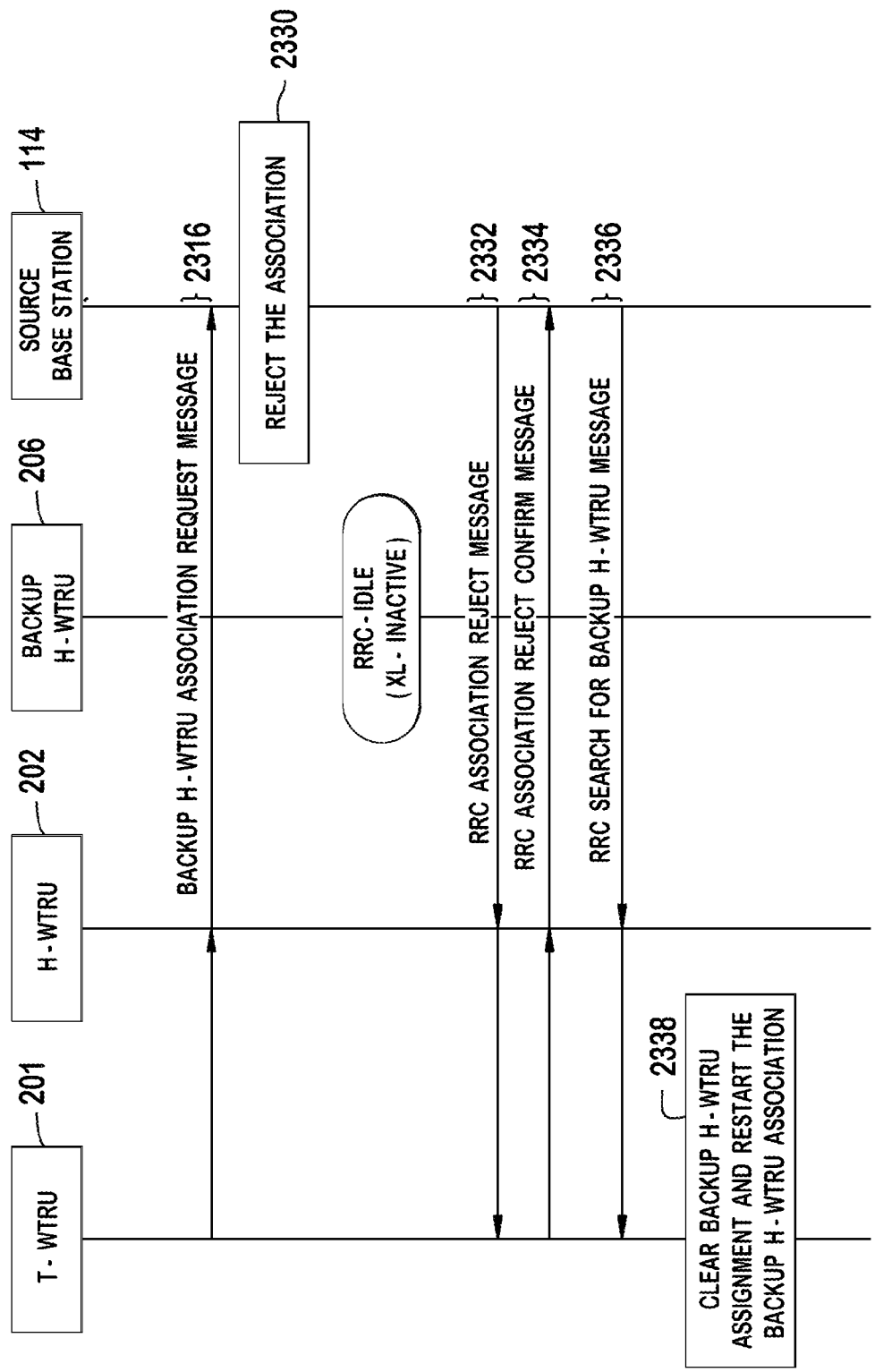
FIG. 23C shows a message flow diagram of the rejection of RRC backup H-WTRU association request.

FIG. 23C shows a message flow diagram of the rejection of RRC backup H-WTRU association request. The T-WTRU 201 sent the RRC backup H-WTRU association request to the T-WTRU 201 2310. The base station 114 rejects the association between the T-WTRU 201 and the backup H-WTRU 206, for example due to the failure of the TRL 204 of the backup H-WTRU 206.

The base station 144 sends an RRC association reject message to the T-WTRU 201 through the tunneled SBR1 of the H-WTRU 202 2332. The T-WTRU 201 then sends an RRC association reject confirm message to the base station 114 through the tunneled SRB1 2334. The base station 114 then sends an RRC search for backup H-WTRU message 2336 to the T-WTRU 201 2336 to instruct the T-WTRU 201 to search for another WTRU as a backup H-WTRU 206 and attempt exchanging association information again. The T-WTRU 201 clears backup H-WTRU assignment and restarts backup H-WTRU 206 association 2338.

An association timer may be used by the T-WTRU 201 to guard against the association procedure consuming an extended time to occur. Further, a keep alive timer may be used by both the T-WTRU and the backup H-WTRU 206 in order to maintain a viable XL 203.

Figure 23D:
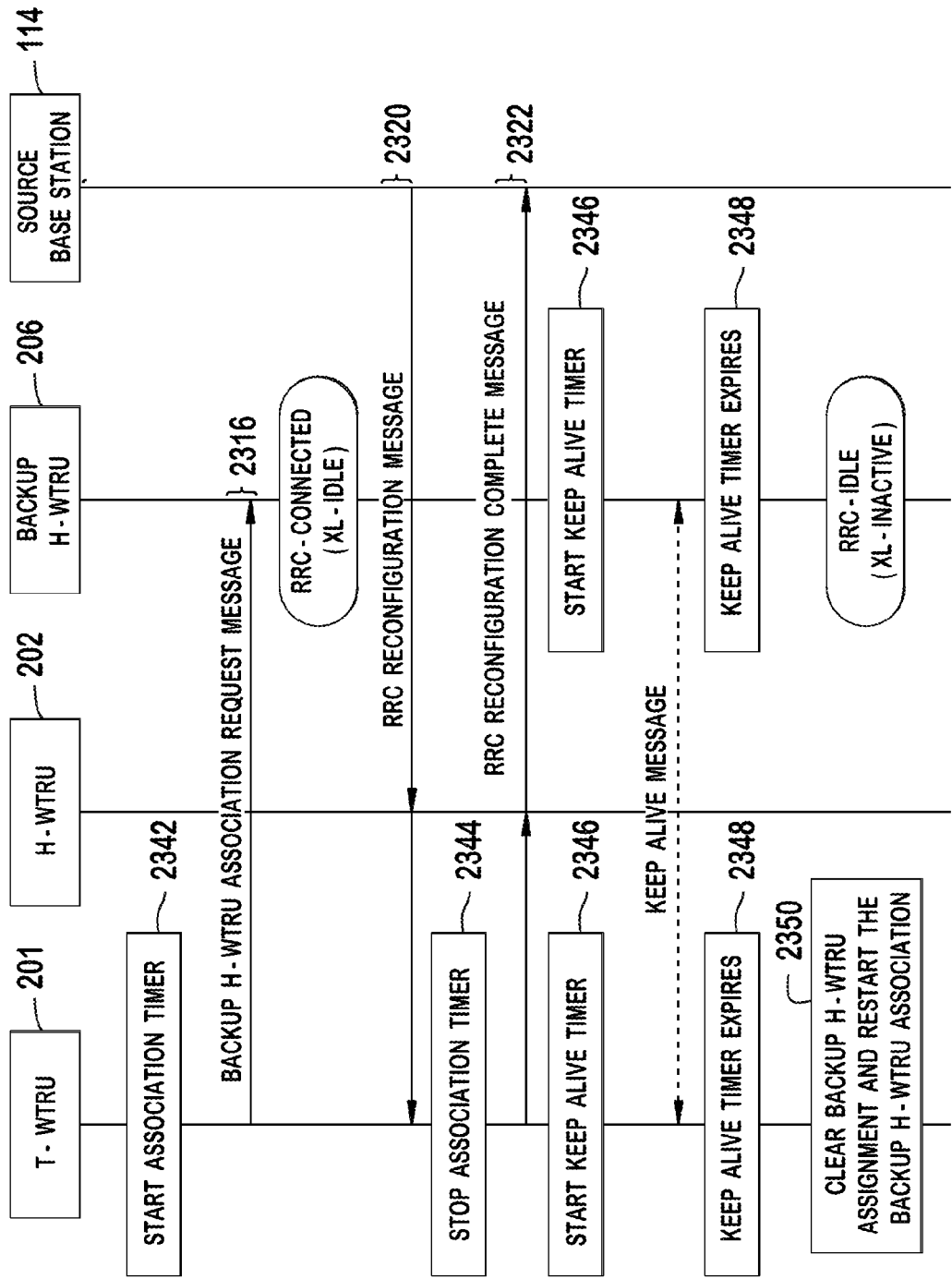
FIG. 23D shows a message flow diagram for the utilization of an association timer and a keep alive timer.

FIG. 23D shows a message flow diagram for the utilization of an association timer and a keep alive timer. The T-WTRU 201 starts an association timer 2342 when the T-WTRU 201 sends the RRC association request message to the base station 114 2310. The T-WTRU then awaits receipt of the RCC reconfiguration message from the base station 114 2320. If the timer expires before receiving the RCC reconfiguration message from the base station 114 2320, the T-WTRU restarts the association procedure and backup H-WTRU 206 selection. It may not be required for the backup H-WTRU 206 to start an association timer because the backup H-WTRU 206 may either not receive an the RRC reconfiguration message from the base station 114 2314 in which case the backup H-WTRU 206 is not configured for the XL 203 or the base station 114 may detect an error and send another RRC reconfiguration message to remove XL 203 related configuration.

If the RRC reconfiguration message is received before the association timer expires, the T-WTRU 201 stops the association timer 2344, sends the RRC reconfiguration complete message to the base station 114 2322 and remains in the XL-Idle substate 530 of the RRC-CONNECTED state 420. Further, the T-WTRU may go into DRX mode for power saving and the base station may inform the T-WTRU 201 of the backup H-WTRU's 206 DRX cycle in the event that the backup H-WTRU 206 is in DRX mode. As such, the T-WTRU 201 knows when to initiate the XL 203 in handover between the H-WTRU 202 and the backup H-WTRU 206. If the H-WTRU 202 is also in DRX mode, the backup H-WTRU's 206 DRX cycle may be configured to be synchronized to the H-WTRU's 202 DRX cycle to reduce delay on XL in the handover from the H-WTRU 202 to the backup H-WTRU 206.

Keep alive messages are exchanged between the T-WTRU 201 and the backup H-WTRU 206 to ensure the integrity of the XL 203. Keep-Alive timers on both the T-WTRU 201 and the backup H-WTRU 206 are started 2346 and are reset each time a Keep-Alive message is received. If the XL 203 degrades and a keep alive message is not received (as indicated by the dashed line in FIG. 23D) before the keep alive timer expires 2348, the T-WTRU 201 may restart the association process and backup H-WTRU 206 selection 2350 and the backup H-WTRU 206 may terminate its role and transition to the XL-Inactive substate 520. For instance, the T-WTRU 201 may send an RRC measurement message to the base station 114, which indicates that the XL 203 failed, and may receive an RRC search for backup H-WTRU message from the base station 114.

In inter-base station H-WTRU handover for W2W coverage mode, the neighbor discovery process and backup H-WTRU 206 selection may be the same as in the intra-base station H-WTRU handover. However, upon receipt of the RRC backup H-WTRU association request message 2310 through tunneled SRB1, the source base station (i.e., that associated with the H-WTRU 202) may identify the target base station associated with the backup H-WTRU 206 using the backup H-WTRU's 206 cell ID included in the message. The source base station may request the MME 142 to page the backup H-WTRU 206 in order to transition the backup H-WTRU 206 to the RRC-CONNECTED state 420 if it is not in the RRC-CONNECTED state 420. The source base station may then send a configuration message including information associated with the T-WTRU's 201 to the target base station via the X2-C interface. The information may include configuration of the tunneled DRBs or SRBs and DRX related parameters.

Upon receiving the configuration message, the target base station (as opposed to the source base station as described with reference to numerals 2316, 2318 in FIGS. 23B1 and 23B2) sends an RRC reconfiguration message to the backup H-WTRU to convey the T-WTRU's configuration related to its tunneled DRB/SRBs. In addition, a backup XL-RNTI and security parameter determined by the target base station may be sent to the backup H-WTRU 206 in the message. Further, after transitioning to the XL-Idle substate 520, the backup H-WTRU 206 sends the RRC reconfiguration complete message to the target base station and assumes its role on the XL 203.

The target base station may send a backup H-WTRU configuration confirmation message to the source base station through the X2-C interface. The backup H-WTRU configuration confirmation message may include a backup XL-RNTI and security parameters. Upon receiving the backup H-WTRU configuration confirmation message, the source base station may now send the RRC reconfiguration message to the T-WTRU 201 through the tunneled SRB1 2320. The RRC reconfiguration message informs the T-WTRU of the success of backup H-WTRU 206 association and conveys the backup XL-RNTI and security parameters. Further, the T-WTRU 201 responds with an RRC reconfiguration complete message to the source base station through tunneled SRB1 2322 and the T-WTRU 201 and the backup H-WTRU 206 exchange keep alive message or messages 2324.

As described with reference to FIGS. 23B-C, messaging for the handover between the H-WTRU 202 and the backup H-WTRU 206 is performed via over the XL 203 and the TRL 204 of the H-WTRU 206. Alternatively, the messaging for handover may be performed via messaging over the XL 203 and the TRL 204 of the backup H-WTRU 206, whereby association-related information is exchanged with the network through the backup H-WTRU's 206 XL 203 and TRL 204.

Figure 24:
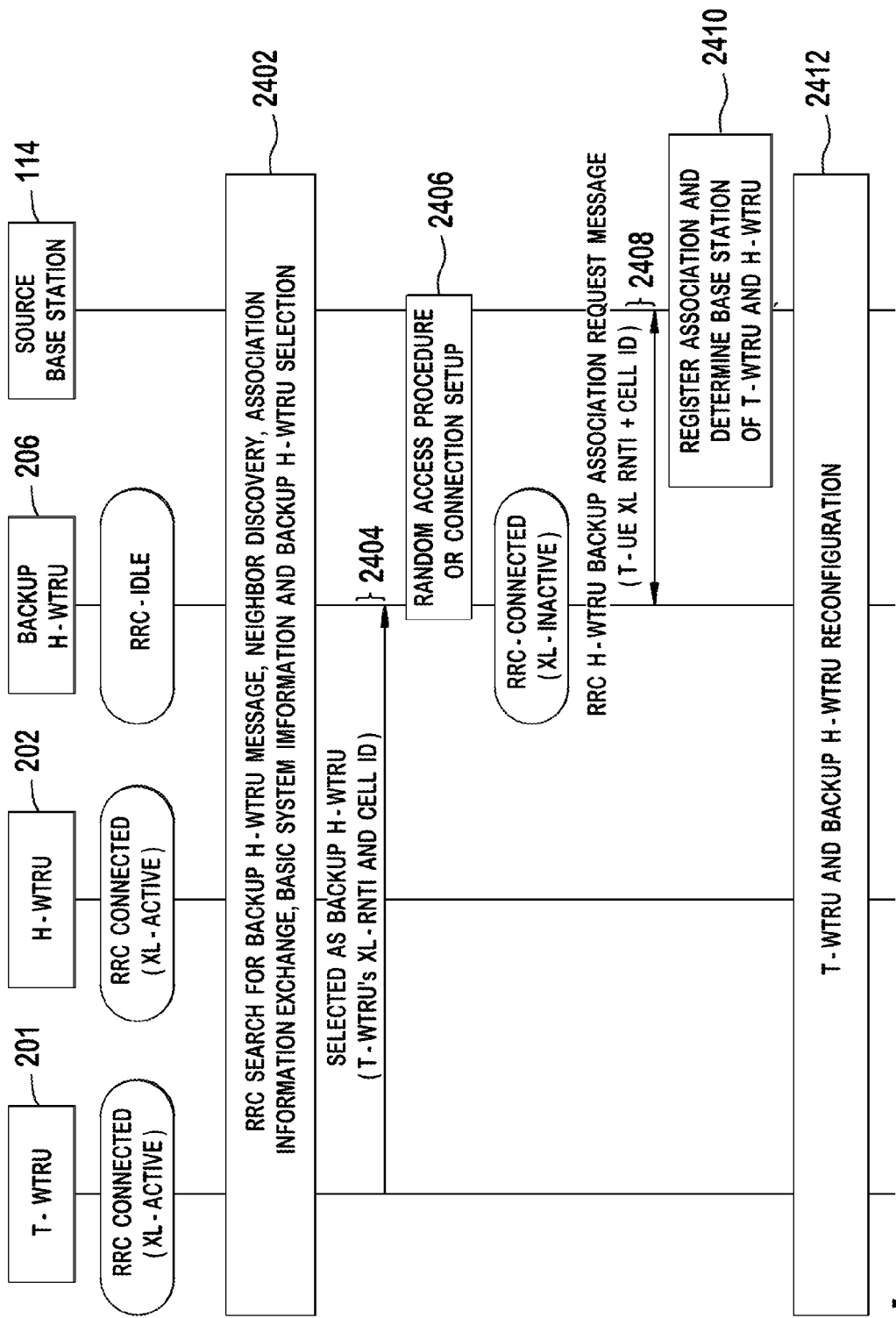
FIG. 24 shows a message flow diagram for backup H-WTRU selection and association.

FIG. 24 shows a message flow diagram for backup H-WTRU 206 selection and association. The RRC search for backup H-WTRU 206 message is received by the T-WTRU, neighbor discovery is performed, association information is exchanged, basic system information is received by the T-WTRU 201 and a backup H-WTRU 206 is selected 2402, as described herein. The T-WTRU 201 sends a selected as backup H-WTRU message to the backup H-WTRU 206 2404. The selected as backup H-WTRU message includes information or an identity associated with the T-WTRU 201, such as a cell ID and an XL-RNTI.

Upon receiving this message, if the backup H-WTRU 206 is not in the RRC-CONNECTED state 420, the backup H-WTRU 206 performs a random access procedure or a connection setup procedure in order to transition to the RCC-CONNECTED state 420. The backup H-WTRU 206 then sends an RRC backup H-WTRU association request message to the base station 114 2408. The RRC backup H-WTRU association request message may include the cell ID or XL-RNTI of the T-WTRU 201.

The base station 144 registers the association and determines the base station associated with the T-WTRU 201 and H-WTRU 202 and their XL 203 and TRL 204 2410. In this message flow diagram, the base station 114 is associated with both the T-WTRU 201 and H-WTRU 202 and their XL 203 and TRL 204 2410. The reconfiguration of the backup H-WTRU 206 and T-WTRU 201 is then performed 2412 as described herein, for example with reference to numerals 2316-2322 of FIGS. 23B1 and 23B2.

If the network or the base station 114 rejects the backup H-WTRU association request 2408, the base station sends an RRC association reject message to the T-WTRU via the tunneled SBR1 through the H-WTRU 202. The T-WTRU 201 responds with an RRC association reject confirm message to the base station through the tunneled SRB1, i.e., via the H-WTRU 202.

It is noted that because the T-WTRU 201 does not send a selected as backup H-WTRU 206 message to the base station, the T-WTRU 201 may start the association timer when the T-WTRU 201 sends the selected as backup H-WTRU 206 message to the backup H-WTRU 206. If the RRC reconfiguration message or the RRC association reject message 2332 are not received when the association timer expires, the T-WTRU 201 may determine that the association process has failed and may restart backup H-WTRU 206 selection and the association process.

As described with reference to FIG. 24, the same base station 114 is associated with the TRL 204 on the H-WTRU 202 and the TRL 204 on the backup H-WTRU 206, i.e., an intra-base station procedure is performed. If a source base station is associated with the TRL 204 of the H-WTRU 202 and a target base station is associated with the backup H-WTRU 206, an inter-base station procedure is said to be performed.

In the inter-base station procedure, the target base station receives the RRC backup H-WTRU association request 2408 and determines that a source base station different than itself is associated with the direct TRL of the H-WTRU and the T-WTRU 201. The target base station identifies the source base station, for example, using the T-WTRU's cell ID. The target base station (which receives the RRC backup H-WTRU association request 2408) sends a T-WTRU information request message to the source base station through the X2-C interface between the source and target base station. Upon receiving the T-WTRU information request message, the source base station sends a T-WTRU information acknowledgement message through the X2-C interface to the target base station. The T-WTRU information acknowledgement message may include parameters of the T-WTRU. The parameters may include a configuration of the tunneled DRBs/SRBs or DRX parameters.

Further, when reconfiguring the backup H-WTRU 206 using the RRC reconfiguration message, the target base station includes T-WTRU 201 configuration parameters received from the source base station. The RRC reconfiguration message may also include a backup XL-CRNTI assigned by the target base station. The backup H-WTRU 206 responds with an RRC reconfiguration complete message and the target base station sends an X2-C message confirming the configuration of the backup H-WTRU 206 to the source base station. The configuration confirmation message may include the backup XL-RNTI for the T-WTRU 201. The source base station may then register the association and send an RRC reconfiguration message to the T-WTRU to confirm the success of the backup H-WTRU 206 association and convey the backup XL-RNTI. The T-WTRU then responds to the source base with the RRC reconfiguration complete message.

Alternatively, instead of including an identity associated with the T-WTRU 201 in the selected as backup H-WTRU message, the T-WTRU 201 may send a scheduling request (SR) for the XL to the backup H-WTRU 206. The backup H-WTRU 206 may then enter the RRC-CONNECTED state 420 using a random access procedure or a connection setup procedure, such as the RRC connection setup procedure of LTE, if the backup H-WTRU 206 is not in the RRC-CONNECTED state 420. The backup H-WTRU 206 may then forward the SR to the base station and receive XL grants back from the base station. The backup H-WTRU 206 may send the uplink XL grant to the T-WTRU 201 for use by the T-WTRU 201 in sending an association information message to the backup H-WTRU 206 NPUE including the T-WTRU's identity.

As described herein, while a T-WTRU 201 is utilizing an XL 203 with a H-WTRU 202, the T-WTRU 201 may form an association with a backup H-WTRU 206 and may exchange keep alive messages with the backup H-WTRU 206 in case a handover to the backup H-WTRU 206 needs to be performed. Forming the association and exchanging keep alive messages with the backup H-WTRU 206 allows the T-WTRU 201 to quickly transition from utilizing the XL 203 on the H-WTRU 202 to utilizing the XL 203 on the backup H-WTRU 206.

The H-WTRU 202 for a T-WTRU 201 may seek to terminate its role, for example, due to low battery, a potential departure of its coverage area, or in the case where the H-WTRU 202 does not additional bandwidth on its TRL 204 to serve the T-WTRU 201. The H-WTRU 202 may seek to terminate its role and the T-WTRU 201 may, thus, be handed over to the backup H-WTRU 206.

Figure 25A:
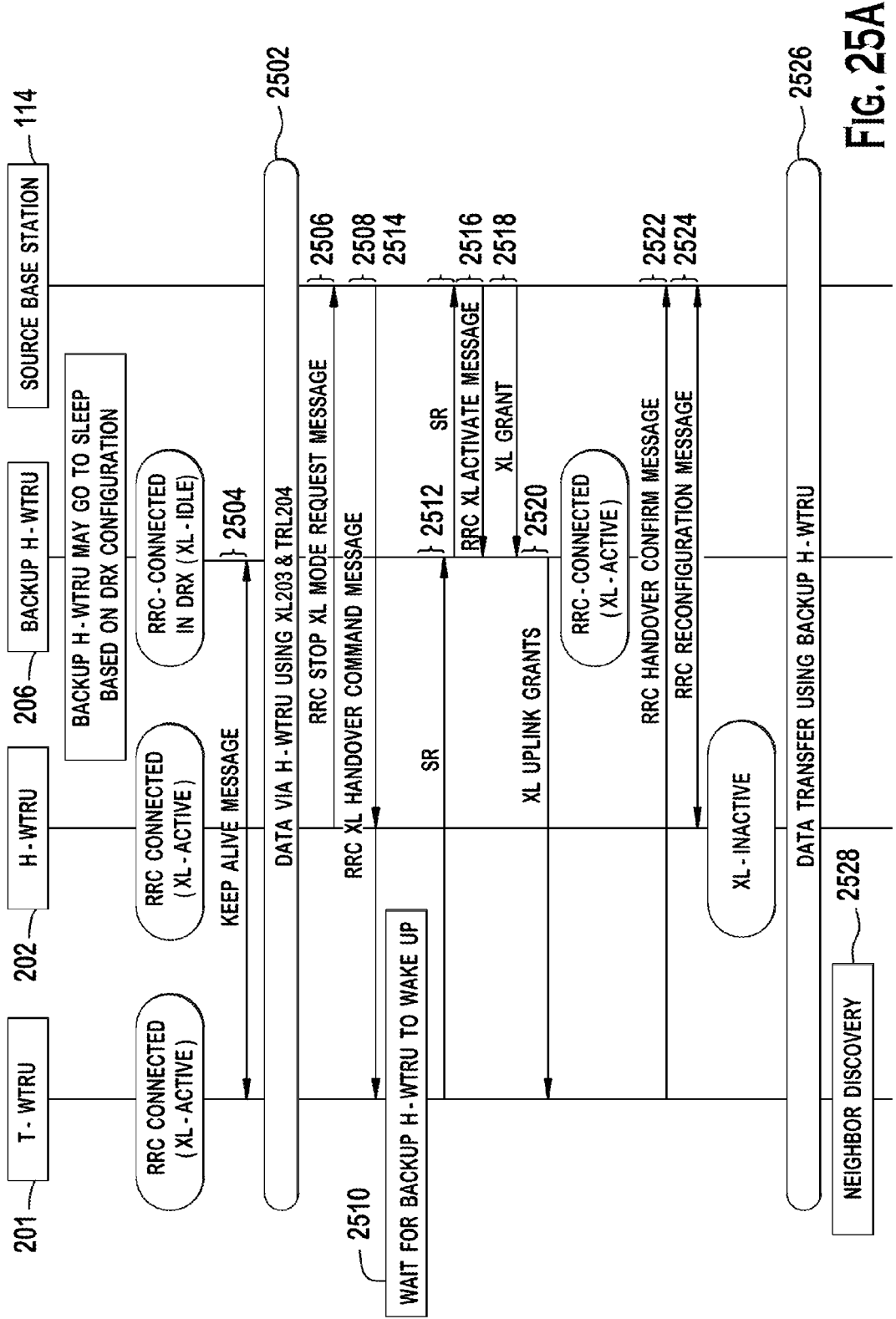
FIG. 25A shows a message flow diagram for handover between the H-WTRU and the backup H-WTRU that is initiated by the H-WTRU.

FIG. 25A shows a message flow diagram for handover between the H-WTRU and the backup H-WTRU that is initiated by the H-WTRU. The T-WTRU 201 and the H-WTRU 202 are both in the XL-Active substate 540 of the RCC-CONNECTED state 420 and the T-WTRU 201 is exchanging data with the base station 114 using the XL 203 and the TRL 204 2502. Further, the T-WTRU 201 has formed association with the backup H-WTRU 206 and the T-WTRU 201 and the backup H-WTRU 206 exchange keep alive messages 2504. The backup H-WTRU 206 may be in the XL-Idle substate 530 as it is only exchanging keep alive messages with the T-WTRU 201 and in the RRC-CONNECTED state 420 as it may have an air interface, for example, LTE, with the base station 114 or any other base station. Further, the backup H-WTRU 206 may go into DRX cycles, to conserve battery life, for example, and may exchange the keep alive messages when it is awake.

The H-WTRU 202 may decide to terminate its role on the XL 203 and cease aiding the T-WTRU 201 in receiving network coverage in the W2W coverage mode. The H-WTRU 202 sends a RRC stop XL mode request message to the base station 114 2506 requesting that the H-WTRU's 202 role on the XL be ceased. The RRC stop XL mode request message may include a cause of termination. The base station 114 then sends an RRC XL handover command message to the T-WTRU 201 2508 indicating a request for handover to the T-WTRU 201 2508. The RRC XL handover command message may be tunneled through SRB1 and may include a handover type, such as H-WTRU 202 to backup H-WTRU 206 handover. Upon receiving the RRC XL handover command message, the T-WTRU waits for the backup H-WTRU 206 to wake up due to DRX 2510 and sends a SR to the backup H-WTRU 206 2512. The SR serves as an indication of handover. The backup H-WTRU 206 relays the SR to the base station 114 on the TRL 204 2514. The SR may indicate to the base station 114 that handover to the backup H-WTRU is successful or that the XL handover command message is received and acted upon.

The base station performs admission control and sends an RRC XL activate message to the backup H-WTRU 206 2514 requesting the backup H-WTRU 206 to activate the tunneled DRB and SRBs, based on prior reconfiguration using the RRC reconfiguration message. The base station 114 also sends XL grants to the backup H-WTRU 206 2518 or, alternatively, the XL grants are included in the RRC XL activate message 2516. Further, the XL grants may also be sent to the backup H-WTRU 206 in a MAC control element over the TRL 204.

The backup H-WTRU 206 sends an XL grant for the uplink to the T-WTRU 201 2520 in an initial configuration message. The T-WRU 201 uses the XL uplink grant to send an RRC XL handover confirm message to the base station via the tunneled SRB1 through the backup H-WTRU 206 2522. The T-WTRU 201 is, thus, served by the network with the aid of the backup H-WTRU 206. The base station 114 sends an RRC reconfiguration message to the H-WTRU 202 2524 to configure the H-WTRU 202 to remove XL 203 related functions and settings. After the configuration the H-WTRU 202 transitions to the XL-Inactive substate 520 and may be in the RRC-CONNECTED state 420 or the RRC-IDLE state 410. The T-WTRU 201 performs data transmission and reception using the backup H-WTRU 206 2526 and may perform neighbor discovery to find another backup H-WTRU 2528.

Whereas in FIG. 25A, the message flow diagram shows handover triggered by the H-WTRU's 202 desire to relinquish its role on the XL 203 or the TRL 204, handover to the backup H-WTRU 206 may be triggered by failure of the XL 203 between the T-WTRU 202 and the H-WTRU 202, as described with reference to FIG. 25B.

Figure 25B:
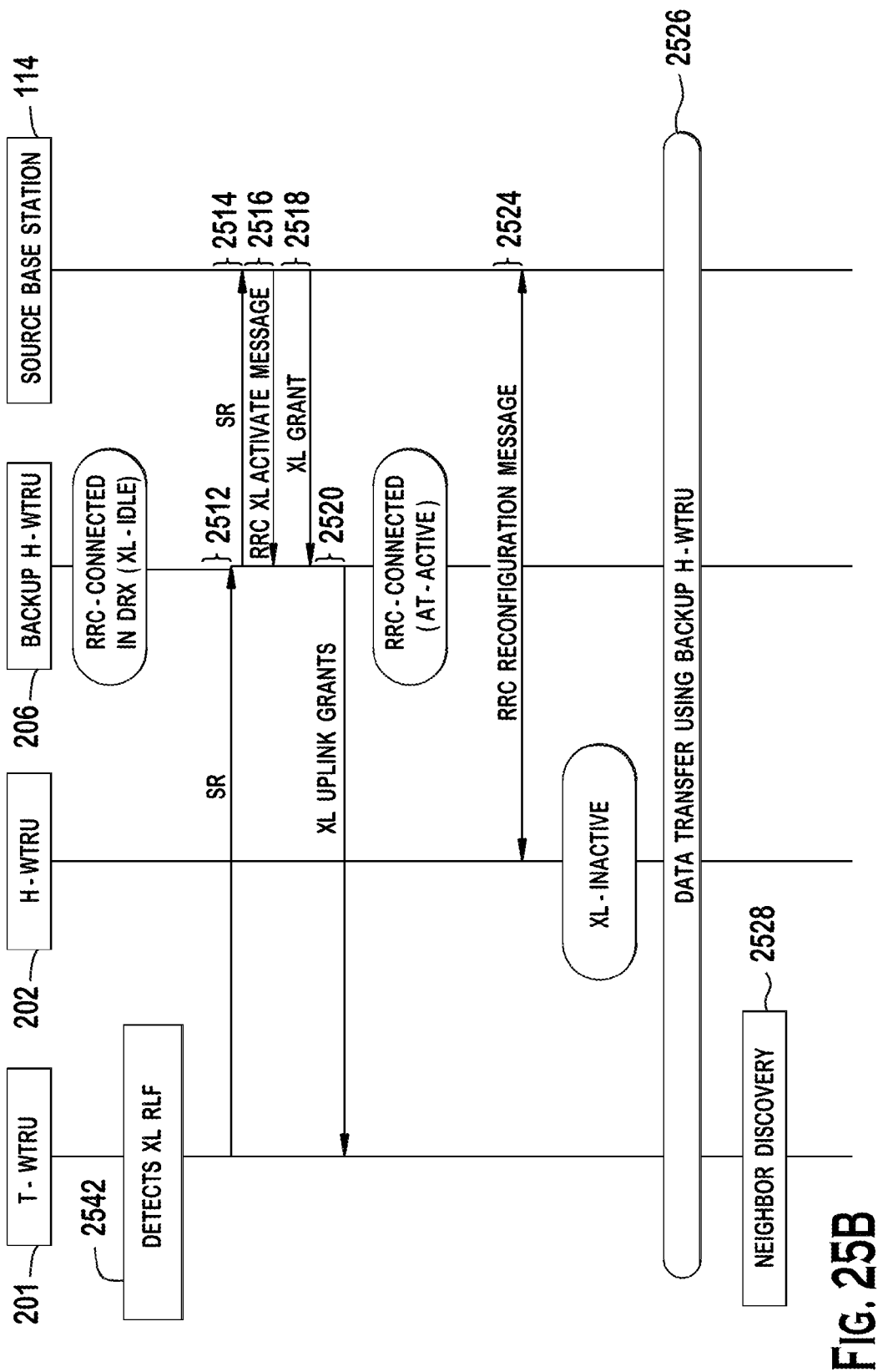
FIG. 25B shows a message flow diagram for handover triggered due to XL failure.

FIG. 25B shows a message flow diagram for handover triggered due to XL 203 failure. The T-WTRU 201 detects RLF of the XL 203 2542 and sends a SR to the backup H-WTRU 206 and awaits receipt of an XL grant in a similar procedure as described with reference to numerals 2512-2520 in FIG. 25A. The backup H-WTRU 206 relays the SR to the base station 114 on the TRL 204 2514. The SR is an indication of handover to the H-WTRU 206 and the base station 114. The backup H-WTRU 206 is in the RRC-CONNECTED state 420 and the XL-Idle substate 530 due to being associated with the T-WTRU 201.

The base station performs admission control and sends an RRC XL activate message to the backup H-WTRU 206 2514 requesting the backup H-WTRU 206 to activate the tunneled DRB and SRBs based on prior reconfiguration of the RRC reconfiguration message. The base station 114 also sends XL grants to the backup H-WTRU 206 2518 or, alternatively, the XL grants are included in the RRC XL activate message 2516. Further, the XL grants may also be sent to the backup H-WTRU 206 in a MAC control element over the TRL 204. The backup H-WTRU 206 sends an XL grant for the uplink to the T-WTRU 201 2520 in an initial configuration message. After receipt of the XL grant, the T-WTRU 201 is served by the network with the help of the backup H-WTRU 206. The base station 114 sends an RRC reconfiguration message to the H-WTRU 202 to remove its XL related settings and configurations. Based on the RRC reconfiguration message the H-WTRU 202 enters the XL-Inactive substate 520.

Handover may be performed from the H-WTRU 202 to the backup H-WTRU 206 based on RLF of the TRL 204 of the H-WTRU 202. For example, the H-WTRU 202 may stop XL 203 communication with the T-WTRU 201 when RFL is declared on the TRL 203. Stopping communication will cause the T-WTRU 201 to declare RLF on the XL 203 and trigger handover to the backup H-WTRU 206 as described with reference to FIG. 25B.

Further, handover between the H-WTRU 202 and the backup H-WTRU 206 may be performed based on measurements on the XL 203 with the H-WTRU 202 or the XL 203 with the backup H-WTRU 206. The measurements may be performed by the base station 114 or the T-WTRU 201 and measurement reports may be exchanged between the base station 114 and the T-WTRU 201. The handover may be triggered by the base station 114 or network or the T-WTRU 201.

The T-WTRU 201 sends an RRC measurement report message to the base station 114 including a cause or event. The RRC measurement report message may indicate measurements performed on the XL 203 with the H-WTRU 202 or the backup H-WTRU 206 or may indicate that handover is required based on the measurements performed. The base station 114 then sends an RRC XL handover command message to the T-WTRU 201 indicating a request for handover to the T-WTRU 201 as described with reference to numeral 2508 in FIG. 25A. The handover my then proceed as described with reference to FIG. 25A.

In inter-base station handover, the source base station sends a handover request to the target base station and forwards any necessary information or data to the target base station. Because association is formed between the T-WTRU 201 and the backup H-WTRU 206, the T-WTRU 201 is aware of information associated with the backup H-WTRU 206, including the backup XL-RNTI of the backup H-WTRU 206, or security parameters for the target base station, from the association procedure.

For example, as described with reference to FIG. 25A, when the source base station decides that the T-WTRU 201 should hand over its service to the backup H-WTRU 206, a modified handover procedure may be performed according to the air interface of the radio link. The source base station sends a handover request to the target base station through the X2-C interface, and waits for an acknowledgement. Upon receiving the handover request, the target base station performs admission control and may accept the handover. The target base station then sends a handover request acknowledgement to the source base station through the X2-C interface.

Because the T-WTRU is aware of information associated with the backup H-WTRU 206 and its target base station, there may not be a need for the target base station to carry the information in a transparent container in the handover request acknowledgment. Upon receiving the handover request acknowledgement, the source base station sends the RRC XL handover command message to the T-WTRU 201 2507 on the tunneled SRB1.

On the source and target base stations and the network, air interface handover procedure may be performed, including forwarding PDCP sequence number (SN) status and unacknowledged data PDCP PDUs to the target base station. Further, the RRC XL handover confirm message 2522 is sent from the T-WTRU 201 to the target base station. The target base station performs path switch between the source and target base stations per air interface procedures. Once the target base station receives the message of path switch request acknowledgement from the MME 142 as the indication of the end of the path switch, it sends an X2-C message of release resource to the source base station. Upon receiving the message, the source base station sends the RRC reconfiguration message to the H-WTRU 202 2524 so that the H-WTRU 202 may remove its XL 203 related settings and transition to the XL-Inactive substate 520.

If handover between the H-WTRU 202 and the backup H-WTRU 206 is triggered based on XL 203 RLF, the target base station may be aware of the handover before the source base station because of the RLF on XL 203 associated with the source base station. Receipt of the SR 2512 indicates handover to the target base station. The target base station may send a handover indication message including an identity associated with the T-WTRU's 201 to the source base station through the X2-C interface to indicate a T-WTRU 201 initiated handover to the backup H-WTRU 206. Handover procedure may then proceed with sending the handover request message to the target base station.

Seamless handover is desired in order to minimize data loss and latency. Further, after the handover is complete, it is desired for data that is buffered prior to handover completion to be resent. For example, data intended to the T-WTRU 201 and buffered in the H-WTRU 202 is desired to be sent to the T-WTRU 201 via the backup H-WTRU 206 after the handover is complete.

For inter-base station handover and RLC acknowledgement mode (AM) channels, per air interface procedures, PDCP SN status and unacknowledged PDCP PDUs are forwarded from the source base station to the target base station. Thus, data loss caused by base station switching is avoided. For both RLC AM and unacknowledgement (UM) channels, in order to minimize the data loss caused by the H-WTRU 202 buffering, the source base station may send a control message to the H-WTRU 202 to use flow control mechanism to reduce buffer depth in the H-WTRU 202 before inter-base station handover.

In a second layer (L2) architecture, the RLC layer may be terminated only at the base station and the T-WTRU 201. In intra-base station handover, an RLC automatic repeat request (ARQ) function recovers the data loss caused by H-WTRU 202 buffering for AM channels during a handover from H-WTRU 202 to a backup H-WTRU 206. For UM channels, recovering data loss caused by H-WTRU 202 buffering is described herein.

Figure 26:
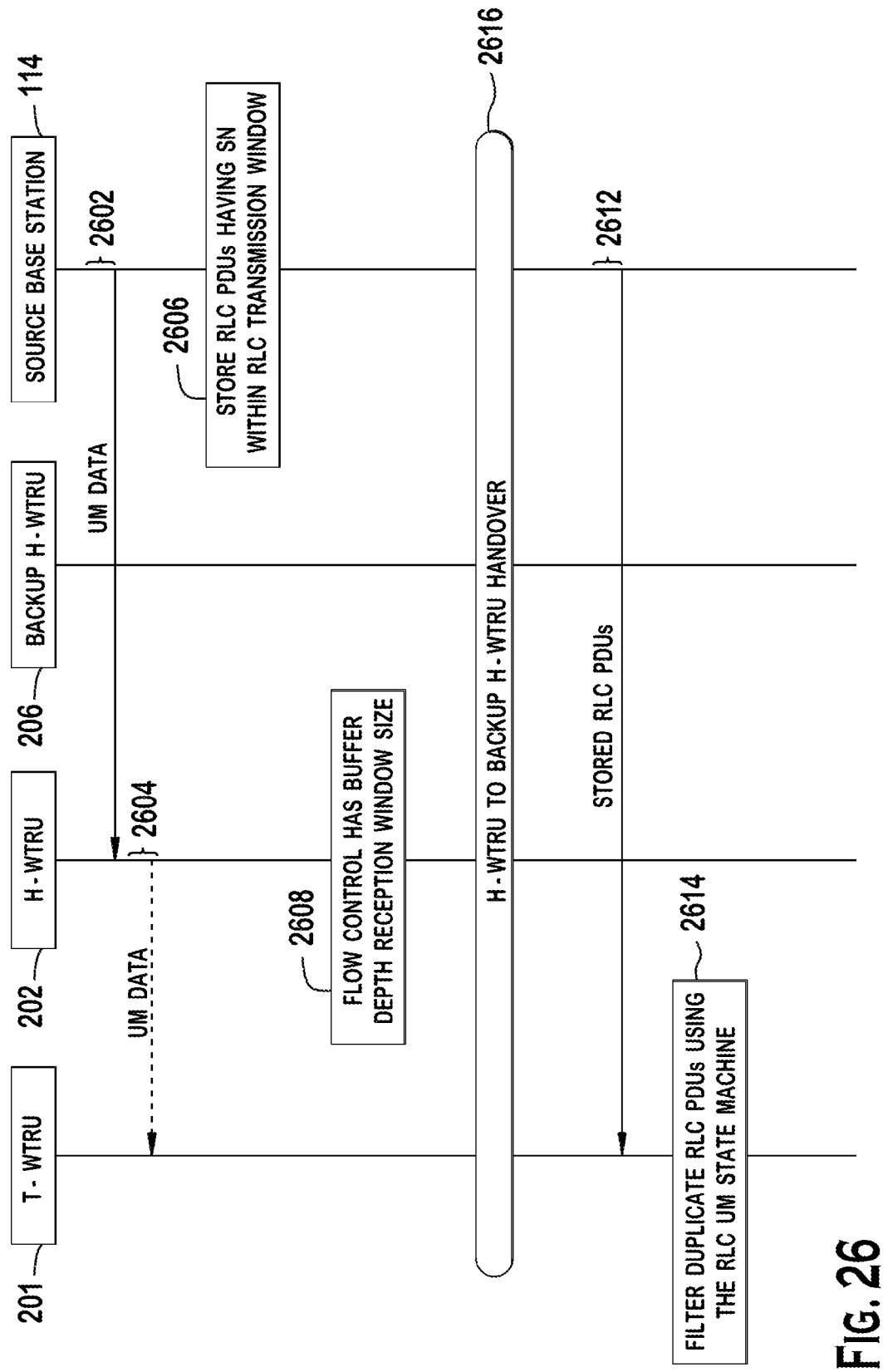
FIG. 26 shows a message flow diagram for data handling in handover with radio link control (RLC) unacknowledgement mode (UM)

FIG. 26 shows a message flow diagram for data handling in handover with RLC UM. A downlink procedure is shown, however, an uplink procedure may be similarly performed. The base station 114 sends UM data to the H-WTRU 202 2602, however, because of RLF on the XL 203, the UM data is not sent to the T-WTRU 201 2604 (as shown by the dashed line). The base station 114 stores RLC PDUs transmitted to the H-WTRU 202 having an SN that falls within an RLC transmission window 2606. Further, the H-WTRU 202 has a buffer depth having a smaller size than the reception window 2608. After the completion of the H-WTRU 202 to backup H-WTRU 206 handover 2610, the T-WTRU 201 is reconnected to the base station 114 using the backup H-WTRU 206. The stored RLC PDUs are resent to the T-WTRU 201 through the tunneled RBs with the backup H-WTRU 206 2612. The T-WTRU 201 filters any duplicated PDUs due to retransmission using an RLC UM reception window or state machine 2614. The buffer depth for a RLC UM channel in the H-WTRU 202 may be controlled by a flow control mechanism, for example, if less than the RLC window size.

A T-WTRU 201 may be in XL coverage mode, whereby the T-WTRU 201 utilizes the XL 203 to receive connectivity or network services when the T-WTRU 201 is out-of-coverage or unable to establish a direct TRL 205. A T-WTRU 201 may also be in XL capacity mode, whereby the T-WTRU 201 has direct TRL 205 established but uses the XL 203 to receive additional coverage, connectivity, or network services.

As described herein, the XL 203 between the T-WTRU 201 and the H-WTRU 202 may be in accordance with an Open Systems Interconnection (OSI) protocol comprising a physical (PHY) and a medium access control (MAC) layer. For the uplink and the downlink, logical channels, transport channels, and physical channels for the XL 203 are described herein. The logical channels are mapped on to transport channels, which are, in turn, mapped on physical channels.

Figure 27:
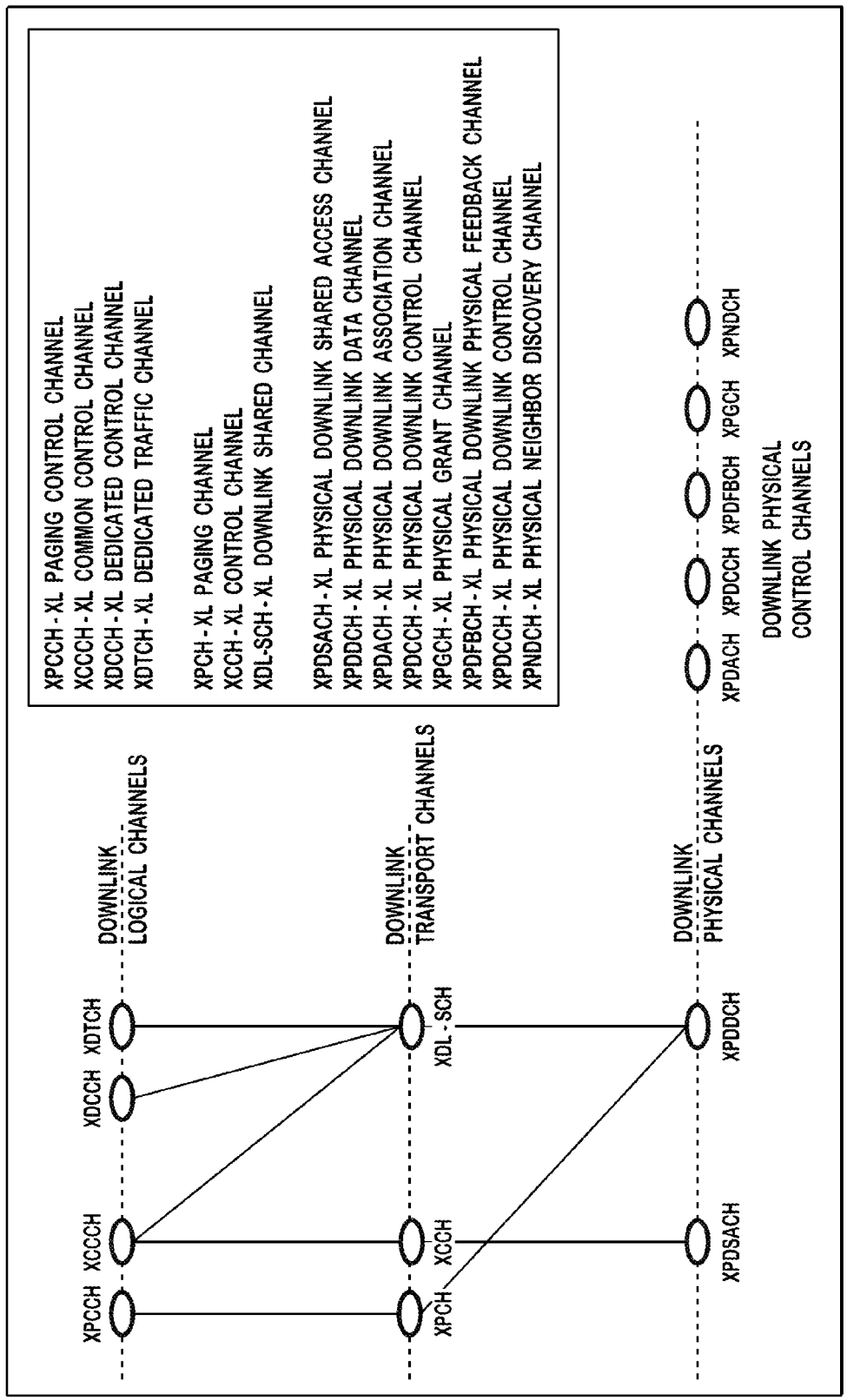
FIG. 27 shows the downlink channels and the downlink channel mapping for the XL.
Figure 28:
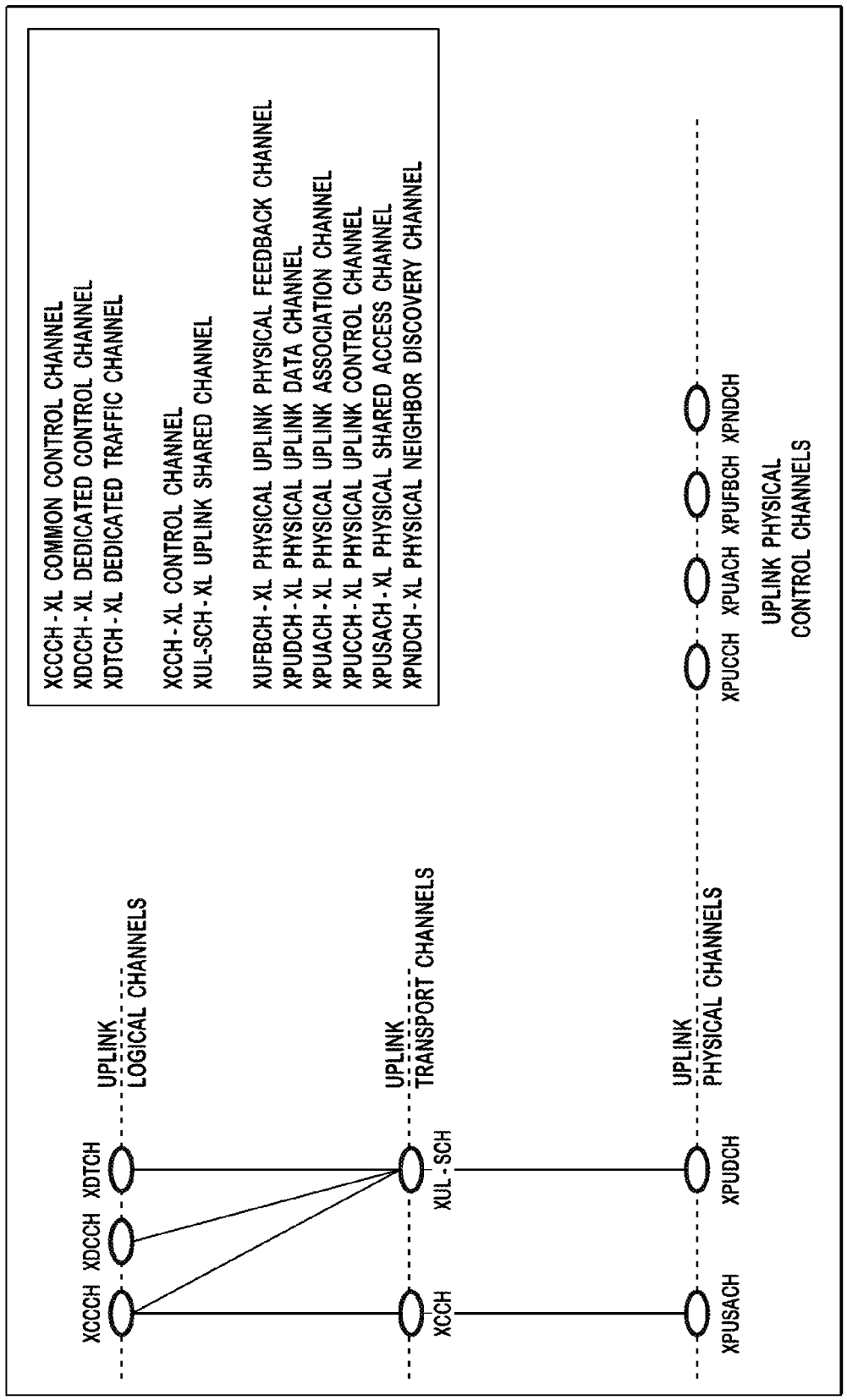
FIG. 28 shows the uplink channels and the uplink channel mapping for the XL.

FIG. 27 shows the downlink channels and the downlink channel mapping for the XL and FIG. 28 shows the uplink channels and the uplink channel mapping for the XL.

The Cross Link Physical Neighbor Discovery Channel (XPNDCH) carries sequences used for neighbor discovery transmissions including the Neighbor Discovery Initiation Transmission (NDIT) and the Neighbor Discovery Response Transmission (NDRT). The XPNDCH may occupy a default or pre-defined symbol or sub-carrier resource location that may not be subject to an XL grant or scheduling. The XPNDCH may utilize code division multiple access (CDMA) with a code configuration being derived by a T-WTRU 201 or H-WTRU 202 according to a pre-defined algorithm. When the XL 203 bandwidth is more than a default frequency resource, the network may allocate additional sub-carrier resources for the XPNDCH in order to increase neighbor discovery capacity.

The Cross Link Physical Grant Channel (XPGCH) caries XL grant information including sub-carrier allocation, time division duplex (TDD) sub-frame duplex scheme, maximum XL power, dedicated XL channel code configuration, reference signal configuration, and the like. The XPGCH may occupy a default or pre-defined symbol location, which may not be subject to XL grants or scheduling. The XPGCH may use frequency division multiple access (FDMA) or CDMA with a configuration derived based on the configuration of an associated Cross Link Physical Downlink Association Channel (XPDACH) described herein. An unscheduled version of the XPGCH may be available only in XL coverage mode and in both the XL coverage and XL capacity modes. The H-WTRU 202 XL grant may specify complete resource configuration of the XPGCH for XL dedicated use of XL grant transmission from H-WTRU 202 to T-WTRU 202. Further, space division multiple access (SDMA), time division multiple access (TDMA), FDMA, or CDMA may be used for the XPGCH. The XPGCH may only be available for the downlink on the XL 203.

The Cross Link Physical Downlink Feedback Channel (XPDFBCH) carries channel state information (CSI) of the uplink on the XL 203 and ACK/NACK of uplink XL 203 data transmissions. The resource allocation for the XPDFBCH channel may be determined based on the H-WTRU 202 XL grant. The XDFBCH may use SDMA, TDMA, FDMA, or CDMA.

The Cross Link Physical Uplink Feedback Channel (XPUFBCH) carries CSI of the downlink for the XL 203 and ACK/NACK for XL downlink data transmissions. The resource allocation of the XPUFBCH may be determined based on the XL 203 grant for the T-WTRU 201. The XUF-BCH may use SDMA, TDMA, FDMA, or CDMA.

The Cross Link Physical Downlink Control Channel (XP-DCCH) carries data-related control information in order for the T-WTRU 201 to decode the XPDDCH in the same transmission time interval (TTI). The resource allocation for the XPDCCH may be determined based on the XL 203 grant for the H-WTRU 202. The XPDCCH may use SDMA, TDMA, FDMA, or CDMA.

The Cross Link Physical Uplink Association Channel (XPUACH) carries physical layer control information including XL 203 SRs, XL 203 measurement result indicators, and the like. The XPUACH may occupy a default or pre-defined symbol location, which may not be subject to XL 203 grants or scheduling. The XPUACH may use FDMA, or CDMA and the XPUACH configuration may be based on code configuration of the XPNDCH.

The Cross Link Physical Downlink Association Channel (XPDACH) carries physical layer control information including paging indicator, association information transmission or reception indicators or messages, XL grants or indicators, and the like. The XPDACH may occupy a default or pre-defined symbol location, which may not be subject to a XL grant or scheduling. The XPDACH may apply FDMA or CDMA with a configuration based on the code configuration the XPNDCH.

The Cross Link Physical Uplink Control Channel (XPUCCH) carries necessary control information for the H-WTRU 202 to decode the XPUDCH. The resource allocation of the XPUCCH may be determined based on the XL grant for the T-WTRU 201. The XPUCCH may use SDMA, TDMA, FDMA, or CDMA.

The Cross Link Physical Downlink Data Channel (XPDDCH) carries downlink XL 203 user data received from the MAC layer. The resource allocation of the XPDDCH may be determined based on the H-WTRU 202 XL grant. The XPDDCH may use SDMA, TDMA, FDMA, or CDMA.

The Cross Link Physical Downlink Shared Access Channel (XPDSACH) carries higher-layer control information including basic system information (BSI), initial configuration (including XL 203 grants), and the like. The XPDSACH occupies a default or pre-defined symbol location, which may not be subject to XL 203 grants or scheduling. The XPDSACH may use FDMA, or CDMA and the configuration for the XPCSACH may be based on the configuration of the XPDACH. The information necessary to decode the XPDSACH, such as transport format, may be pre-defined.

The Cross Link Physical Uplink Data Channel (XPUDCH) carries XL uplink user data received from the MAC layer. The resource allocation for the XPUDCH may be determined based on the T-WTRU 201 XL 203 grants. The XPUDCH may use SDMA, TDMA, FDMA, or CDMA.

The Cross Link Physical Uplink Shared Access Channel (XPUSACH) carries higher layer control information including XL 203 measurement results, and the like. The XPUSACH may occupy a default or pre-defined symbol location, which may not be subject to XL 203 grants or scheduling. The XPUSACH may use FDMA, or CDMA. The configuration for the XPUSACH may be based on the configuration of the XPUACH. Information necessary to decode the channel, such as transport format, may be pre-defined.

For the XL 203, the XPNDCH, XPDACH, XPUACH, XPDSACH, XPUSACH, and XPGCH (referred to herein as unscheduled channels) do not require XL 203 grants, whereby information may be transmitted or received with a set of pre-defined procedures. For example, a H-WTRU 202 may use the XPDSACH to transmit BSI to a T-WTRU 202 during an on-going neighbor association procedure without a grant from the network. Further, although the XPDSACH transmission may not require a network grant, a pre-defined protocol including all necessary information required to detect and decode the channel may be followed. For example, the protocol may include XPDSACH coding, modulation, MAC PDU information, and the like when the XPDSACH is transmitted in a neighbor discovery procedure. Because the XPNDCH, XPDACH, XPUACH, XPDSACH, XPUSACH, and XPGCH are unscheduled, contention may occur. Further, schemes for CDMA, such as, spreading with different orthogonal sequences, may be used to minimize the probability of contention. As such, different XPDSACHs may be spread using orthogonal spreading sequences.

On the other hand, the XPDFBCH, XPUFBCH, XPDCCH, XPUCCH, XPDDCH, XPUDCH, and XPGCH (referred to herein as scheduled channels) may be used when an XL 203 grant is available or after an XL 203 grant is received from the network. Therefore, XL 203 physical layer transmission is allowed without network involvement, for example, when an out-of-coverage WTRU is establishing higher layer signaling in a neighbor association process. The unscheduled channels may be used in XL coverage mode due to the lack of T-WTRU 201 association with the network. In both the XL coverage and capacity modes, when the XL 203 is established and a grant is received, of the unscheduled channels only the XPNDCH may be utilized. As such neighbor discovery may be performed independently. However, communication specific to the XL 203 may be carried on the scheduled channels in accordance with network grants.

Figure 29:
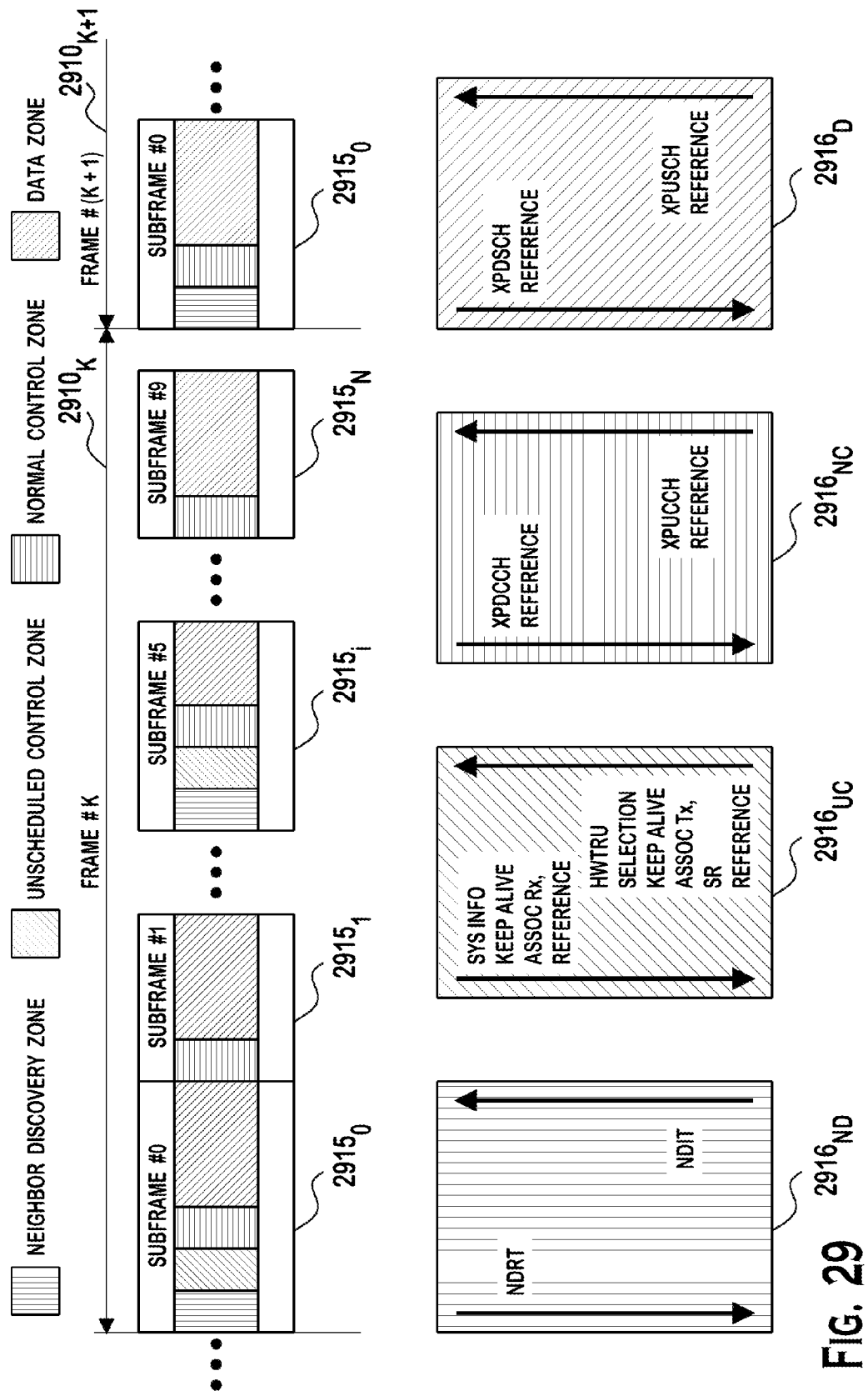
FIG. 29 shows a frame structure for the PHY layer of the XL.

FIG. 29 shows a frame structure for the PHY layer of the XL 203. Frame k 2910$_k$ and frame k+1 2910$_{k+1}$ (singularly referred to hereinafter as frame 2910) are shown in FIG. 29. Each frame 2910 comprises one or more subframes 2915$_0$, ..., 2915$_i$, ..., 2915$_N$ (collectively referred to hereinafter as subframes 2915$_{0-N}$ and singularly referred to hereinafter as subframe 2915). Each subframe 2915 comprises one or more zones (collectively referred to hereinafter as zones 2916$_{1-M}$ and singularly referred to hereinafter as zone 2916). The zone 2916 may be used for data or control information communication.

Four types of zones 2916$_{1-M}$ may be utilized in a frame 2910 of the XL 203; a neighbor discovery zone (NDZ) 2916$_{ND}$, an unscheduled control zone (UCZ) 2916$_{UC}$, a normal control zone (NCZ) 2916$_{NC}$, and a data zone (DZ) 2916$_D$. The zones 2916$_{1-M}$ of a subframe 2915 may comprise one or more of the four types of zones. The NDZ 2916$_{ND}$, UCZ 2916$_{UC}$, and NCZ 2916$_{NC}$ are used for control information communication, whereas the DZ 2916$_D$ is used for data communication, as described herein.

In the NDZ 2916$_{ND}$, the T-WTRU 201 transmits neighbor discovery initiation transmission (NDIT) to the H-WTRU 202 and receives a neighbor discovery response transmission (NDRT) from the H-WTRU 202. The NDZ 2916$_{ND}$ may occur twice in every frame 2910; once for the NDIT and once for the NDRT. Alternatively, the NDZ 2916$_{ND}$ may be considered part of the subframe 2916 structure, whereby the subframe may be in the same direction as the NDZ 2916$_{ND}$, i.e., transmit or receive, or downlink or uplink.

The UCZ 2916$_{UC}$ may have a predetermined set of resources that may be in every frame or, alternatively, in certain frames. The resources for the UCZ 2916$_{UC}$ may be based on the SFN. For example, all the XL 203 in a cell may have a UCZ 2916$_{UC}$ in the same frame. The UCZ 2916$_{UC}$ may be used by the T-WTRU 201 to transmit to a H-WTRU 202 that it has for the role. The UCZ 2916$_{UC}$ may also be used by the H-WTRU 202 to transmit basic system information to T-WTRU 201 in order to enable association formation. The transmissions between the T-WTRU 201 and the H-WTRU 202 may occur prior to association formation and may be performed without scheduling or assigned resources from the base station 114. Multiple H-WTRUs 202 may transmit the basic system information in the same UCZ $2916_{UC}$, which may allow for a diversity benefit. Selected as H-WTRU 202 messages from multiple T-WTRUs 201 may overlap in the same UCZ $2916_{UC}$ but may be separated, for example, using physical layer scrambling.

The NCZ $2916_{NC}$ may occur in every subframe 2916 and may be used for the transmission of the control channels XPDCCH and XPUCCH, keep alive messages, and association messages. Multiplexing between for information carried on the NCZ $2916_{NC}$ may be performed. The DZ $2916_D$ is used to transmit data transport blocks (TBs) between the T-WTRU 201 and the H-WTRU 202, where reference signals that enable the WTRUs to make measurements of the XL 203 are carried. All user data (for example, excluding control information) for the T-WTRU 201 is carried on the DZ $2916_D$ on the XL 203.

A WTRU in the XL-Inactive substate 520 may only transmit or receive in the UCZ $2916_{UC}$ and NCZ $2916_{NC}$. Further, a WTRU in the XL-Active substate 540 may transmit or receive on the DZ $2916_D$.

Table 1 shows a relationship between messages transmitted or received on the XL 203, their associated physical, transport, or logical channels, and the zone 2916 on which they are carried.

TABLE 1

Relationship between messages transmitted or received on the XL 203, their associated physical, transport, or logical channels, and the zone 2916 on which they are carried.

| XL message | Channel (s) | Zone |
| --- | --- | --- |
| SR sent from T-WTRU | XPUCCH/XPCUCCH/XULCCH/XPUACH | UCZ |
| ACK for SR |  | UCZ |
| XL grant sent to H-WTRU | PDCCH (LTE) |  |
| XL grant sent to T-WTRU | XPCCH/XPCDCCH/XCCCH | UCZ |
| Initial configuration message | XPCCH/XPCDCCH | UCZ |
| Extended System Information message | XCCCH/XDL-SCH/XPDSCH | DZ |
| SR for XL sent from H-WTRU | PUCCH (LTE) | N/A |
| SR for XL sent from H-WTRU | MAC control element on UL-SCH(LTE) | N/A |
| Paging message from H-WTRU to T-WTRU | XPCH | UCZ |
| Paging indication message |  | UCZ |
| Basic system information NDIT/NDRT | XPDSACH/XCCCH XPNDCH | UCZ/DZ |
| Downlink association message, paging indicator, XL grant | XPDACH/XCCCH |  |
| Uplink association message, XL measurement result indicator | XPUACH |  |
| Selected as H-WTRU message | XPUSACH/XCCCH |  |
| Initial configuration message | XPDSACH/XCCCH |  |
| XL measurement results sub-carrier allocation, TDD sub-frame duplex scheme, maximum cross link power, dedicated cross link channel code configuration, reference signal configuration | XPUSACH XPGCH |  |
| CSI of the XL uplink, ACK/NACK of XL uplink data transmission | XPDFBCH |  |
| XL downlink data received from the MAC layer | XPDDCH |  |
| Control information for decoding the XPDDCH | XPDCCH |  |
| CSI of XL downlink, ACK/NACK of XL downlink data transmission | XPUFBCH |  |
| XL uplink data received from the MAC layer | XPUDCH |  |
| Control information for decoding the XPUDCH | XPUCCH |  |

The communication resources for XL 203 may be in a different band than the communication resources of the TRL 204 and may be said to be out-of-band with the resources of the TRL 204. Alternatively, the communication resource for XL 203 may be in the same band as the communication resources of the TRL 204 and may be said to be in-band with the resources of the TRL 204.

Figure 30:
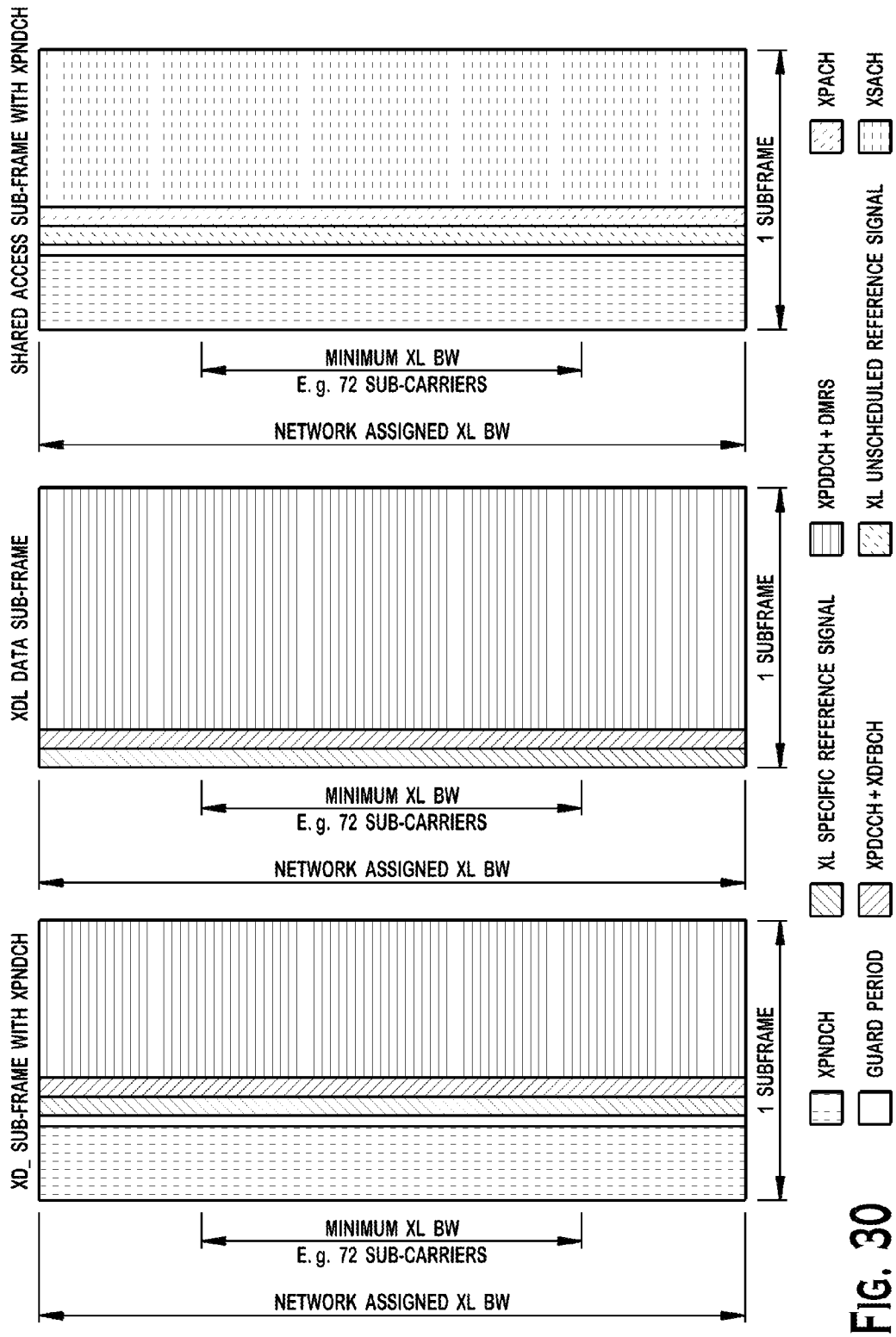
FIG. 30 shows physical channel multiplexing for subframes.

As an alternative to FIG. 29, different physical channels may be multiplexed into different XL 203 subframes as shown in FIG. 30.

FIG. 30 shows physical channel multiplexing for subframes. The MAC layer provides services to the Radio Link Control RLC layer in the form of logical channels. The type of logical channel is either a control channel used for transmission of control and configuration information or a traffic channel used for data. The XL 203 logical channels include XPCCH, XCCCH, XDCCH and XDTCH, as descried with reference to FIGS. 27 and 28.

The PHY layer of the XL 203 offers services to the MAC using transport channels including the XPCH, XCCH, XDL-SCH and XUL-SCH. Data on a transport channel may be organized into transport blocks and in each TTI one transport block of a certain size may be transmitted. When spatial multiplexing is used, for example, in MIMO, up to two transport blocks may be transmitted in one TTI.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A Long Term Evolution (LTE) wireless transmit/receive unit (WTRU) for maintaining a cross link (XL), the LTE WTRU comprising:
at least one processor configured to establish the XL with another LTE WTRU and to maintain the XL while in an XL-idle substate in which data communication with the another LTE WTRU on the XL is disabled;
a receiver configured to receive a first keep alive message from the another LTE WTRU in the XL-idle substate; and
a transmitter configured to transit a second keep alive message to the another LTE WTRU in the XL-idle substate,
wherein, on a condition that the first keep alive message is received, the at least one processor is configured to maintain the XL and remain in the XL-idle substate.

2. The LTE WTRU of claim 1, wherein the XL enables direct communication between the LTE WTRU and the another LTE WTRU.

3. The LTE WTRU of claim 1, wherein the LTE WTRU is a helper WTRU (H-WTRU) and the another LTE WTRU is a terminal WTRU (T-WTRU).

4. The LTE WTRU of claim 1, wherein the LTE WTRU is a terminal WTRU (T-WTRU) and the another LTE WTRU is a helper WTRU (H-WTRU).

5. The LTE WTRU of claim 1, wherein, in the XL-idle state, the at least one processor is configured to monitor for a scheduling request from the another LTE WTRU, wherein the scheduling request is a request for a resource allocation for the XL.

6. The LTE WTRU of claim 1, wherein the at least one processor is configured to start a keep alive timer in the XL-idle substate and reset the keep alive timer upon receiving the first keep alive message.

7. The LTE WTRU of claim 6, wherein the at least one processor is configured to monitor an expiration of the keep alive timer, and, on a condition that the keep alive timer is valid, the at least one processor is configured to maintain the XL.

8. The LTE WTRU of claim 6, wherein the at least one processor is configured to monitor an expiration of the keep alive timer, and, on a condition that the keep alive timer expires, the at least one processor is configured to perform neighbor discovery.

9. The LTE WTRU of claim 6, wherein the at least one processor is configured to monitor an expiration of the keep alive timer, and, on a condition that the keep alive timer expires, the at least one processor is configured to transmit an indication to an LTE base station that the XL failed.

10. The LTE WTRU of claim 6, wherein the at least one processor is configured to monitor an expiration of the keep alive timer, and, on a condition that the keep alive timer expires, the at least one processor is configured to perform an association process during which the transmitter is configured to transmit an association information message to at least one backup LTE WTRU.

11. The LTE WTRU of claim 6, wherein the at least one processor is configured to monitor an expiration of the keep alive timer, and, on a condition that the keep alive timer expires, the at least one processor is configured to exit the XL-idle substate.

12. The LTE WTRU of claim 1, The LTE WTRU of claim 1, wherein the LTE WTRU is out of a coverage area of an LTE base station the another LTE WTRU is camped on.

13. A method of maintaining a cross link (XL) between a first Long Term Evolution (LTE) wireless transmit/receive unit (WTRU) and a second LTE WTRU, the method comprising:
establishing, by the first LTE WTRU, the XL with the second LTE WTRU;
maintaining, by the first LTE WTRU, the XL while in an XL-idle substate in which data communication on the XL is disabled;
receiving, by the first LTE WTRU, a first keep alive message from the second LTE WTRU in the XL-idle substate;
transmitting, by the LTE WTRU, a second keep alive message to the second LTE WTRU in the XL-idle substate; and
maintaining, by the first LTE WTRU on a condition that the first keep alive message is received, the XL and remaining in the XL-idle substate.

14. The method of claim 13, wherein the XL enables direct communication between the LTE WTRU and the another LTE WTRU.

15. The method of claim 13, wherein the first LTE WTRU is a helper WTRU (H-WTRU) and the second LTE WTRU is a terminal WTRU (T-WTRU).

16. The method of claim 13, wherein the first LTE WTRU is a terminal WTRU (T-WTRU) and the second LTE WTRU is a helper WTRU (H-WTRU).

17. The method of claim 13, further comprising:
monitoring, by the first LTE WTRU in the XL-idle state, for a scheduling request from the second LTE WTRU, wherein the scheduling request is a request for a resource allocation for the XL.

18. The method of claim 13, further comprising:
starting, by the first LTE WTRU, a keep alive timer in the XL-idle substate; and
resetting, by the first LTE WTRU, the keep alive timer upon receiving the first keep alive message.

19. The method of claim 18, further comprising:
monitoring, by the first LTE WTRU, an expiration of the keep alive timer; and
maintaining, by the first LTE WTRU on a condition that the keep alive timer is valid, the XL.

20. The method of claim 18, further comprising:
monitoring, by the first LTE WTRU, an expiration of the keep alive timer; and
performing, by the first LTE WTRU on a condition that the keep alive timer expires, neighbor discovery.

21. The method of claim 18, further comprising:
monitoring, by the first LTE WTRU, an expiration of the keep alive timer; and
transmitting, by the first LTE WTRU on a condition that the keep alive timer expires, an indication to an LTE base station that the XL failed.

22. The method of claim 18, further comprising:
monitoring, by the first LTE WTRU, an expiration of the keep alive timer; and
performing, by the first LTE WTRU on a condition that the keep alive timer expires, an association process during which the transmitter is configured to transmit an association information message to at least one backup LTE WTRU.

23. The method of claim 18, further comprising:
monitoring, by the first LTE WTRU, an expiration of the keep alive timer; and
exiting, by the first LTE WTRU on a condition that the keep alive timer expires, the XL-idle substate.

24. The method of claim 13, wherein the first LTE WTRU is out of a coverage area of an LTE base station the second LTE WTRU is camped on.

\* \* \* \* \*